(12) United States Patent
Orloff

(10) Patent No.: US 8,707,463 B2
(45) Date of Patent: Apr. 29, 2014

(54) DEVICES FOR USE DURING PHYSICAL ACTIVITY

(75) Inventor: Glennis J. Orloff, Woodbridge, CT (US)

(73) Assignee: Samara Innovations, LLC, New Haven, CT (US)

( * ) Notice: Subject to any disclaimer, the term of this patent is extended or adjusted under 35 U.S.C. 154(b) by 785 days.

(21) Appl. No.: 12/578,454

(22) Filed: Oct. 13, 2009

(65) Prior Publication Data

US 2010/0088803 A1 Apr. 15, 2010

Related U.S. Application Data

(60) Provisional application No. 61/105,282, filed on Oct. 14, 2008.

(51) Int. Cl.
*A41D 13/00* (2006.01)

(52) U.S. Cl.
USPC ........................................ 2/22; 2/69; 482/124

(58) Field of Classification Search
USPC .............. 2/228, 69, 239, 22; 482/124; 602/19
See application file for complete search history.

(56) References Cited

U.S. PATENT DOCUMENTS

| | | | |
|---|---|---|---|
| 4,698,847 A | 10/1987 | Yoshihara | |
| 4,862,523 A | 9/1989 | Lipov | |
| 5,107,827 A | 4/1992 | Boyd | |
| 5,263,923 A | 11/1993 | Fujimoto | |
| 5,367,708 A | 11/1994 | Fujimoto | |
| 5,737,773 A | 4/1998 | Dicker et al. | |
| D404,538 S | 1/1999 | Fujii et al. | |
| 5,857,947 A | 1/1999 | Dicker et al. | |
| D404,889 S | 2/1999 | Fujii et al. | |
| 5,937,442 A | 8/1999 | Yamaguchi et al. | |
| 5,957,878 A | 9/1999 | Gilliam | |
| 6,032,096 A | 2/2000 | Takahashi | |
| D424,280 S | 5/2000 | Fujii et al. | |

(Continued)

FOREIGN PATENT DOCUMENTS

| | | |
|---|---|---|
| EP | 1 110 464 B1 | 7/2008 |
| JP | 2003-293207 | 10/2003 |

(Continued)

OTHER PUBLICATIONS

International Search Report and Written Opinion for International Application No. PCT/US2009/060522, mail date Jun. 7, 2010, 7 pages.

(Continued)

*Primary Examiner* — Richale Quinn
(74) *Attorney, Agent, or Firm* — Foley & Lardner LLP

(57) ABSTRACT

A garment to be positioned about one or more body portions of a person performing a physical activity comprises a garment region having a garment region elasticity and a training region having a training region elasticity, the garment region stretching a greater distance as the result of an applied force than the training region under the same applied force. The training region at least partially defines a tensioning system of a biofeedback device. The biofeedback device is configured to provide sensory cues (e.g., feedback forces) to the person performing a physical activity when the person's biomechanic position is sub-optimal, the sensory cues indicating to the person that their biomechanic position is sub-optimal and indicating to the person how to adjust their one or more body portions towards a more optimal biomechanic position. The garment may provide for training and help the person achieve optimal biomechanic motion.

13 Claims, 50 Drawing Sheets

(56) References Cited

U.S. PATENT DOCUMENTS

| | | |
|---|---|---|
| 6,186,970 B1 | 2/2001 | Fujii et al. |
| 6,430,752 B1 | 8/2002 | Bay |
| 7,081,035 B2 | 7/2006 | Kawakami |
| 7,089,597 B2 | 8/2006 | Horii et al. |
| D539,512 S | 4/2007 | Ota et al. |
| D541,009 S | 4/2007 | Ota et al. |
| 7,229,390 B2 | 6/2007 | Fujii et al. |
| 7,516,798 B2 | 4/2009 | Wood et al. |
| 2004/0255358 A1 | 12/2004 | Ota et al. |
| 2005/0193461 A1 | 9/2005 | Caillibotte et al. |
| 2005/0197607 A1 | 9/2005 | Brown |
| 2005/0240134 A1 | 10/2005 | Brown |
| 2006/0000478 A1 | 1/2006 | Taylor |
| 2006/0026740 A1 | 2/2006 | Vargas et al. |
| 2007/0111868 A1 | 5/2007 | Fujii et al. |
| 2007/0214541 A1 | 9/2007 | Kawasaki et al. |
| 2007/0219478 A1 | 9/2007 | Powers et al. |
| 2008/0009120 A1 | 1/2008 | Miyanaga et al. |
| 2008/0125288 A1 | 5/2008 | Case |
| 2008/0295216 A1 | 12/2008 | Nordstrom et al. |
| 2009/0062704 A1 | 3/2009 | Brown et al. |
| 2010/0251454 A1* | 10/2010 | Kiernan ................ 2/69 |
| 2011/0007275 A1* | 1/2011 | Yoo et al. .............. 351/209 |
| 2011/0043755 A1* | 2/2011 | Gibson-Horn et al. ....... 351/203 |
| 2012/0092618 A1* | 4/2012 | Yoo et al. .............. 351/209 |

FOREIGN PATENT DOCUMENTS

| | | |
|---|---|---|
| WO | WO 02/064073 A1 | 8/2002 |
| WO | WO 2006/032096 A1 | 3/2006 |
| WO | WO-2008/150660 | 12/2008 |

OTHER PUBLICATIONS

S.E.R.F. Strap Patellofemoral Brace, Donjoy Advertisement, 2006, 2 pages, dj Orthopedics, LLC.

Mighty Tight, Women's Health, Oct. 2008, 2 pages.

Coreshorts, Coretection—Procedures of Coreshorts—treating athletic pelvic; groin and hip injuries, http://www.coretection.com/purpose.php, viewed Apr. 28, 2009, 3 pages.

Coreshorts, Coretection—Procedures of Coreshorts—treating athletic pelvic; groin and hip injuries, http://www.coretection.com/benefits.php, viewed Apr. 28, 2009, 3 pages.

European Search Report and Opinion for European Application No. 09821129, dated Nov. 14, 2013, 9 pages.

* cited by examiner

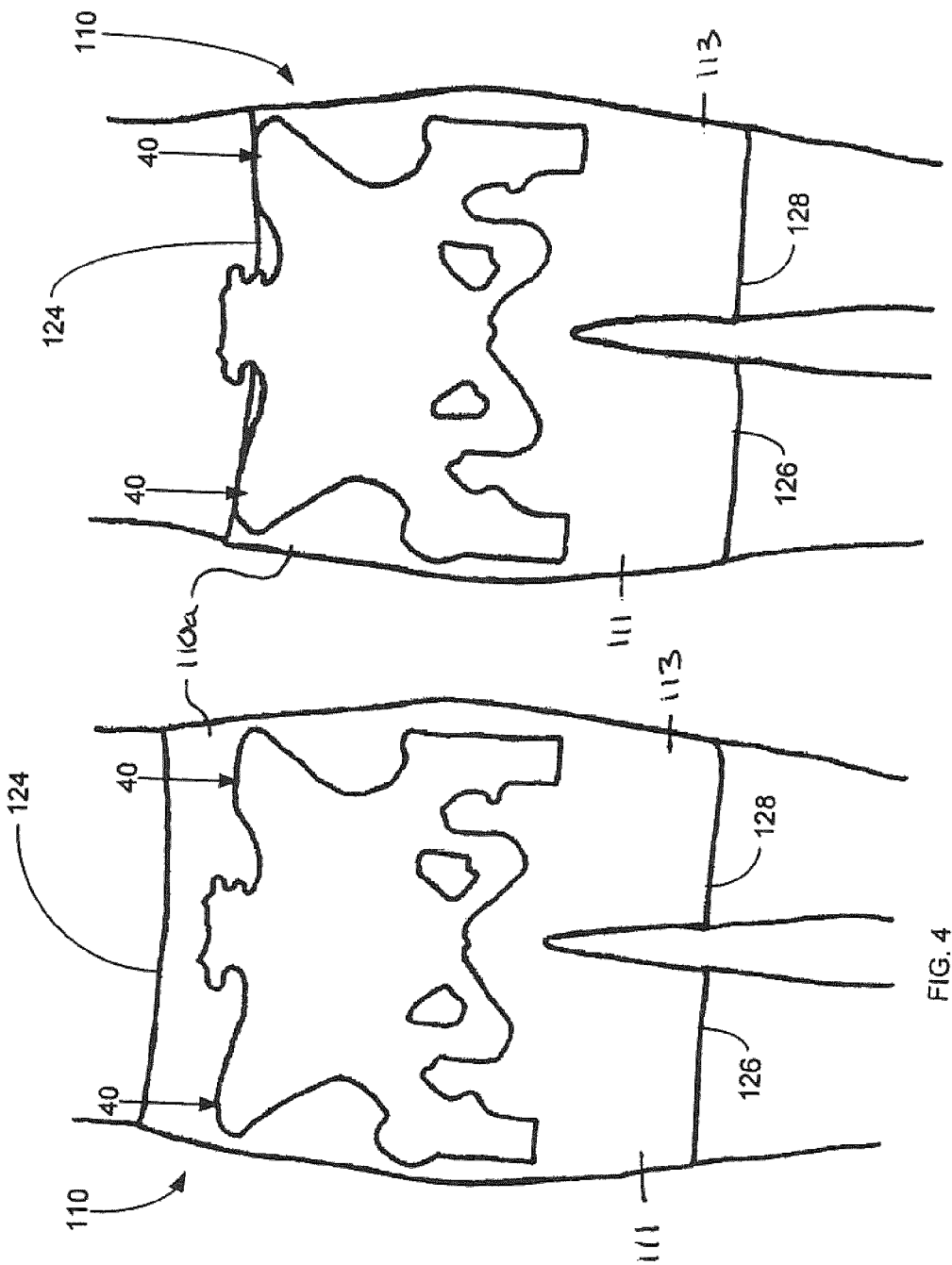

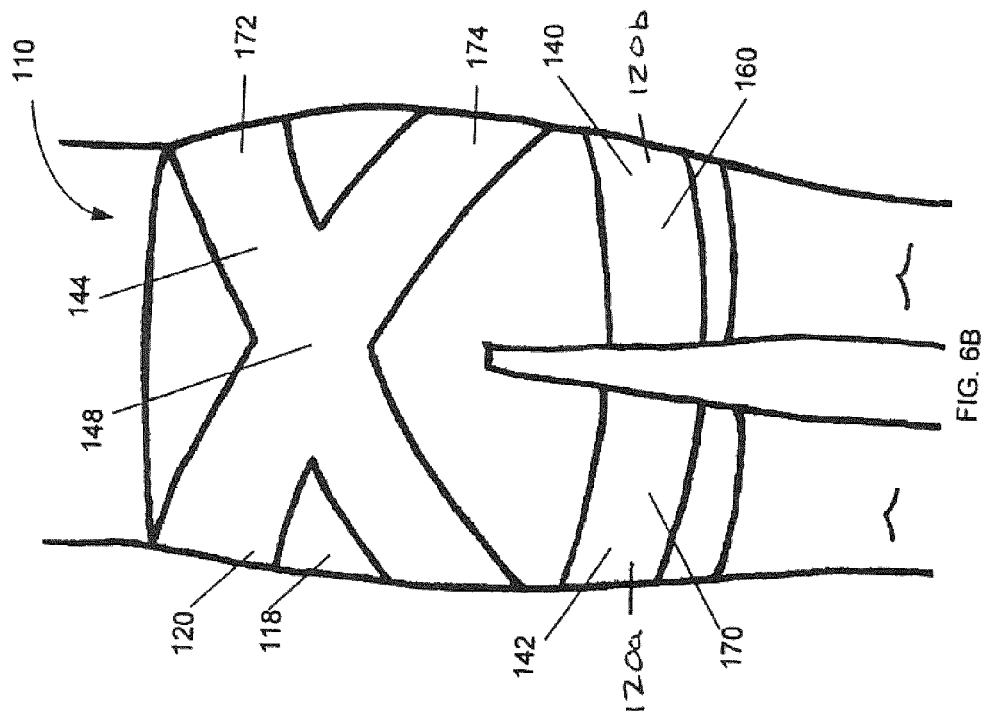
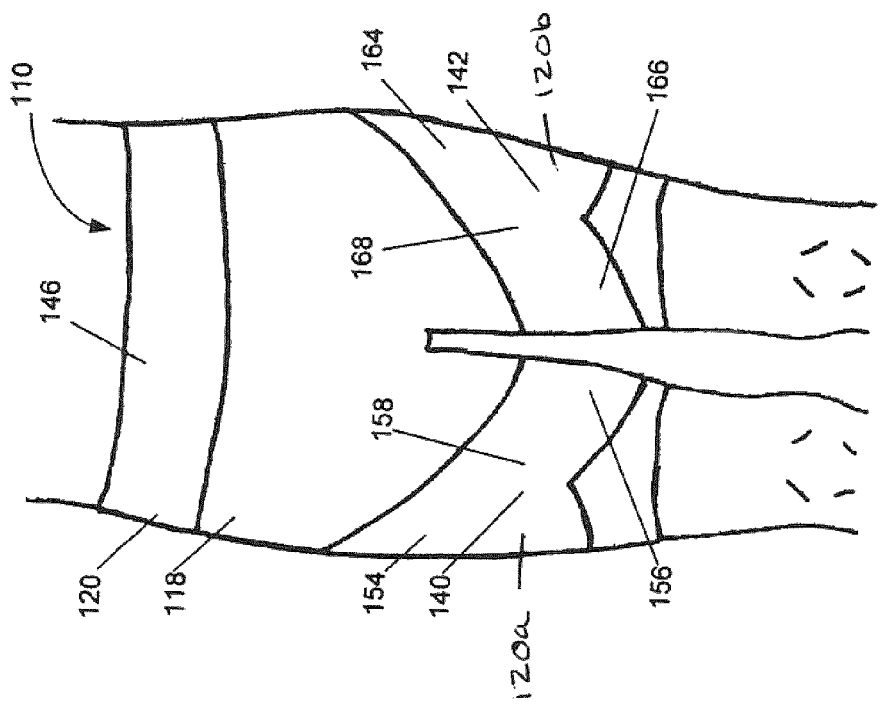

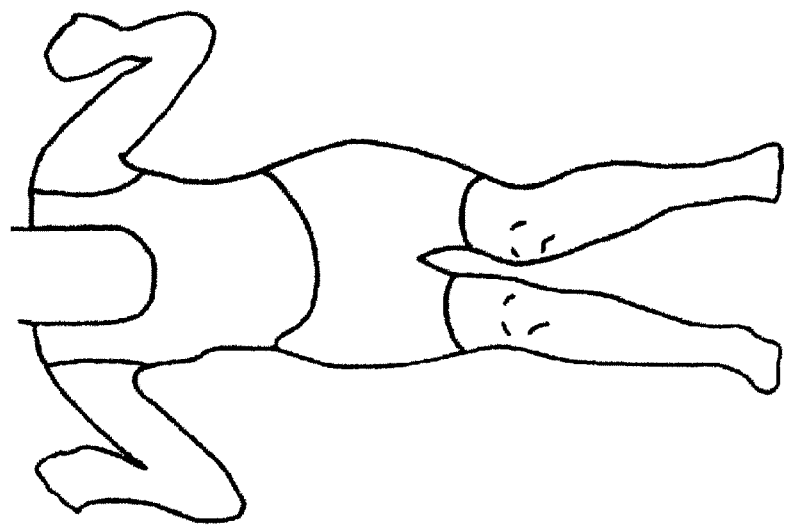
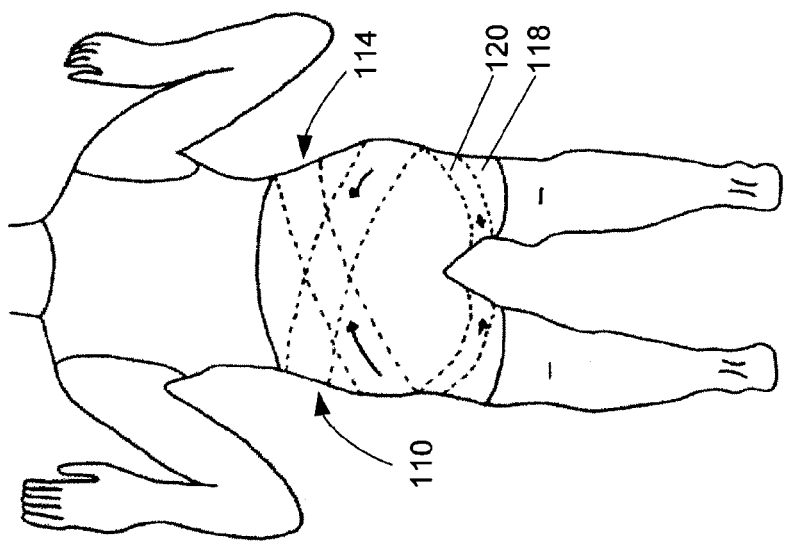
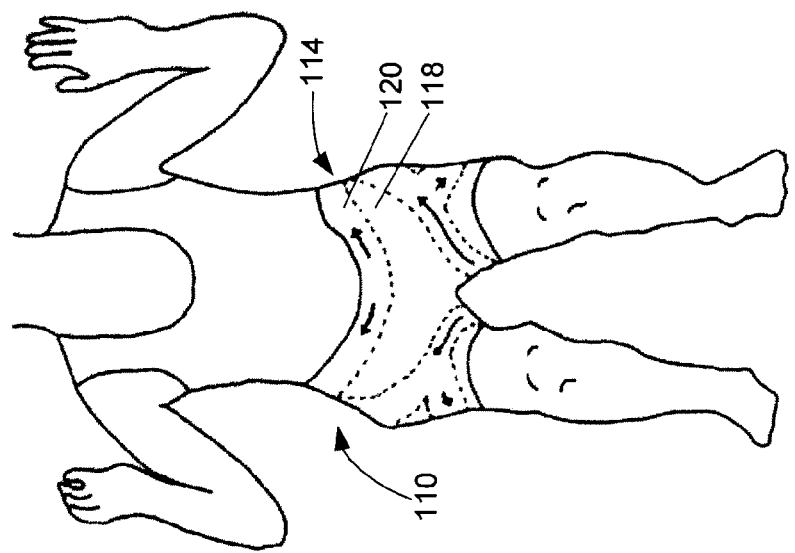

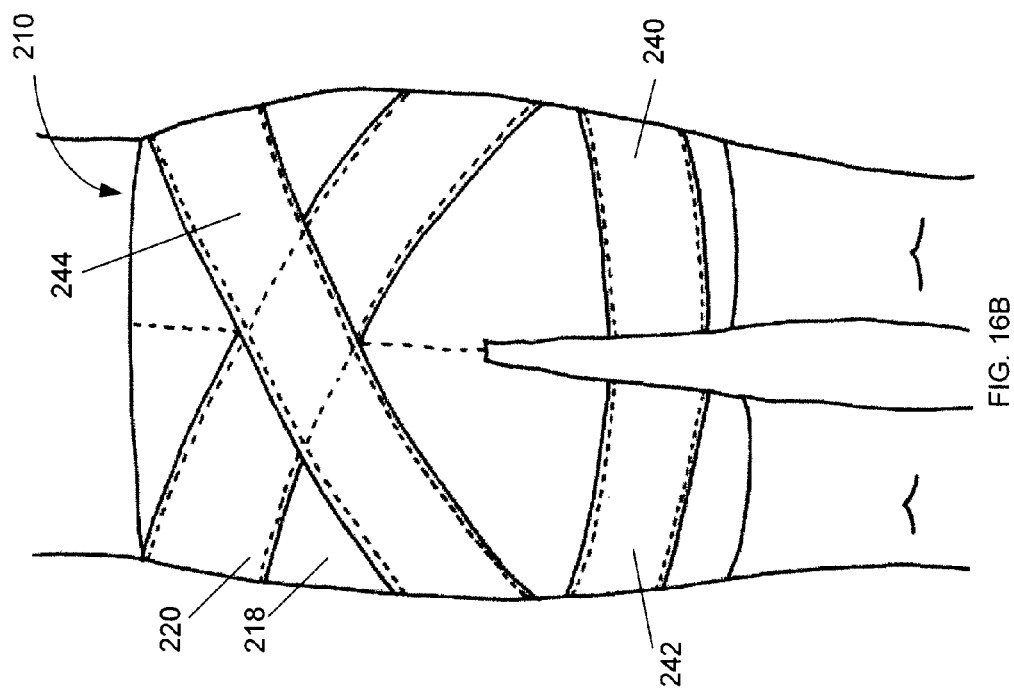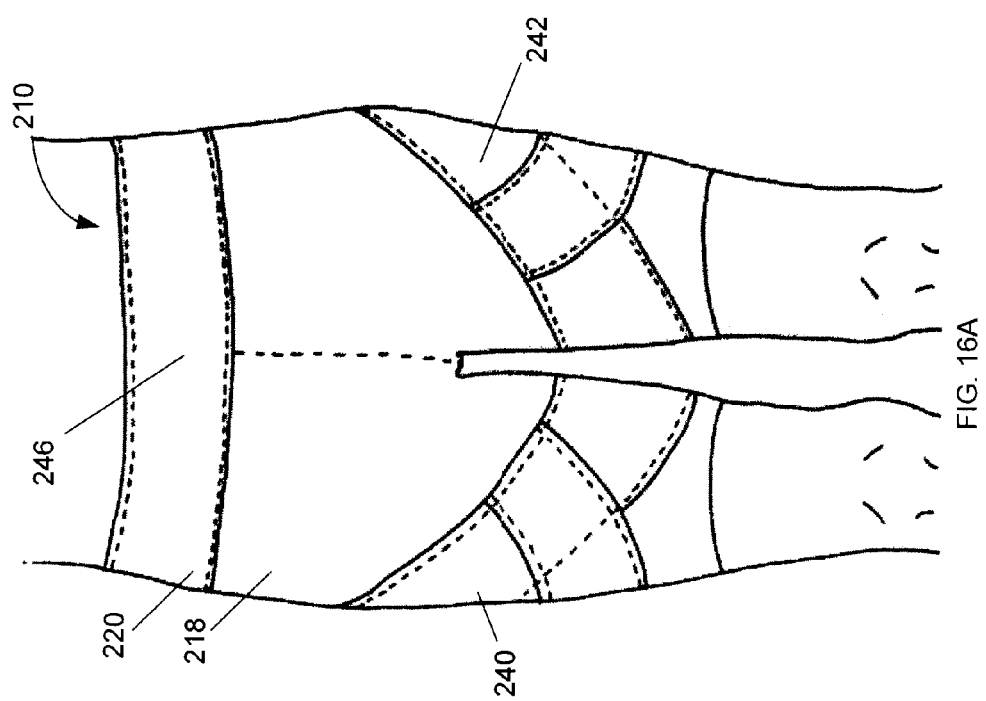

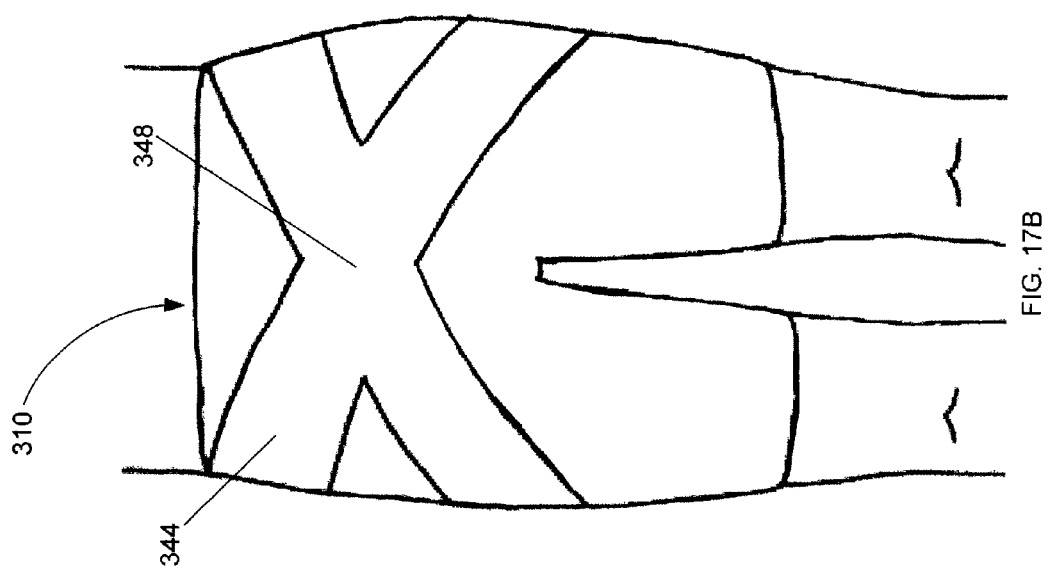
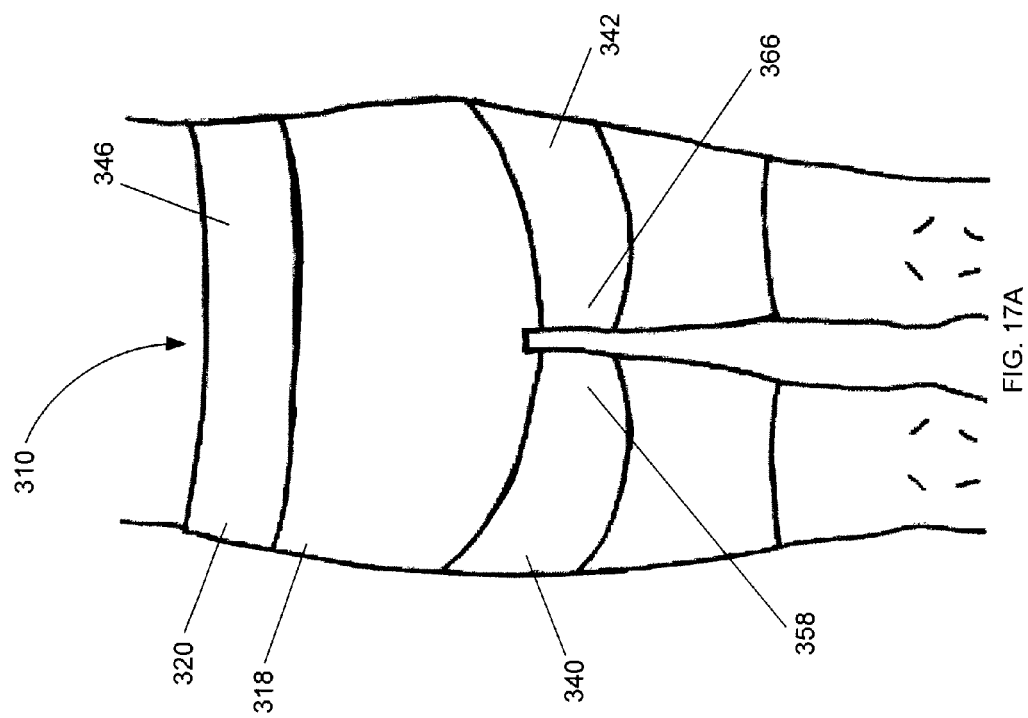

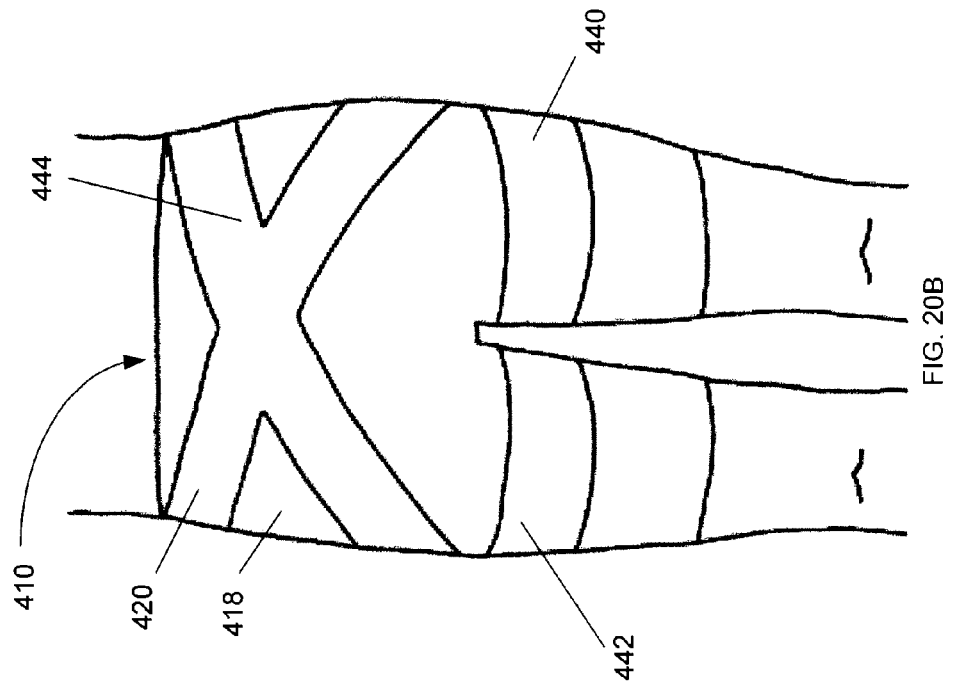
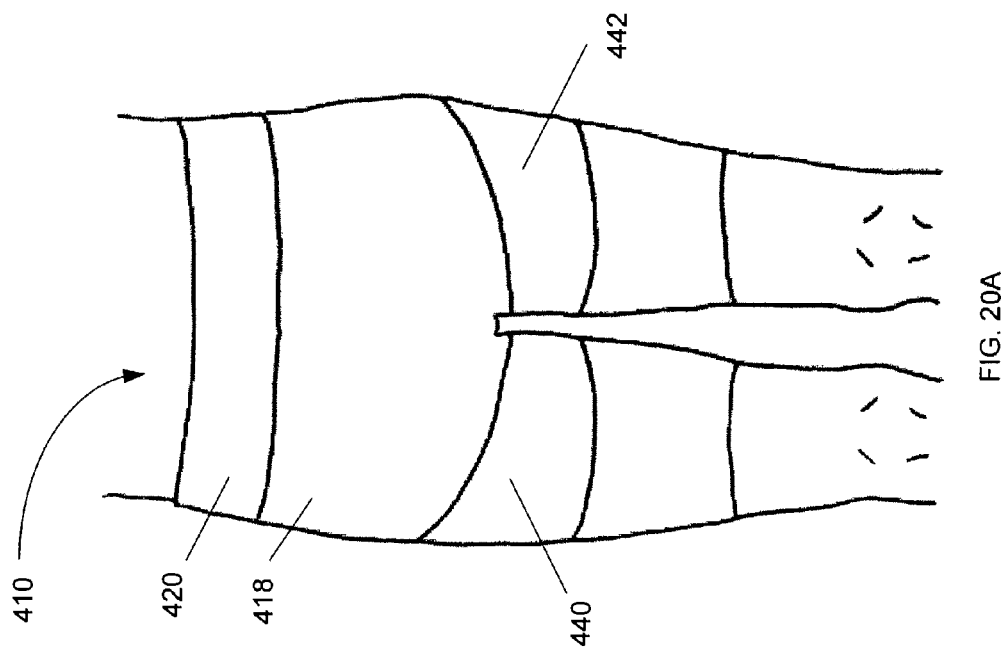

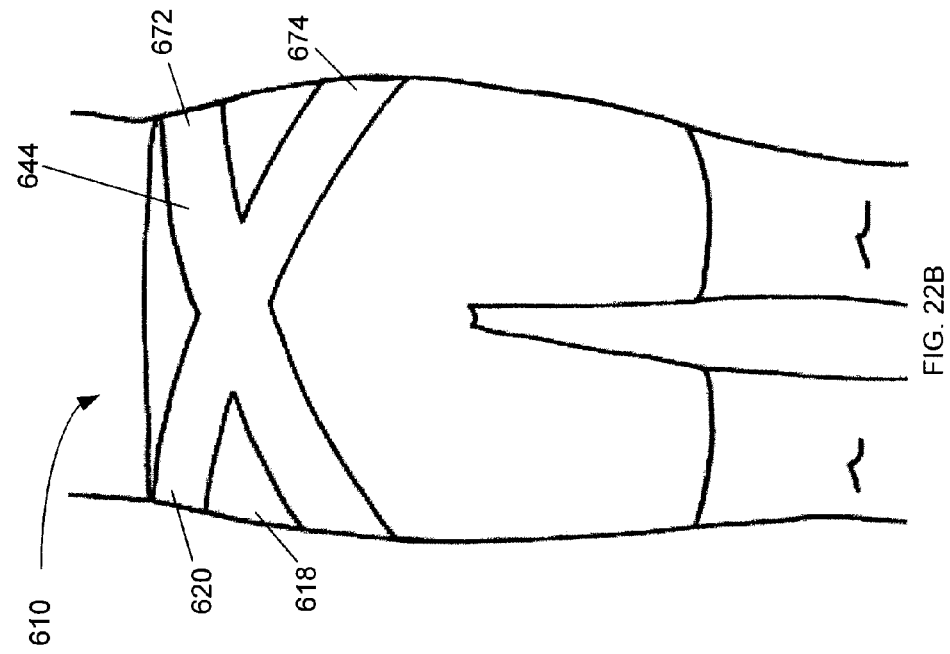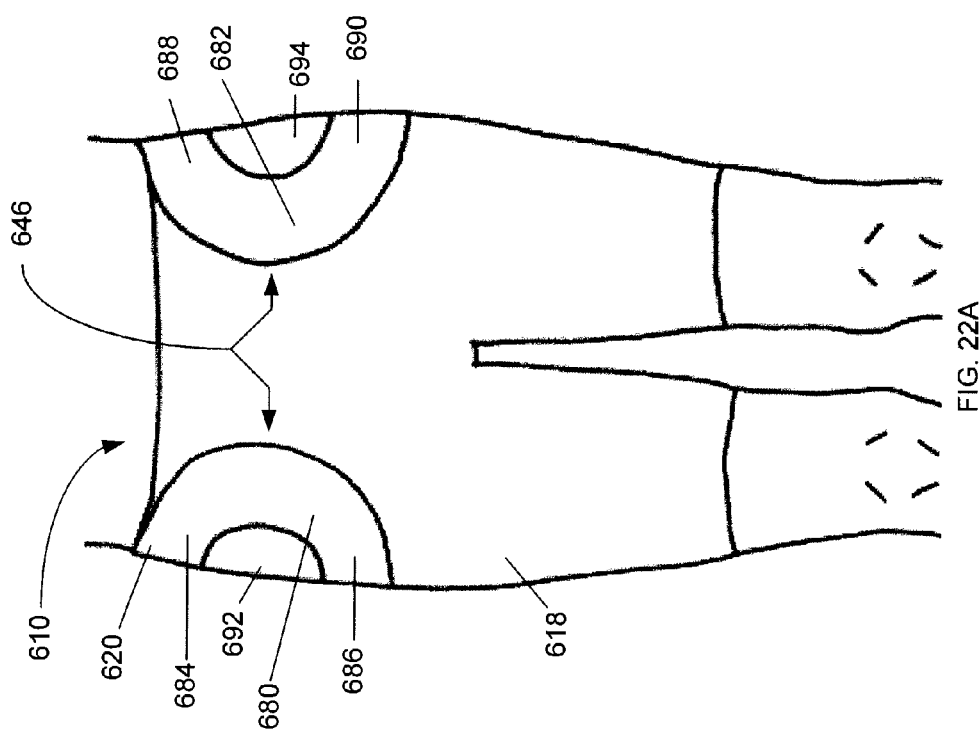

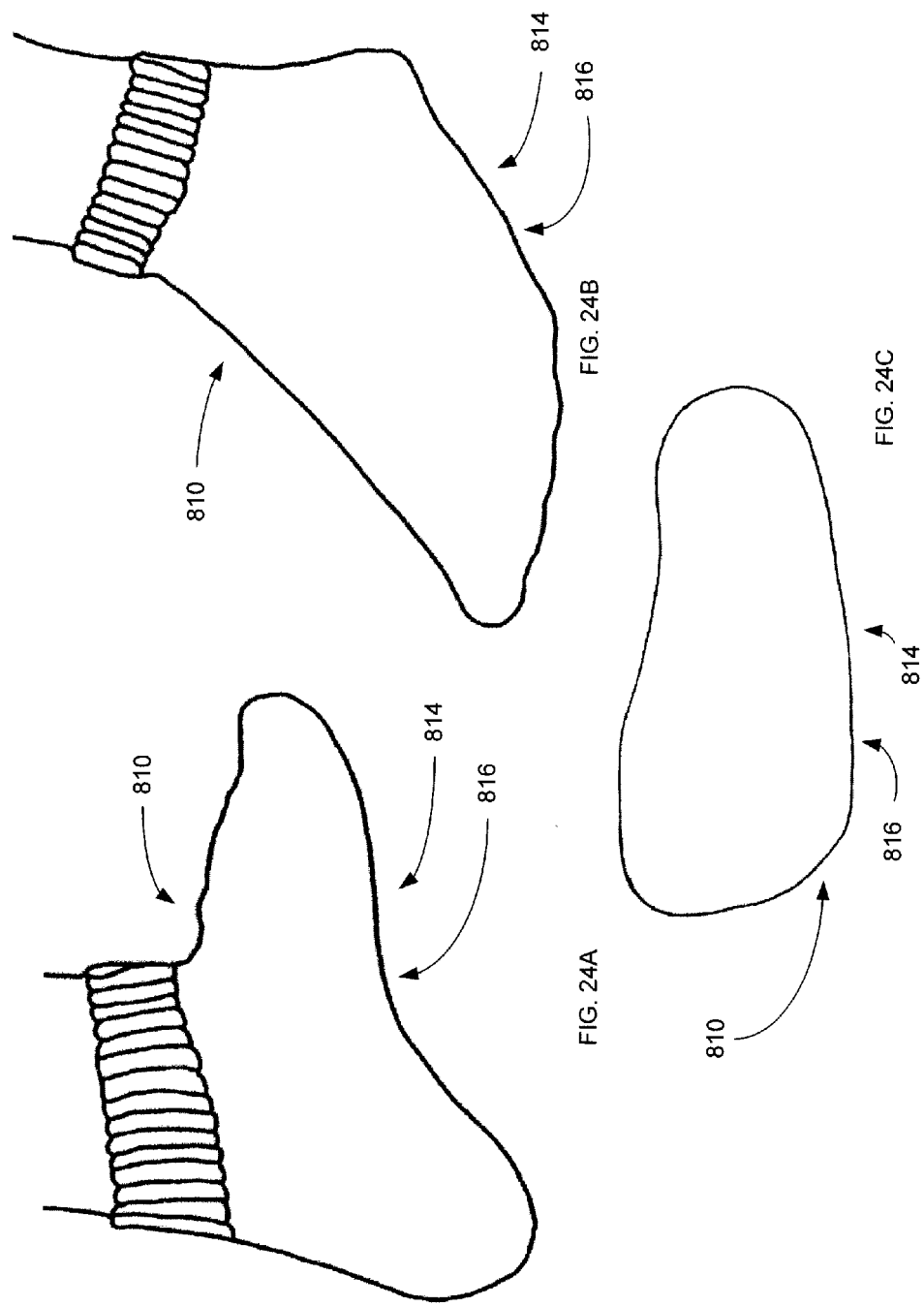

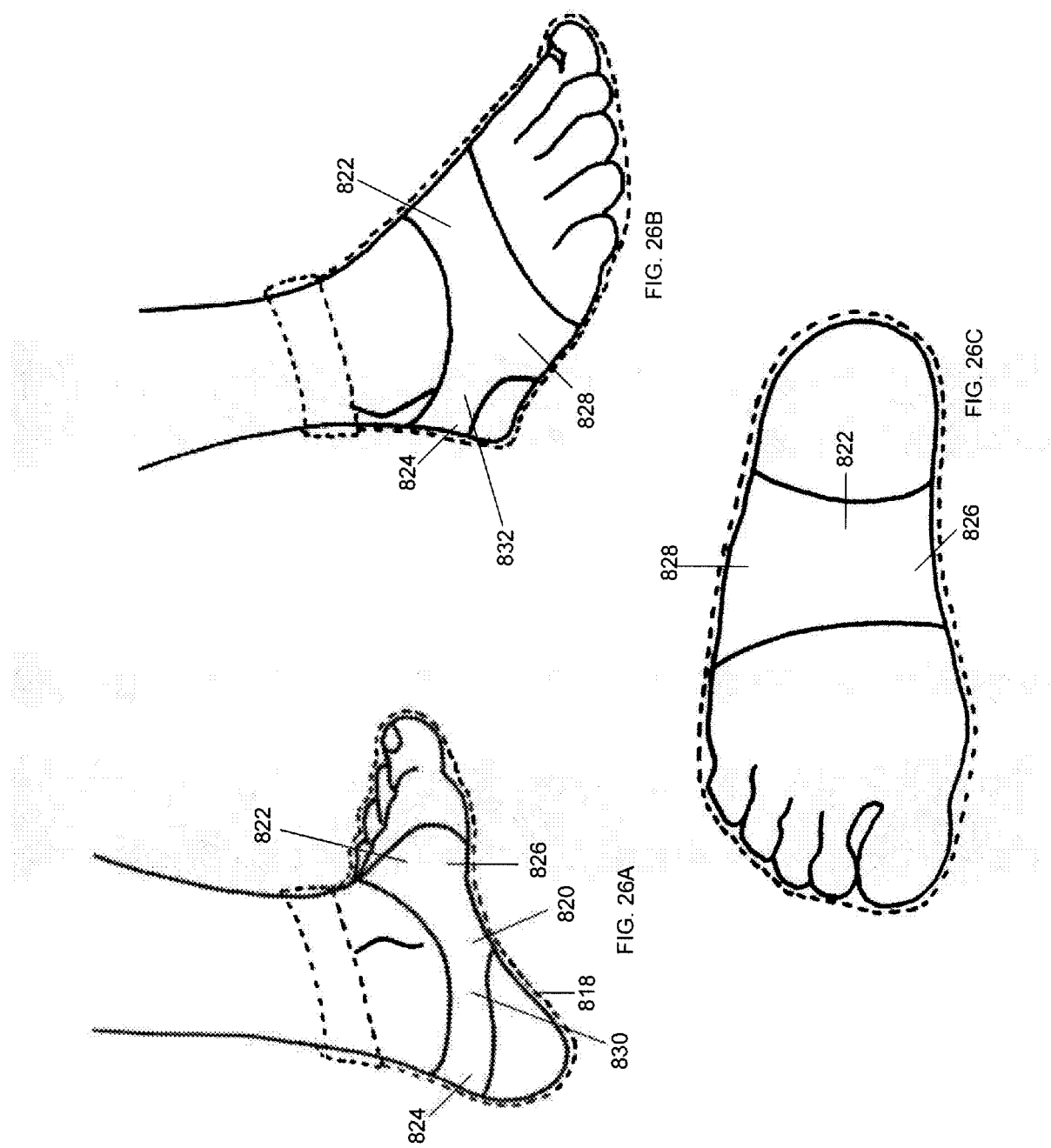

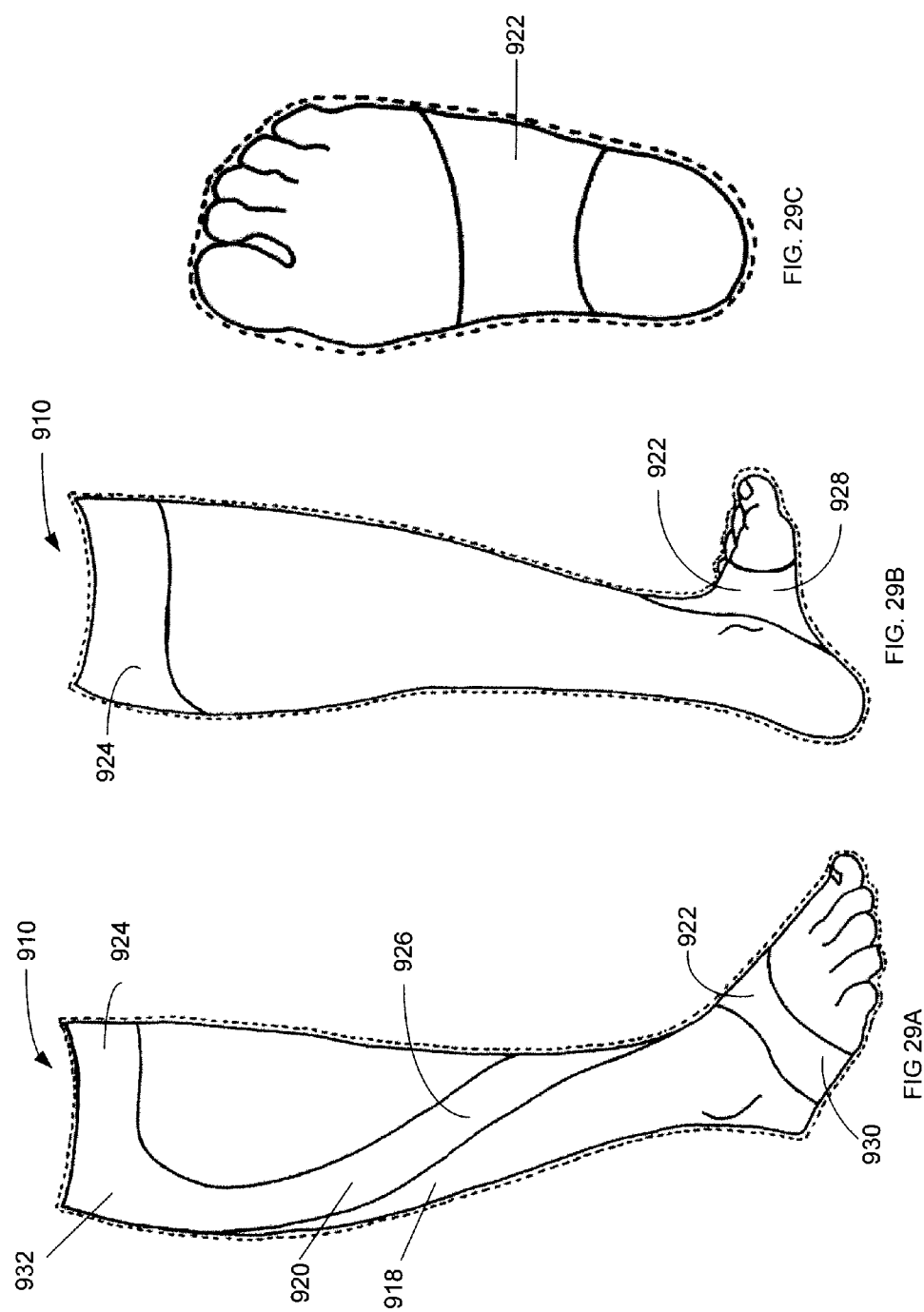

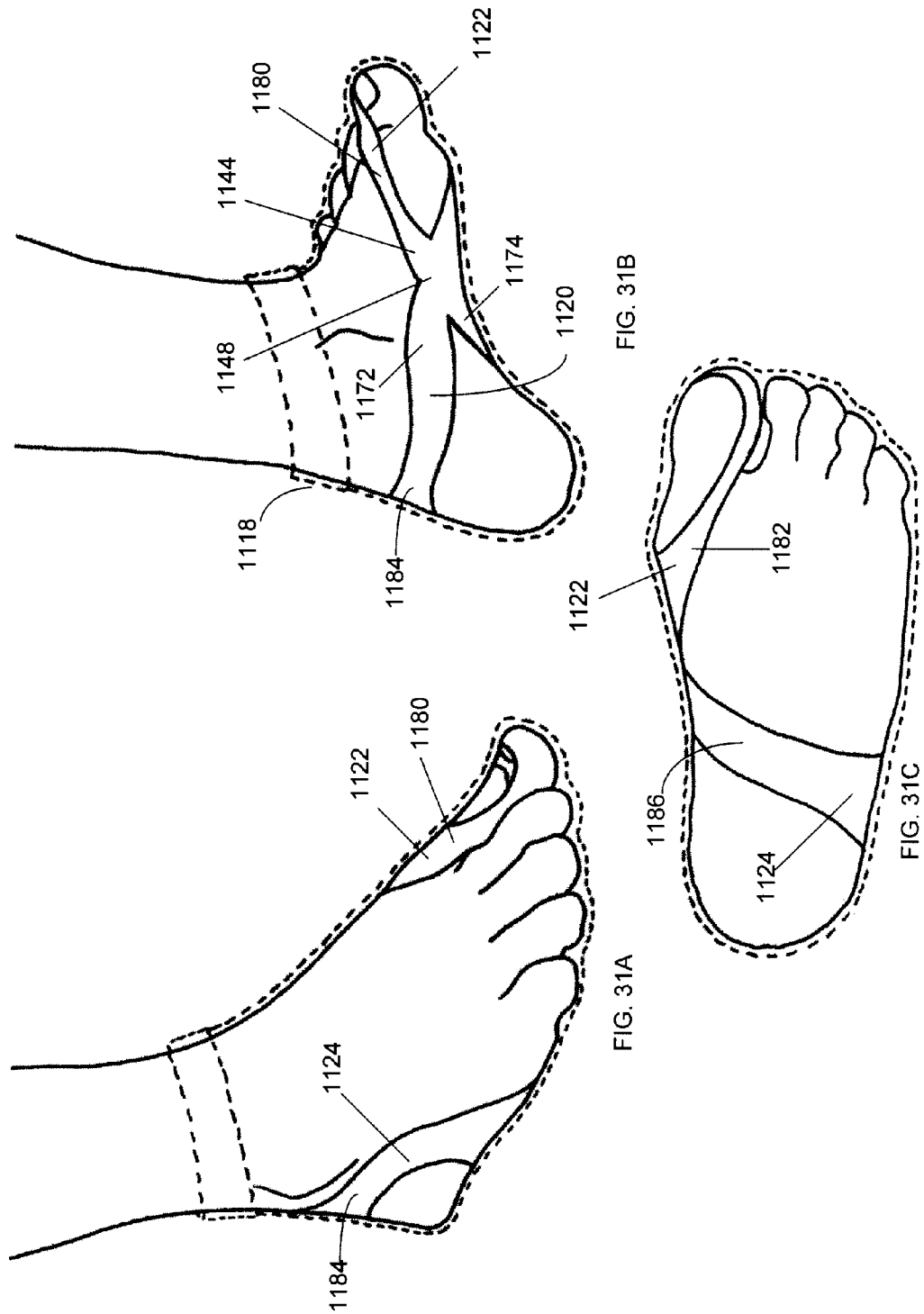

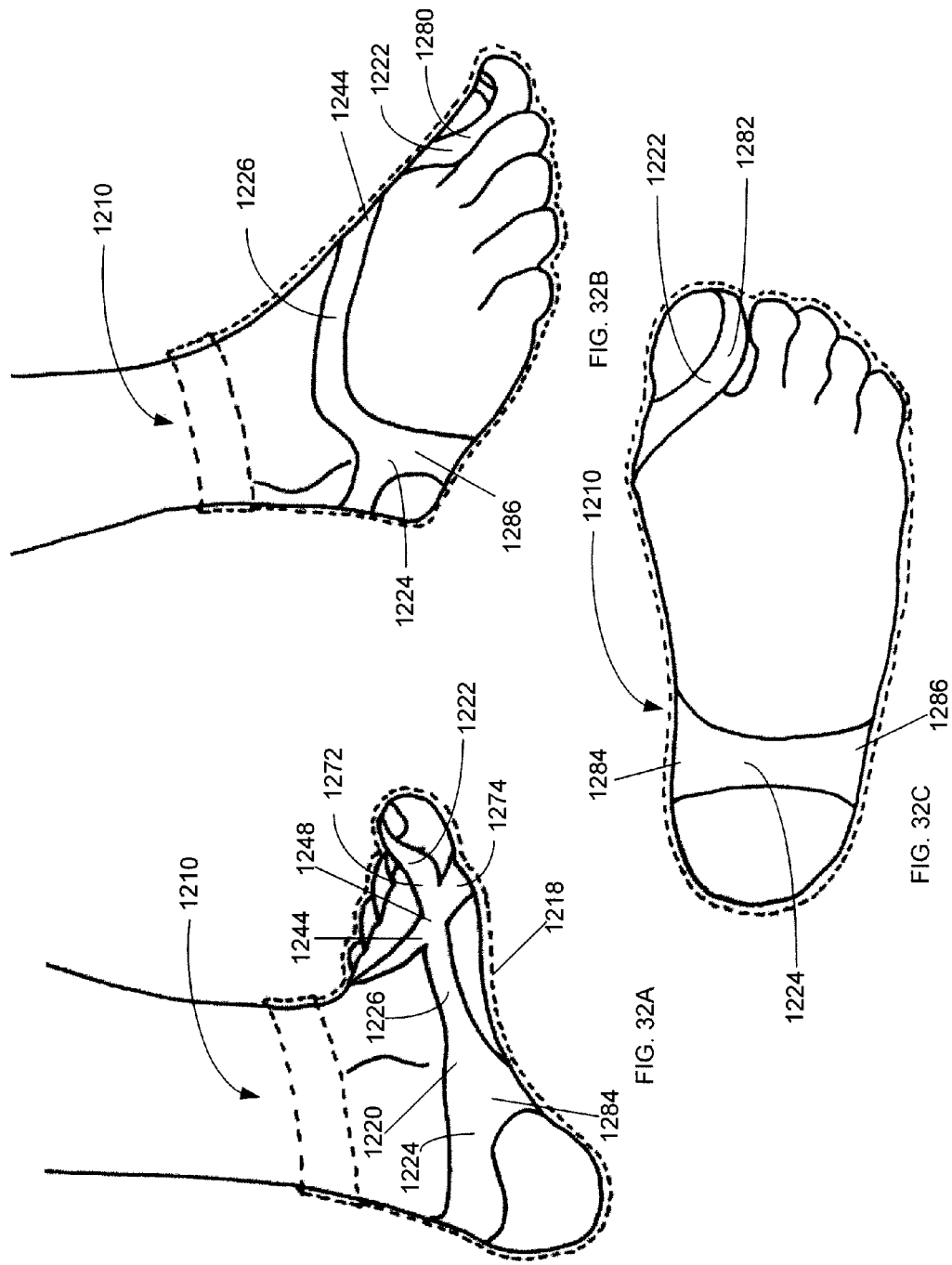

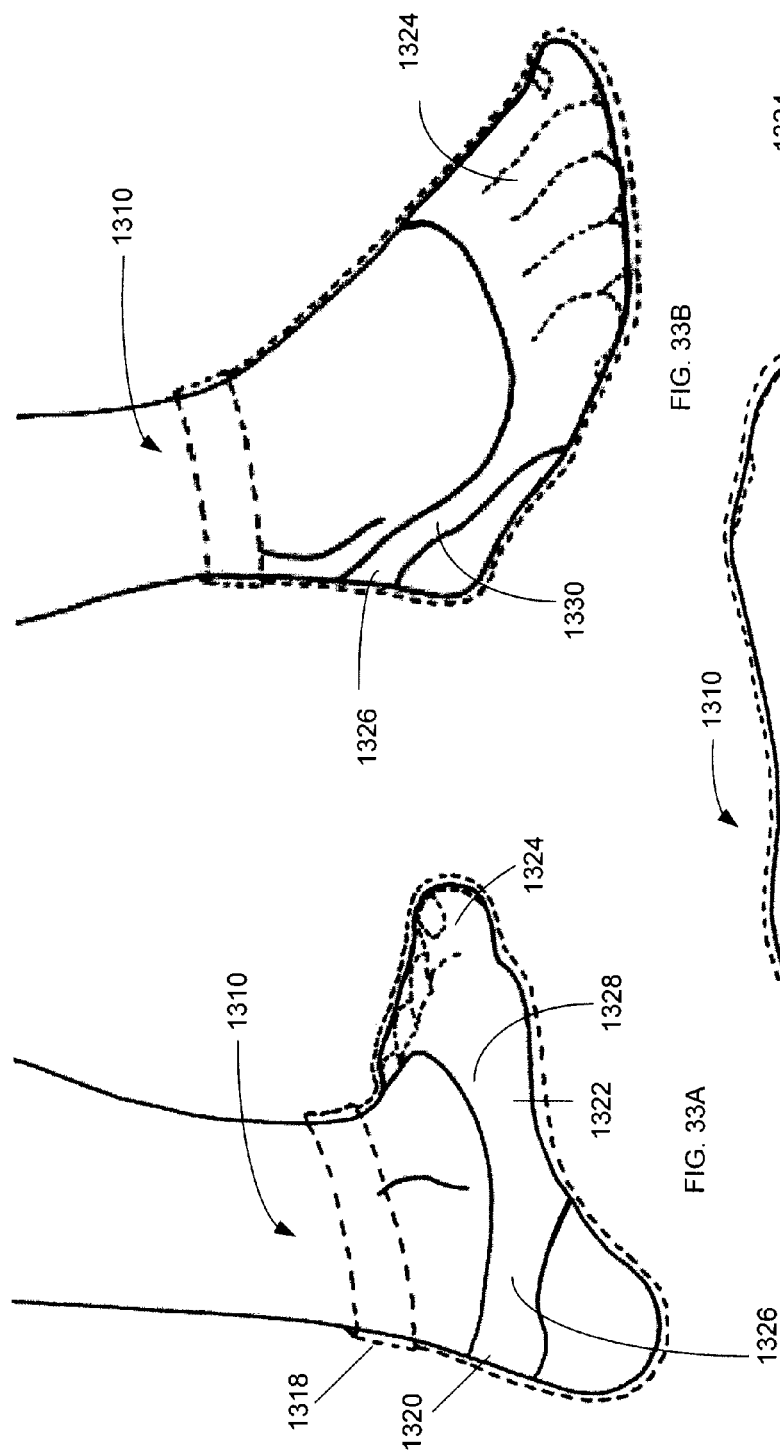
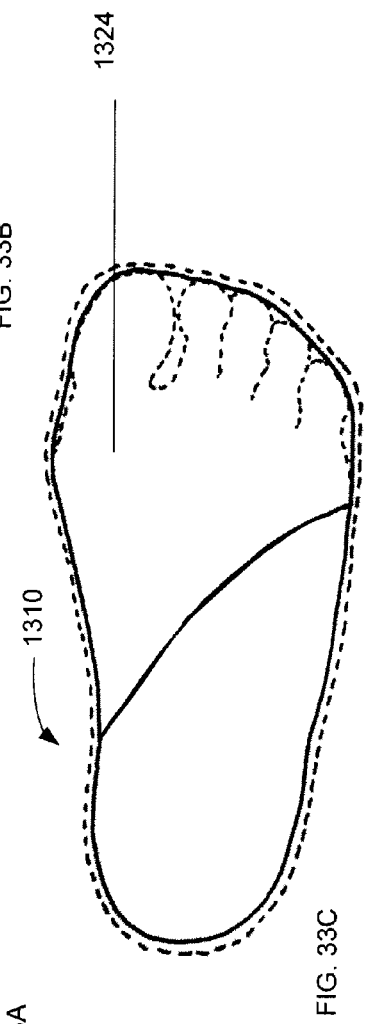

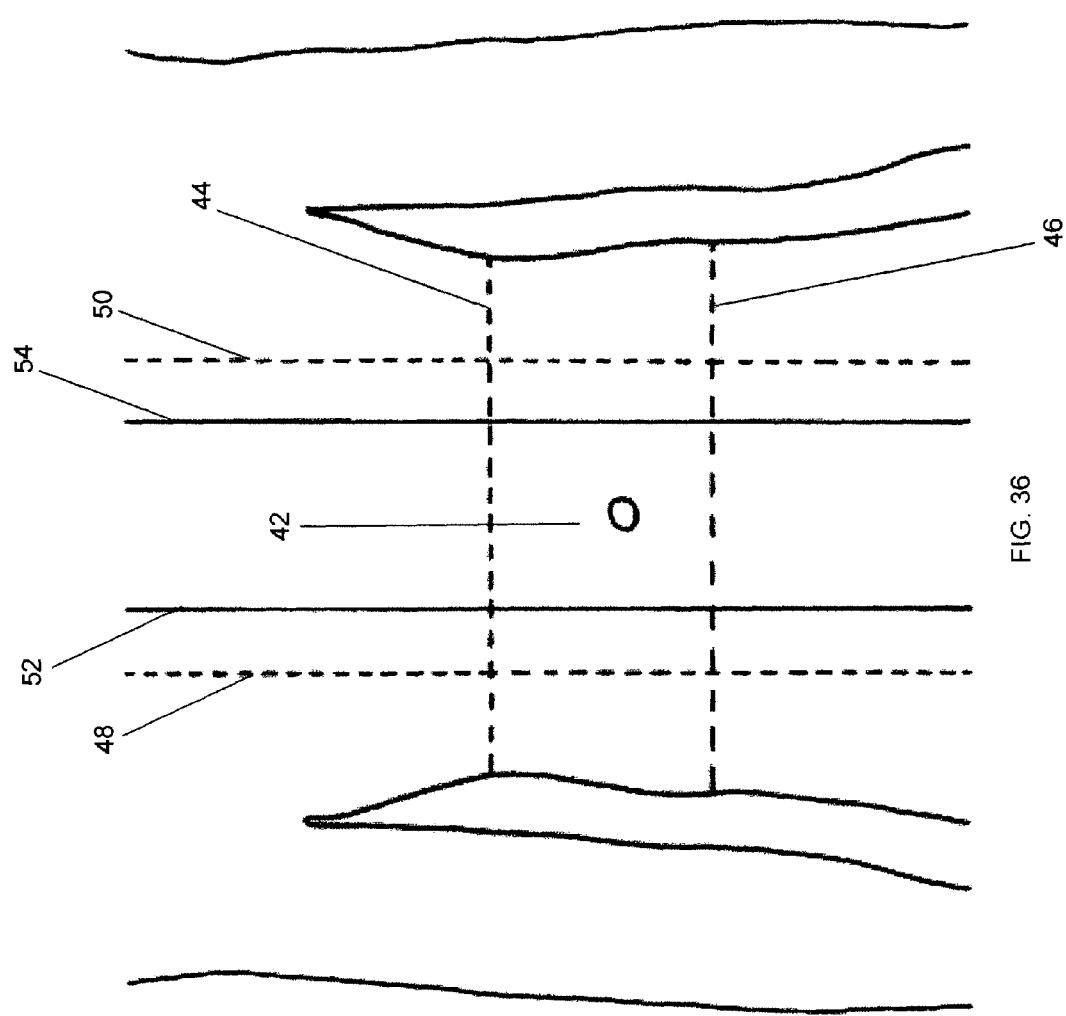

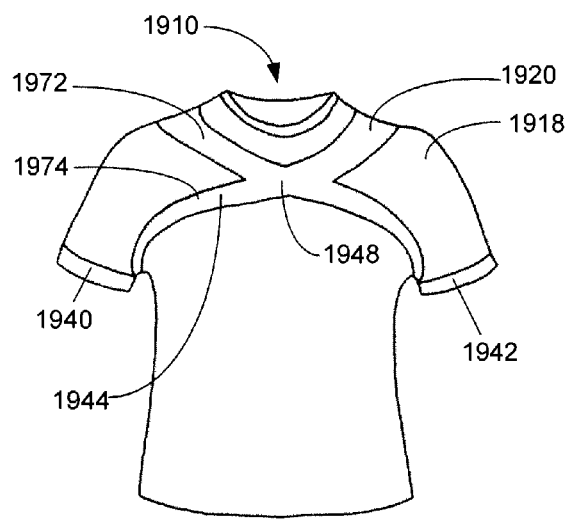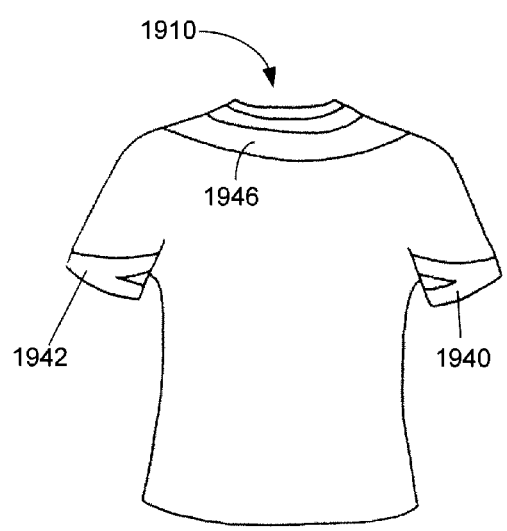
FIG. 42A  FIG. 42B
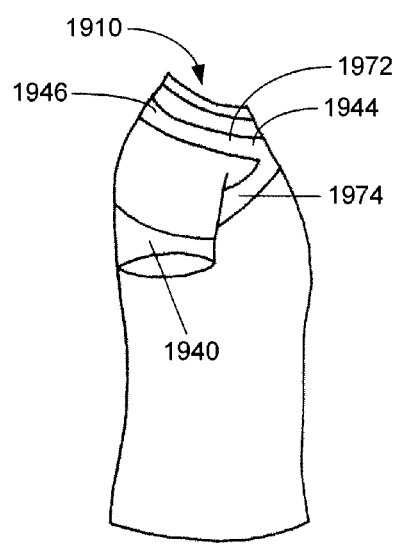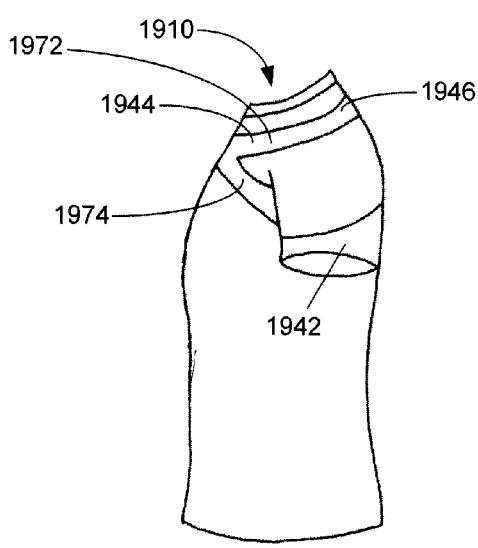
FIG. 42C  FIG. 42D

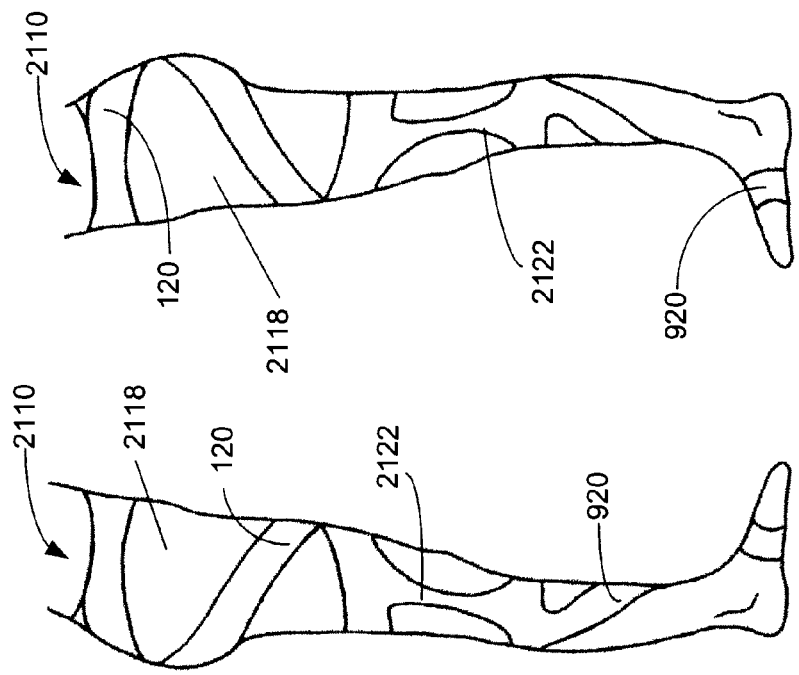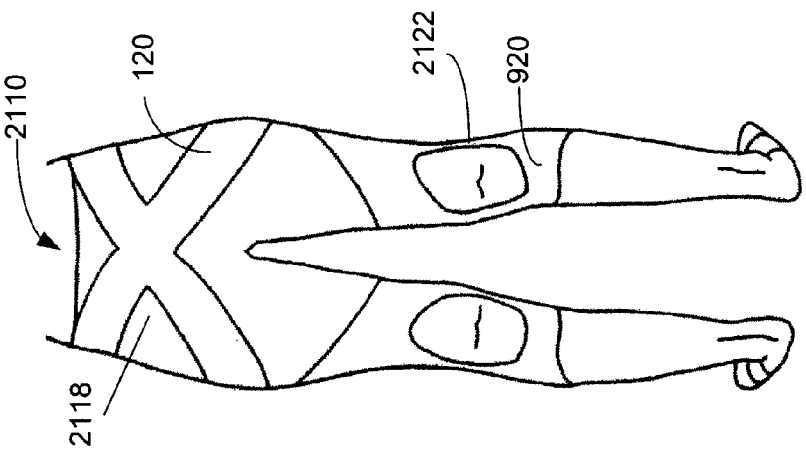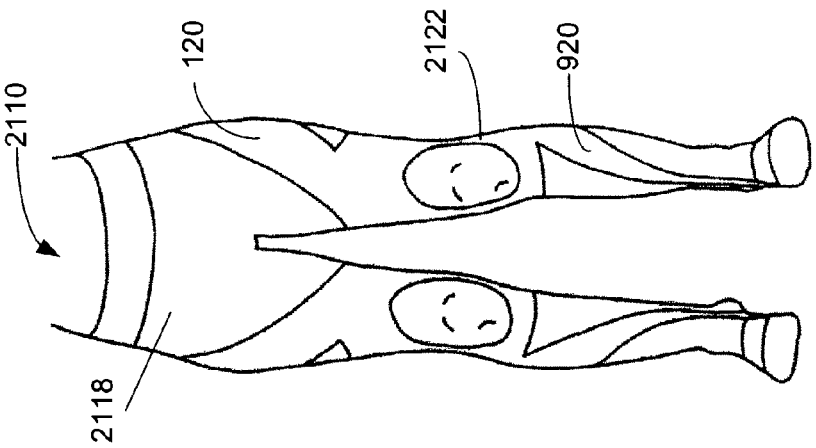

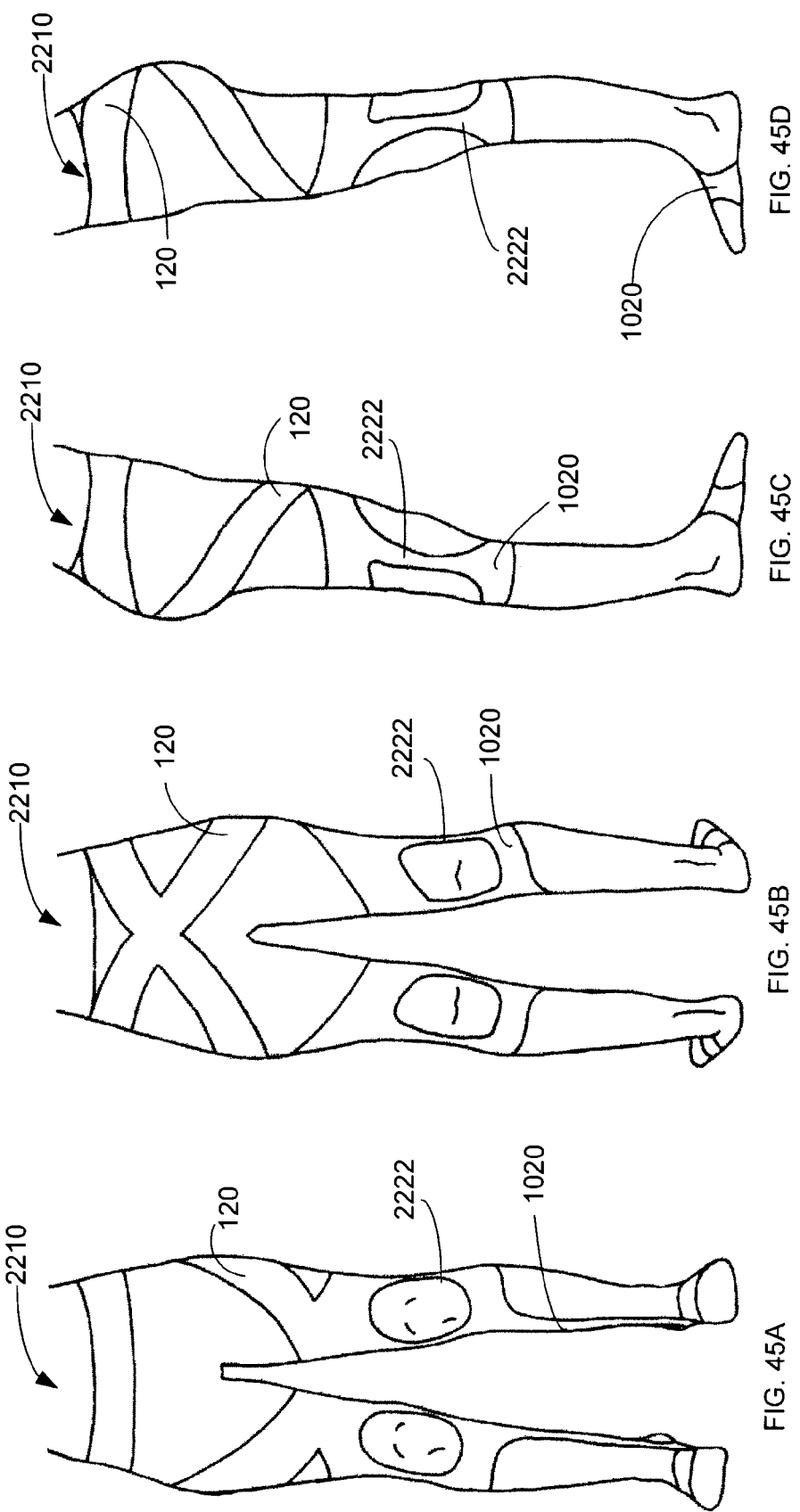

DEVICES FOR USE DURING PHYSICAL ACTIVITY

CROSS-REFERENCE TO RELATED PATENT APPLICATIONS

This application claims priority from U.S. Provisional Application No. 61/105,282, filed Oct. 14, 2008, incorporated herein by reference in its entirety.

BRIEF DESCRIPTION OF THE DRAWINGS

FIG. 4 is a front view of the exemplary embodiment of a short of FIG. 1A indicating the location of the wearer's iliac crest relative to the short.

FIG. 5 is a front view of exemplary embodiment of a short of FIG. 1A indicating an alternative location of the wearer's iliac crest relative to the short.

FIG. 6A is a front view of the exemplary embodiment of a short of FIG. 1A illustrating the position of the training region relative to the wearer's body.

FIG. 6B is a rear view of the exemplary embodiment of a short of FIG. 1A illustrating the position of the training region relative to the wearer's body.

FIG. 13A is a front perspective view of a person performing a jump drop landing wearing the exemplary embodiment of a short of FIG. 1A.

FIG. 13B is a rear perspective view of the person of FIG. 13A.

FIG. 13C is a front perspective view of a person performing a jump drop landing not wearing the exemplary embodiment of a short of FIG. 1A and exhibiting valgus knee collapse.

FIG. 16A is a front view of the exemplary embodiment of a short of FIG. 14A illustrating the position of the training region relative to the wearer's body.

FIG. 16B is a rear view of the exemplary embodiment of a short of FIG. 14A illustrating the position of the training region relative to the wearer's body.

FIG. 17A is a front view of a third exemplary embodiment of a garment shown as a short and illustrating the position of a training region relative to the wearer's body.

FIG. 17B is a rear view of the exemplary embodiment of a short of FIG. 17A illustrating the position of the training region relative to the wearer's body.

FIG. 20A is a front view of a fourth exemplary embodiment of a garment shown as a short illustrating the position of a training region relative to the wearer's body.

FIG. 20B is a rear view of the exemplary embodiment of a short of FIG. 20A illustrating the position of the training region relative to the wearer's body.

FIG. 22A is a front view of a sixth exemplary embodiment of a garment shown as a short illustrating the position of a training region relative to the wearer's body.

FIG. 22B is a rear view of the exemplary embodiment of a short of FIG. 22A illustrating the position of the training region relative to the wearer's body.

FIG. 24A is a side perspective view of an exemplary embodiment of a garment shown as a sock.

FIG. 24B is a side perspective view of the exemplary embodiment of a sock of FIG. 24A.

FIG. 24C is a bottom view of an exemplary embodiment of a sock of FIG. 24A.

FIG. 26A is a side perspective view of the exemplary embodiment of a sock shown in FIG. 24A illustrating the position of a training region relative to the wearer's body.

FIG. 26B is a side perspective view of the exemplary embodiment of a sock of FIG. 26A illustrating the position of the training region relative to the wearer's body.

FIG. 26C is a bottom view of an exemplary embodiment of a sock of FIG. 26A illustrating the position of the training region relative to the wearer's body.

FIG. 29A is a side perspective view of a second exemplary embodiment of a garment shown as a sock illustrating the position of a training region relative to the wearer's foot.

FIG. 29B is a side perspective view of the exemplary embodiment of a sock of FIG. 29A illustrating the position of the training region relative to the wearer's foot.

FIG. 29C is a bottom view of the exemplary embodiment of a sock of FIG. 29A illustrating the position of the training region relative to the wearer's foot.

FIG. 31A is a side perspective view of a fourth exemplary embodiment of a garment shown as a sock illustrating the position of a training region relative to the wearer's foot.

FIG. 31B is a side perspective view of the exemplary embodiment of a sock of FIG. 31A illustrating the position of the training region relative to the wearer's foot.

FIG. 31C is a bottom view of the exemplary embodiment of a sock of FIG. 31A illustrating the position of the training region relative to the wearer's foot.

FIG. 32A is a side perspective view of a fifth exemplary embodiment of a garment shown as a sock illustrating the position of a training region relative to the wearer's foot.

FIG. 32B is a side perspective view of the exemplary embodiment of a sock of FIG. 32A illustrating the position of the training region relative to the wearer's foot.

FIG. 32C is a bottom view of the exemplary embodiment of a sock of FIG. 32A illustrating the position of the training region relative to the wearer's foot.

FIG. 33A is a side perspective view of a sixth exemplary embodiment of a garment shown as a sock illustrating the position of a training region relative to the wearer's foot.

FIG. 33B is a side perspective view of the exemplary embodiment of a sock of FIG. 33A illustrating the position of the training region relative to the wearer's foot.

FIG. 33C is a bottom view of the exemplary embodiment of a sock of FIG. 33A illustrating the position of the training region relative to the wearer's foot.

FIG. 36 illustrates various anatomical features on an exemplary human torso.

FIG. 42A is a front perspective view of a sixth exemplary embodiment of a garment shown as a shirt illustrating the training region.

FIG. 42B is a rear perspective view of the exemplary embodiment a shirt of FIG. 42A illustrating the training region.

FIG. 42C is a right side perspective view of the exemplary embodiment of a shirt of FIG. 42A illustrating the training region.

FIG. 42D is a left side perspective view of the exemplary embodiment of a shirt of FIG. 42A illustrating the training region.

FIG. 44A is a front perspective view of an exemplary embodiment of a garment shown as a pant illustrating the training region.

FIG. 44B is a rear perspective view of the exemplary embodiment of a pant of FIG. 44A illustrating the training region.

FIG. 44C is a right side perspective view of the exemplary embodiment of a pant of FIG. 44A illustrating the training region.

FIG. 44D is a left side perspective view of the exemplary embodiment of a pant of FIG. 44A illustrating the training region.

FIG. 45A is a front perspective view of a second exemplary embodiment of a garment shown as a pant illustrating the training region.

FIG. 45B is a rear perspective view of the exemplary embodiment of a pant of FIG. 45A illustrating the training region.

FIG. 45C is a right side perspective view of the exemplary embodiment of a pant of FIG. 45A illustrating the training region.

FIG. 45D is a left side perspective view of the exemplary embodiment of a pant of FIG. 45A illustrating the training region.

FIG. 46A is a front perspective view of a third exemplary embodiment of a garment shown as a pant illustrating the training region.

FIG. 46B is a rear perspective view of the exemplary embodiment of a pant of FIG. 46A illustrating the training region.

FIG. 46C is a right side perspective view of the exemplary embodiment of a pant of FIG. 46A illustrating the training region.

FIG. 46D is a left side perspective view of the exemplary embodiment of a pant of FIG. 46A illustrating the training region.

FIG. 47 is a perspective view of an exemplary embodiment of a sensing device uncoupled from a garment.

FIG. 48 is a perspective view of the exemplary embodiment of a sensing device of FIG. 47 coupled to a garment.

DETAILED DESCRIPTION

Referring generally to the FIGURES, a device intended for use in physical activities is shown as a garment 10 having an integrated biofeedback device (see, e.g., FIGS. 1A-1D illustrating an exemplary embodiment of garment 10 shown as short 110, discussed in detail below). Exhibiting sub-optimal biomechanic positions increases a person's risk of injury and impairs their performance of physical activities (e.g., athletic activities, maintaining a desirable posture, rehabilitative activities, etc.). The biofeedback device of the garment both senses and corrects sub-optimal biomechanic position. When a wearer (i.e., a person wearing a garment 10) demonstrates sub-optimal biomechanic position, the biofeedback device responds by providing feedback that indicates to the wearer that their biomechanic position is sub-optimal and that indicates to the wearer how to adjust their body towards a more optimal biomechanic position in order to achieve optimal biomechanic motion. The feedback provided is related to (e.g., is substantially proportional to) the magnitude of the correction required for the wearer to achieve an optimal biomechanic motion. In this manner, garment 10 reduces a wearer's risk of injury and improves their performance (e.g., making the wearer more efficient, etc.). Further, garment 10 may be used effectively in place of a trainer because of the corrective nature of the feedback.

"Physical activities" as used herein is intended to include both static and dynamic activities. For example, a device as disclosed herein can address the substantially static postural alignment of the wearer's torso, or can address a wearer's movement or dynamic posture during any number of dynamic activities (e.g., walking, stretching, playing sports, rehabilitative activities, etc). Further, as used herein, a "biomechanic position" can be a static position or a dynamic position (e.g., motions, movement, etc.), and a "posture" can be a static posture or a dynamic posture.

Figure 2:
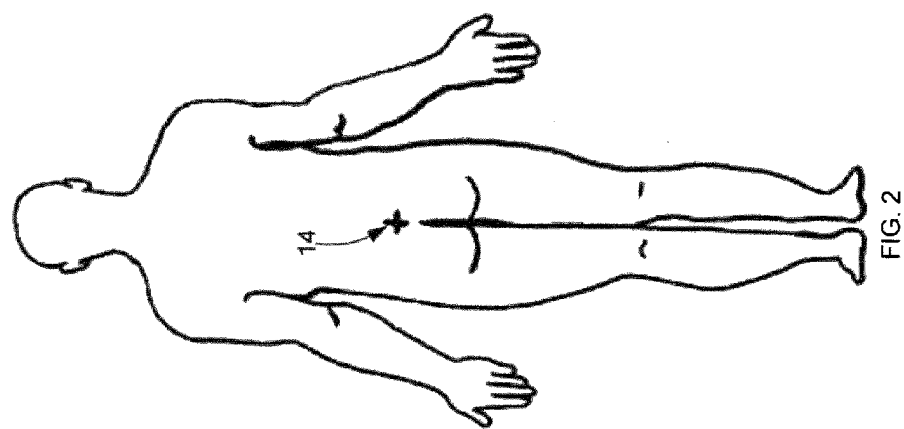
FIG. 2 illustrates the location of the center of gravity on an exemplary human body.
Figure 6D:
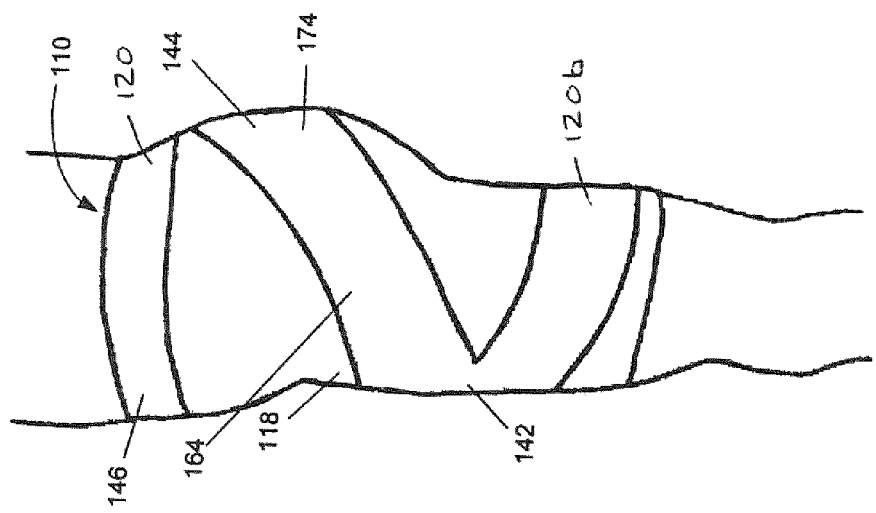
FIG. 6D is a left side view of the exemplary embodiment of a short of FIG. 1A illustrating the position of the training region relative to the wearer's body.
Figure 6C:
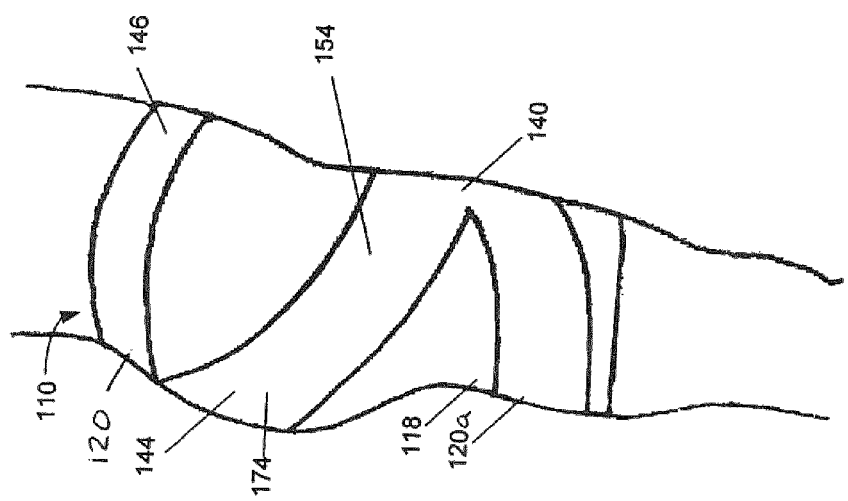
FIG. 6C is a right side view of the exemplary embodiment of a short of FIG. 1A illustrating the position of the training region relative to the wearer's body.

"Optimal" biomechanic motion is related to optimal posture and optimal biodynamic posture. Optimal posture is the position of the body or portions of the body that requires a minimum amount of energy to maintain a mechanically efficient function of the joints and muscles. Optimal postural alignment is characterized by the line of gravity falling through the center of most joint axes in the body, evenly distributing a person's weight throughout the body's joint structures. The line of gravity is defined as the imaginary straight line passing though the body's center of gravity 14 (see, FIG. 2, illustrating the center of gravity 14 on an exemplary body). Dynamic posture is the ability of a person to maintain an optimal instantaneous axis of rotation or line of gravity in any combination of movement planes at any time in space. Dynamic posture is important because it is related to the ability of a person to produce force. Each biomechanic motion is a series of dynamic postures. Successful movement is generally determined by the ease of transition from each posture to the next and the continual maintenance of the body's equilibrium or balance.

A person's risk of injury increases when the person's biomechanic motion includes sub-optimal dynamic postures. Each dynamic posture during movement is a momentary alignment of body portions or segments. If one body segment or portion (e.g., "link") in the kinetic chain is out of sync, there is potential for a performance error or injury. For example, when body segments or portions are not optimally aligned, a person's weight is not evenly distributed throughout their body. An uneven weight distribution can create extra torque or force (e.g., sheer force, compressive force, etc.) on the body, causing portions of the body (e.g., segments, joints, bones, limbs, etc.) to fail. When the segments and/or portions of a person's body are aligned, the person typically has better balance, better agility, better coordination, and is more powerful. It should be noted, more generally, that any sub-optimal posture (static or dynamic) increases a person's risk of injury for substantially the same reasons discussed above.

For the purposes of this disclosure, body segments are portions of the body defined generally between two joints. It should be noted that body segments do not operate independently; the movement of one body segment often results in the movement of another. Also for the purposes of this disclosure, a body portion is any part or combination of parts of the body including, body segments, joints, muscles, tendons, organs, etc.

A person's performance also suffers when their biomechanic motion includes sub-optimal dynamic postures because, all else being equal, performing a physical activity with sub-optimal biomechanic motion is typically less efficient than performing a physical activity with optimal biomechanic motion. A person performing a given activity with sub-optimal biomechanic motion expends more energy than when performing that same activity with optimal biomechanic motion. When a person performs a physical activity with sub-optimal biomechanic motion, the person moves in a more energy intensive manner to overcome the series of sub-optimal or poor postures that make up or are included in the movement than the person would when performing the same physical activity with optimal biomechanic motion. Further, the person is typically fatigued sooner and unable to recover as quickly from physical exertion because more energy than is necessary is expended.

According to an exemplary embodiment of garment 10, the feedback provided by the biofeedback device of the garment is a plurality of sensory cues in the form of forces. These feedback forces activate the wearer's skin mechanoreceptors and engage the wearer's proprioceptive response and neuromuscular system, causing the wearer of garment 10 to adjust (e.g., correct, improve, etc.) their biomechanic motion. Proprioception is a person's awareness of their postural alignment, movement, equilibrium, and position, as well as the person's awareness of where the various parts of their body are in relation to each other while the neuromuscular system invokes the muscles and nervous system to work together to achieve movement. The proprioceptive process utilizes proprioceptors. Proprioceptors are sensory receptors in a person's body that respond to joint movement (kinesthesia) and joint position (joint position sense), but do not typically contribute to conscious sensation. These sensory receptors mediating proprioception are found throughout a person's body, (e.g., in the skin, muscles, joints, ligaments, tendons, etc.). Accordingly, sensory receptors (e.g., proprioceptors) in the wearer's body sense the forces provided by the biofeedback device, sending information to the wearer's brain. The wearer's brain processes this information rapidly, substantially without the wearer realizing it. In response, the wearer's brain activates their neuromuscular system, moving the muscles according to the stimulus provided by the feedback forces. Generally, this responsive movement (e.g., adjustment, etc.) of the person's body occurs subconsciously.

According to an exemplary embodiment, the feedback provided by the biofeedback device integrated with garment 10 may be provided other than in the form of a feedback force. For example, the feedback may be audible, visual, sensory (other than feedback forces), or operable through other of the wearer's senses. According to some exemplary embodiments, the feedback may be in the form of a feedback force in combination with other forms of feedback (e.g., a feedback force in combination with audible feedback, the feedback forces as discussed above in combination with electrical signals, etc.). Combinations of feedback forms may be used to further reinforce optimal biomechanic motion by acting through numerous sensory pathways. Humans have five basic senses by which to receive information; touch, sight, hearing, taste, and smell. The tactile sensory system, while central to proprioception, is just one of the sensory inputs that can be used to stabilize a person's body during a physical activity. The auditory and visual sensory systems also contribute to stabilizing the body. Accordingly, optimal biomechanic motion may be reinforced by incorporating multiple sensory inputs into the biofeedback device. In some exemplary embodiments, auditory signals may be used to provide feedback in addition to the feedback forces by varying the frequency, pitch, or amplitude or any combination of frequency, pitch or amplitude in response to and/or proportional to the magnitude of a postural misalignment. In some exemplary embodiments, visual cues may also be used in addition to the feedback forces. For example, stress-strain induced color changing materials may be incorporated into a garment to provide a color based response (e.g., a change in the color, a change in color intensity, etc.) that corresponds to the magnitude of the misalignment. According to still other exemplary embodiments, audible and visual cues may be used in combination.

People performing physical activities are often unaware that their biomechanic motion is sub-optimal. The feedback provided by the biofeedback device indicates to a wearer of garment 10 performing a physical activity that their biomechanic motion is sub-optimal. Sub-optimal biomechanic motion may result from numerous factors, including, but not limited to, poor training, lack of training, weak musculature, biomechanic abnormalities, overuse, fatigue, combinations thereof, etc. According to an exemplary embodiment, the feedback provided by garment 10 is substantially proportional to the magnitude of the adjustment required for the wearer's body to achieve an optimal biomechanic motion. Generally, as the wearer moves farther from an optimal biomechanic motion, the feedback intensifies. Also, as the wearer corrects or adjusts their body's alignment and movement, moving toward an optimal biomechanic motion, the intensity of the feedback decreases.

The feedback provided by the biofeedback device is further configured to indicate to the wearer performing a physical activity how to adjust one or more of their body portions in order to achieve a more optimal biomechanic position. According to one exemplary embodiment, the resultant feedback forces provided by the biofeedback device are sensed (i.e., felt, acknowledged, etc.) at locations along the wearer's body substantially corresponding to portions of the wearer's body that are sub-optimally aligned. The resultant feedback force sensed at each of these locations has a direction and a magnitude. The magnitude of the force at a given location on the wearer's body is substantially proportional to the magnitude of the adjustment for that location that will bring one or more body portions of the wearer towards a more optimal biomechanic position. The direction of the force at a given location on the wearer's body substantially corresponds to the direction of the desired adjustment corresponding to the magnitude of the adjustment for that location that will bring one or more body portions of the wearer towards a more optimal biomechanic position. It follows that the biofeedback device provides little to no feedback to the wearer when the wearer's biomechanic position is or is near optimal. Stated otherwise, the wearer receives substantially no feedback indicating their position is sub-optimal when the wearer's position is optimal. Further, the farther the wearer's biomechanic motion is from optimal, the more intense the feedback (e.g., the magnitude of the feedback force increases). As a wearer's body moves from a sub-optimal position towards a more optimal biomechanic position, the feedback response decreases (e.g., the magnitude of the feedback force decreases). When utilizing the device disclosed herein as intended, the wearer cannot discontinue or decrease the feedback response unless the wearer adjusts their biomechanic position so that it is closer to optimal.

The wearer can substantially achieve optimal biomechanic motion by moving each location of their body a distance corresponding to the magnitude of the sensed force in the direction of the resultant feedback force. The resultant feedback forces do not force the person's body into alignment (e.g., move the person's body for them); rather, the feedback forces are a form of sensory cues. The wearer's body responds to these sensory cues substantially automatically (e.g., subconsciously) through a proprioceptive response and neuromuscular response. Thus, at each dynamic posture during a biomechanic motion, the resultant feedback forces instruct the wearer how to adjust or correct their dynamic posture to achieve optimal biomechanic motion.

Garment 10 is configured to provide proprioceptive training with repeated use. As discussed above, the proprioceptive sense typically operates subconsciously; however, the proprioceptive sense may be enhanced with training. When the proprioceptive sense is enhanced through activities "working" the proprioceptive sense, a person may become more consciously aware of their movements and the information their body is receiving from their proprioceptors. Garment 10 "works" the proprioceptive sense, and, accordingly, may be utilized to enhance the wearer's proprioceptive sense.

Garment 10 is further configured to provide for neuromuscular training with repeated use. Neuromuscular training enhances neuromuscular control (e.g., neuro-muscular facilitation, kinesthetic awareness, muscle memory, etc.). Neuromuscular control is the unconscious control of a person's movements and muscles by their brain stem. Neuromuscular control is fashioned over time with repetition of a given set of motor skills (e.g., associated with a given physical activity). For neuromuscular training to be effective (e.g., for the training to enhance neuromuscular control) it is important that the person performing a physical activity receive feedback regarding their posture throughout the physical activity to reinforce the desired performance of the set of motor skills associated with that physical activity. As a person reinforces the set of motor skills, the neural system may learn those motor skills to the degree that a person no longer needs to think about them (e.g., the motor skills become substantially automatic) or no longer needs to think about them as much. In this way, a person wearing garment 10 who is repeatedly directed towards optimal biomechanic motion for a given physical activity may eventually perform the physical activity with optimal biomechanic motion substantially automatically (e.g., without needing to think about how to perform the physical activity with optimal biomechanic motion). That is, the wearer can develop "good" biomechanic motion habits that maximize movement efficiency while minimizing undesirable stress and force on muscles, limbs, joints, and other portions of the wearer's body. As the wearer develops "good" habits, "bad" habits preexisting the "good" habits are replaced. Neuromuscular training has been successfully used to optimize a person's movements resulting in enhanced agility, strength, and game performance. Thus, by providing proprioceptive and neuromuscular training, garment 10 can provide training without the need for a coach or trainer.

Figure 1A:
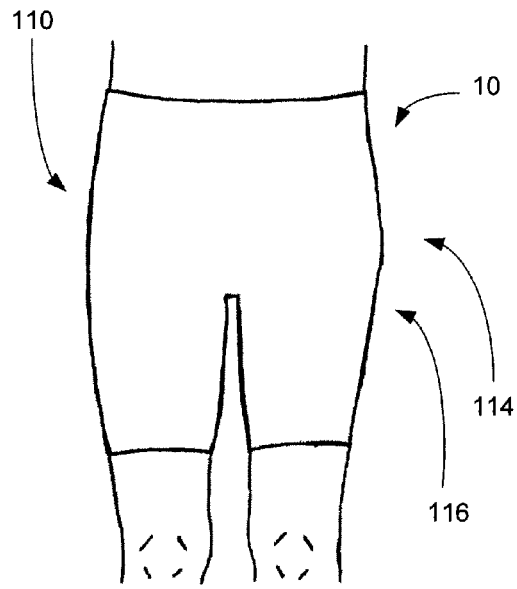
FIG. 1A is front view an exemplary embodiment of a garment shown as a short.
Figure 1B:
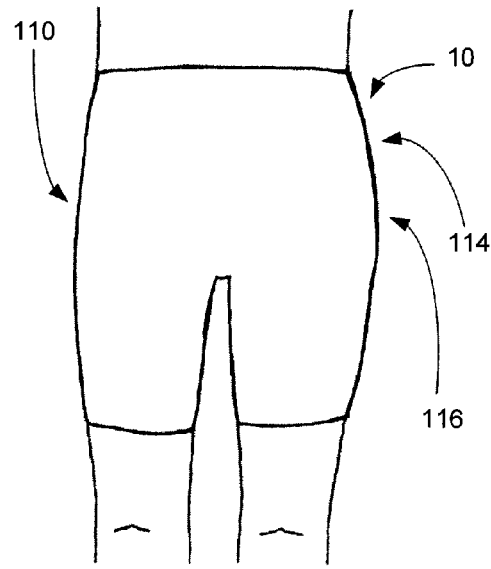
FIG. 1B is a rear view of the exemplary embodiment of a short of FIG. 1A.
Figure 1C:
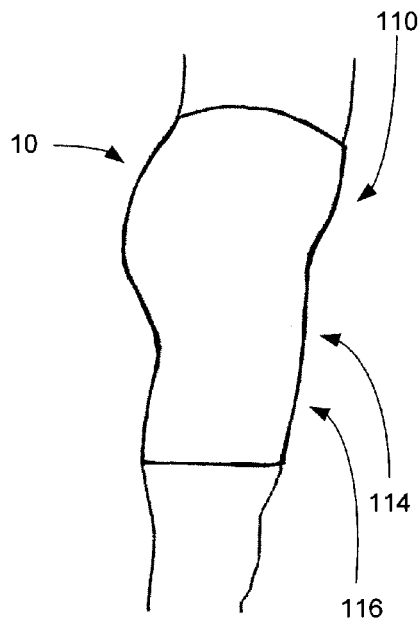
FIG. 1C is a right side view of the exemplary embodiment of a short of FIG. 1A.
Figure 1D:
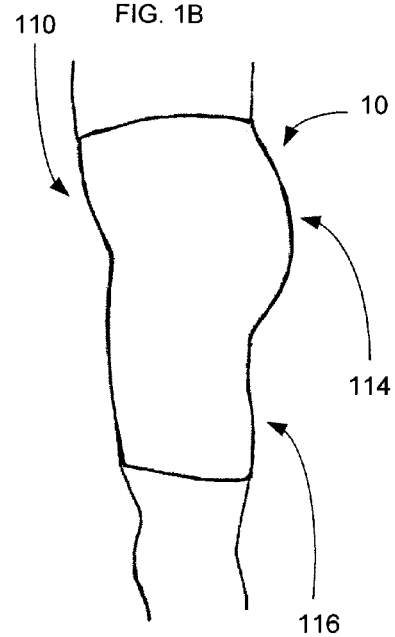
FIG. 1D is a left side view of the exemplary embodiment of a short of FIG. 1A.
Figure 3:
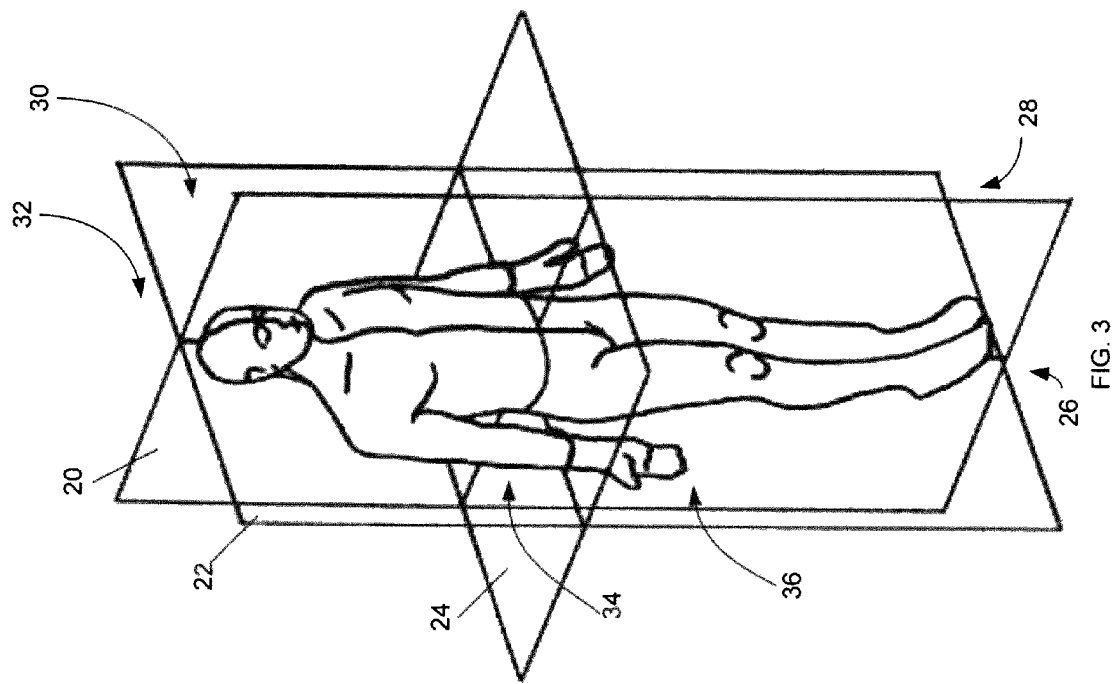
FIG. 3 illustrates various anatomical planes on an exemplary human body.

For the purposes of this discussion, the naming of the human anatomy is generally associated with the standard anatomical position. Referring to FIG. 3, the human body is shown having three anatomical planes defined therethrough, a midsagittal plane 20, a midcoronal plane 22, and a transverse plane 24. Midsagittal plane 20 is an imaginary vertical plane that divides the human body into a right portion or right lateral side 26 and a left portion or left lateral side 28. Midcoronal plane 22 is an imaginary vertical plane that divides the body into an anterior or front side 30 and a posterior or rear side 32. Transverse plane 24 is an imaginary horizontal plane that divides the body into a cranial or head portion 34 and a caudal or tail portion 36. Caudal portion 36 includes a person's lower extremities.

EXEMPLARY SHORT EMBODIMENTS

Referring to FIGS. 1A-1D, garment 10 is shown as a short 110 including an integrated biofeedback device 114 having a tensioning system 116 according to an exemplary embodiment. Short 110 is configured to provide for optimal biomechanic motion of the lower extremities of the wearer's body during performance of a physical activity. Feedback generated by tensioning system 116 of biofeedback device 114 indicates to the wearer that their biomechanic position is sub-optimal and instructs the wearer how to adjust toward optimal biomechanic position, wherein their lower extremities are optimally aligned. In this manner, short 110 is configured to optimize lower extremity function, including, but not limited to, speed, agility, hopping, jumping, landing, balance, stability, strength, reaction time, and kicking skills.

In an exemplary embodiment, short 110 may be used during physical activities where people demonstrate valgus knee collapse (e.g., squats, jumping and landing exercises, etc.). The feedback provided by biofeedback device 114 of short 110 instructs the wearer to move their knees away from a valgus position or posture toward a more optimal dynamic "knee-over-toe" posture. In the knee-over-toe posture, the knee joint and the foot joint, and the hip joint and the foot are substantially optimally aligned. It should be noted that short 110 may be used to address lower extremity alignment issues other than valgus knee collapse.

Referring to FIGS. 4 and 5, short 110 includes a torso portion 110a with a torso or top opening 124, a first leg portion 111 having a first leg opening 126 and a second leg portion 113 having a second leg opening 128 according to an exemplary embodiment. Top opening 124 is provided to enable a wearer to position short 110 substantially about the wearer's torso. Top opening 124 is generally disposed at or above the wearer's iliac crest 40 when short 110 is positioned about the wearer's body. Referring to FIG. 4, top opening 124 of short 110 is shown disposed a first distance above the wearer's iliac crest. Referring to FIG. 5, top opening 124 of short 110 is shown disposed just above the iliac crest 40. Top opening 124 in FIG. 5 is shown closer to the iliac crest 40 (though, still above) than top opening 124 shown in FIG. 4. According to other exemplary embodiments, the top opening of short 110 may be disposed at, above, or below the wearer's iliac crest.

First opening 126 and second opening 128 are configured to allow the wearer's legs to pass at least partially therethrough during positioning of short 110 about the wearer's body according to an exemplary embodiment. First opening 126 and second opening 128 are shown substantially encircling each of the wearer's legs at a location about wearer's thigh substantially above the wearer's knee joint. Though, according to other exemplary embodiments, first opening 126 and second opening 128 may substantially encircle each of the wearer's legs at substantially any location therealong.

Referring to FIGS. 6A-6D, short 110 further includes a garment region 118 substantially interconnected with a first training region 120 according to an exemplary embodiment. Tensioning system 116 includes first training region 120. Tensioning system 116 may further be considered to include garment region 118 in part or in whole.

Short 110 is substantially maintained in a desired position relative to the wearer's body. In the exemplary embodiment shown, short 110 is configured to be tight to the wearer's body. In combination with other factors (e.g., the size of the short), the elasticity of garment region 118 (i.e., garment region elasticity) is such that it is tight to (e.g., snug, in close proximity to, in substantially constant physical contact with, etc.) the wearer's body, but is also sufficiently elastic to not substantially interfere with the operation of tensioning system 116. The elasticity of training region 120 (i.e., training region elasticity) is also such that it is tight to the wearer's body (e.g., snug, in close proximity to, in substantially constant physical contact with, etc.), helping to enable tensioning system 116 of biofeedback device 114 to generate the sufficient sensory cues in response to the relative movements of portions of the wearer's lower extremities. In some exemplary embodiments, one or more portions of short 110 may be configured to have an elasticity lower than at least some portions of the short surrounding it in order to further help maintain one or more portions of the short in place. In some exemplary embodiments, the materials of garment region 118 and training region 120 are elastomeric materials (e.g., fabrics containing elastomeric fibers such as spandex, rubber, etc.). In other exemplary embodiments, the material of the garment region and/or the training region materials may be in part or in whole non-elastomeric in nature (e.g., the fabric itself is created (e.g., woven or knitted) in such a way as to enable the fabric to stretch or elongate when a force is applied). In still other exemplary embodiments, the garment region is not tight to the wearer's body and the training region is alone sufficient to maintain the short in the desired position relative to the wearer's body.

Training region 120 is configured to provide sensory cues to the sensory receptors (e.g., in the skin) that disseminate information to the central nervous system (CNS) resulting in a proprioceptive and neuromuscular response. The proprioceptive and neuromuscular response is elicited at least partially as a consequence of training region 120 stretching the skin, and, as a result, information on the position of the corresponding body portion is provided to the wearer's brain through their skin sensory receptors. The proprioceptive and neuromuscular response may further be at least partially attributable to the sensory receptors of other portions of the wearer's body (e.g., the muscles, tendons, joints, etc.).

The elasticity of garment region 118 is greater than the elasticity of training region 120 according to an exemplary embodiment. Throughout the body, there is considerable variability in the sensitivity of these skin and other sensory receptors (e.g., proprioception receptors). The relative differences in elasticity between garment region 118 and training region 120 are configured to be discernable to each body portion in contact therewith and to provide a sensible (e.g., detectable, etc.) resultant feedback. In this way, the wearer's body is able to respond to the resultant feedback and identify portions of their body that need to be adjusted in order to achieve an optimal biomechanic position. In some exemplary embodiments, the relative differences in elasticity between the garment region and the training region may differ based upon the body portion to which that portion of garment 10 corresponds and/or based on the suboptimal biomechanic motion being addressed. In other exemplary embodiments, the positioning of the garment region and the training region may be switched. For example, the element shown as 120 in FIGS. 6A-6D may be the garment region (rather than the training region) and the element shown as 118 in FIGS. 6A-6D may be the training region (rather than the garment region).

The feedback forces provided by biofeedback devices 114 are generated substantially due to stretching (e.g., strain, elongation, etc.) of training region 120 as a result of the wearer being in a sub-optimal position wherein the one or more of the wearer's body portions are misaligned according to an exemplary embodiment. Under the same applied force, garment region 118 stretches (e.g., is displaced, etc.) a greater length than training region 120 (e.g., in the direction of an applied force). The body's ability to differentiate between the elasticities within each region is significant because of the need to activate the sensory receptors. Sensory receptors are excited by forces applied in any number of manners, including, but not limited to, one or more of a horizontal force, skin depression, a vertical force, skin stretch, etc. The ability to differentiate (e.g., discriminate, tell apart, distinguish, etc.) this sensory information varies with the magnitude of the forces applied to the skin. Although non-linear, the sensory receptor response generally increases as larger forces are applied to the skin, providing an increased neuromuscular response.

Short 110 may be configured to provide stronger or weaker resultant feedback forces by adjusting the construct of garment 10 and the materials that make up garment region 118 and training region 120. The elasticity of training region 120 is dependent on the elasticity of its component material elements and their arrangement. Each region may include a single layer, multiple layers, one or more stratums, etc. Also, the way materials are combined and/or interconnected may affect the resultant feedback force. In one exemplary embodiment of a garment 10, each region and its component strata substantially follow Hooke's Law of Elasticity. For example, where the exemplary embodiment of a garment 10 has a layered construction, the spring constant of each region is substantially equal to the sum of the individual spring constants of each layer making up that region, and where the exemplary embodiment of a garment 10 has a serial construction, the reciprocal spring constant of each region is substantially equal to the sum of the reciprocal spring constants of the serially interconnected materials. In another exemplary embodiment, each region and its component strata may not substantially follow Hooke's Law of elasticity. In another exemplary embodiment, one or more regions and/or its component strata may follow Hooke's Law of elasticity, while others do not. According to other exemplary embodiments, the materials making up the garment may be combined (e.g., interconnected, integrated, etc.) in series, in parallel, or a combination of both.

Figure 7A:
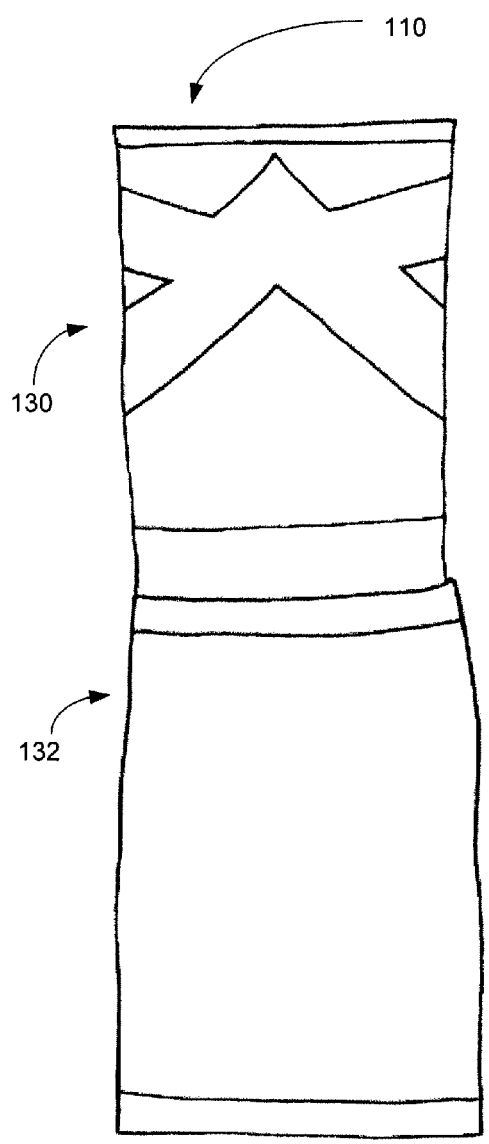
FIG. 7A is a front view of the exemplary embodiment of a short of FIG. 1A during construction.
Figure 7B:
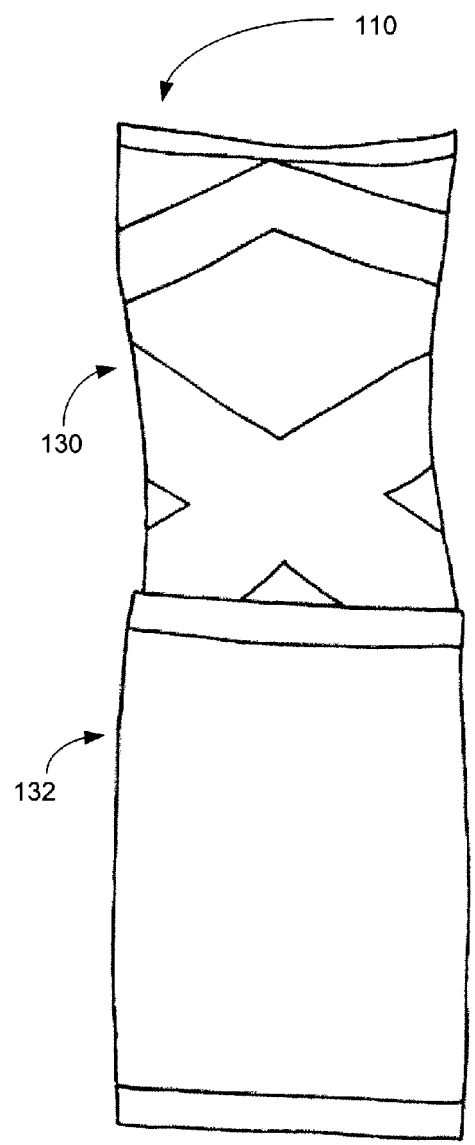
FIG. 7B is a rear view of the exemplary embodiment of a short of FIG. 1A during construction.
Figure 7C:
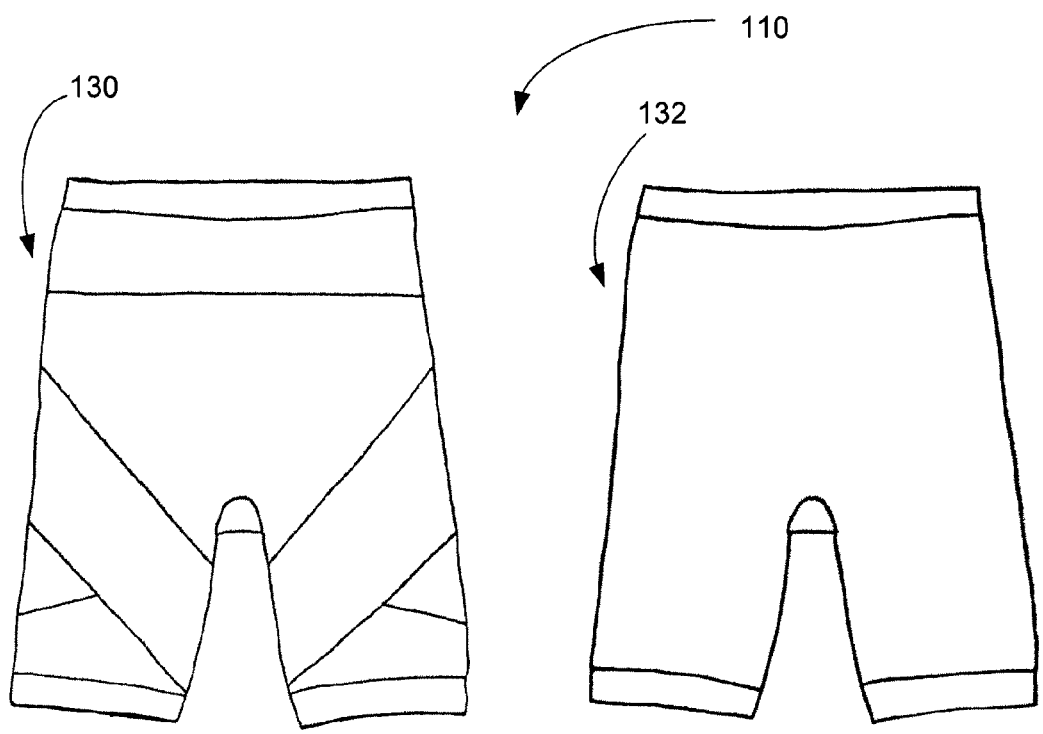
FIG. 7C is a front view of the inside and the outside of the exemplary embodiment of a short of FIG. 1A.
Figure 7D:
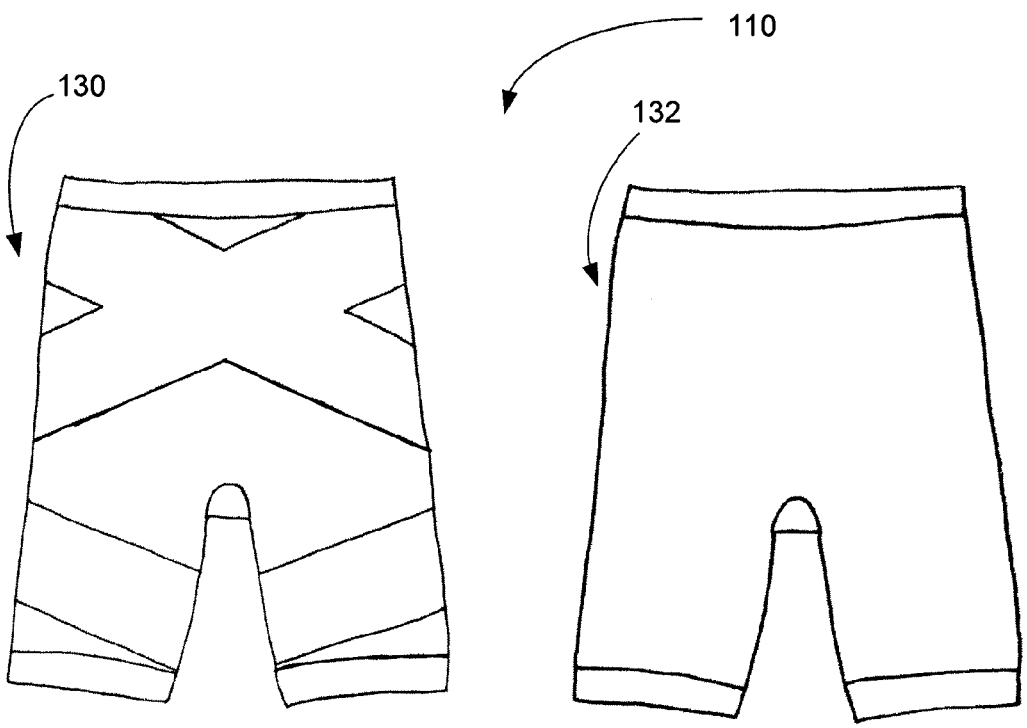
FIG. 7D is a rear view of the inside and the outside of the exemplary embodiment of a garment of FIG. 1A.

Referring to FIGS. 7A and 7B, short 110 is shown as a knit short having a first material element or stratum 130 and a second material element or stratum 132 created as part of a singular knit unit (e.g., on a circular knitter) according to an exemplary embodiment. Referring to FIGS. 7C and 7D, first stratum 130 is shown having a seamless knit construction according to the exemplary embodiment. The seamless knit construction is intended to help to improve the durability of the short (e.g., avoid seam failures) and to provide other aesthetic benefits. The arrangement of garment region 118 and training region 120 of short 110 is substantially defined by changes in the stitch of the first stratum to make the effective elasticity of the training region less than the effective elasticity of the garment region. Second stratum 132 is also shown having a seamless knit construction, but has substantially the same stitch throughout.

Referring to FIGS. 7C and 7D, after forming the knit tube, first stratum 130 is folded into second stratum 132 in a parallel arrangement and is coupled thereto. The legs of the short are formed by slitting the tube and then sewing them together along with additional material to form the crotch of the short (e.g., with a gusset). Accordingly, at any location on short 110, the elasticity of that location is a combination of the elasticity of first stratum 130 and second stratum 132. In another exemplary embodiment, the first stratum and the second stratum are knit separately and then sewn together. In other exemplary embodiments, short 110 may be constructed by other construction methods (e.g., non-seamless knitting, cut-and-sew, combinations thereof, etc.) and/or the layering, stitching, arrangement, and interconnection of materials may be varied.

According to an exemplary embodiment, short 110 may include first stratum 130, but not second stratum 132. In other exemplary embodiments, short 110 or other garment 10 may include one or more layers, stratums, material elements, etc., which may be part of the garment region, the training region, and/or independent thereof. For example, the garment region and training region may be formed by one stratum and the short may further include a second outer stratum that floats away from the wearer's body (e.g., being coupled to the first stratum only proximate the top opening of the short).

Training region 120 is shown generally having a consistent elasticity along its length and in most directions; though, in other exemplary embodiments, the effective elasticity and/or spring constant of the training region may vary along its length and/or at different portions. For example, a garment 10 may include more than two regions wherein each region may have a different elasticity/spring constant than every other region, or each region may have the same elasticity/spring constant as some regions and differ from other regions, etc.

Short 110 may be further configured to provide stronger or weaker resultant feedback forces by adjusting the sizing of short 110. Since the force exerted by an elastic material generally increases with the amount of displacement, the initial stretch of short 110 when placed about the wearer's body factors into the desired level of feedback. A smaller garment, when disposed on a wearer's body, generally provides a higher initial resultant feedback force as a consequence of starting higher along the stress-strain curve. A larger garment, when disposed on a wearer's body, provides a lower initial resultant force as a consequence of starting lower along the stress-strain curve.

According to an exemplary embodiment, the materials making up garment region 118 and training region 120 are all the same. According to another exemplary embodiment, the regions are made up of different materials or a different combinations of materials (e.g., materials may vary by layer, stratum, region, etc.). According to some exemplary embodiments, the materials used for short 110 may be configured to have other desirable characteristics that make short 110 particularly well-suited for physical activities (e.g., moisture wicking properties, etc.).

Referring back to FIGS. 6A-6D, training region 120 is shown including a plurality of portions that are substantially continuous and interconnected according to an exemplary embodiment. In this way, the portions of the training region 120 are configured to be responsive to stretch in other portions and to provide feedback.

In an exemplary embodiment, some portions of the training region are directly interconnected while others are interconnected via other portions of the training region. The portions of the training region that are directly interconnected and those that are indirectly interconnected may vary. In the exemplary embodiment shown, the various portions of training region 120 are knit into a common fabric. In other exemplary embodiments, these portions may be sewn together (side by side or on top of), combinations of sewn portions and knitted portions can be interconnected, etc.

Training region 120 is positioned relative to the wearer's body to substantially avoid inhibiting the wearer's motion and to avoid directly forcing or holding the wearer's joints in a given position and/or alignment (e.g., supporting a person's knee in a given position with a knee brace) according to the exemplary embodiment shown. For example, the training region does not cross directly over the wearer's joints (e.g., avoiding the femoral head of the wearer's hip joint).

Referring further to FIGS. 6A-6D, training region 120 is configured to be substantially symmetrical about the wearer's midsagittal plane 20 and includes a second training region 120a within the first leg portion shown as a first loop 140, a third training region 120b within the second leg portion shown as a second loop 142, a cross portion 144, and a front portion 146 according to an exemplary embodiment. The orientation and position of training region 120 relative to the wearer's body is such that feedback may be generated because of the relative alignment and movement of portions of the wearer's body targeted by short 110, whether the wearer's body is static or dynamic.

First loop 140 substantially encircles the wearer's thigh at their right lateral side 26 and second loop 142 substantially encircles the wearer's thigh at their left lateral side 28 according to an exemplary embodiment. First loop 140 is shown including an outer portion 154 disposed generally a greater distance from the wearer's midsagittal plane 20 than an inner portion 156. Inner portion 156 is disposed between the knee joint and the hip joint of the wearer's leg at their right lateral side. Outer portion 154 is disposed generally above inner portion 156 along midcoronal plane 22 of the wearer in a manner configured to avoid substantially interfering with the wearer's hip joint proximate the femoral head. In this way, short 110 substantially avoids hindering the wearer's movement by restraining or constraining the hip joint. The relative positioning of outer portion 154 and inner portion 156 is configured to help generate feedback from tensioning system 116 that instructs the wearer how to adjust their body to correct, for example, valgus knee collapse. First loop 140 further includes a first or front leg portion 158 and a second or rear leg portion 160. Front leg portion 158 is shown extending generally diagonally (e.g., is angled, etc.) across the front of the wearer's thigh between and partially including outer portion 154 and inner portion 156 (e.g., generally in front of the wearer's midcoronal plane 22). Rear leg portion 160 is shown extending generally across the rear of the wearer's thigh between inner portion 156 and outer portion 154 (e.g., generally rearward of the wearer's midcoronal plane 22).

Second loop 142 is the mirror image of first loop 140 about midsagittal plane 20. Second loop 142 includes an outer portion 164 disposed generally a greater distance from the wearer's midsagittal plane 20 than an inner portion 166 according to an exemplary embodiment. Inner portion 166 is shown disposed between the knee joint and the hip joint of the wearer's leg at their left lateral side. Outer portion 164 is disposed generally above inner portion 166 along midcoronal plane 22 of the wearer in a manner configured to avoid substantially interfering with the wearer's hip joint proximate the femoral head. In this way, short 110 substantially avoids hindering the wearer's movement by restraining or constraining the hip joint. As discussed with reference to first loop 140, the relative positioning of outer portion 164 and inner portion 166 is configured to help generate feedback from tensioning system 116. Second loop 142 further includes a front leg portion 168 and a back or rear leg portion 170. Front leg portion 168 extends generally diagonally (e.g., is angled, etc.) across the front of the wearer's thigh between outer portion 164 to inner portion 166 (e.g., generally in front of the wearer's midcoronal plane 22). Rear leg portion 170 is shown extending generally across the rear of the wearer's thigh between inner portion 166 to outer portion 164 (e.g., generally rearward of the wearer's midcoronal plane 22).

Referring further to FIGS. 6A-6D, cross portion 144 is shown disposed at the posterior side 32 of the wearer's body and includes an upper portion 172 and a lower portion 174 according to an exemplary embodiment. Cross portion 144 is configured to help establish and maintain the wearer's center of gravity and the symmetry of training region 120 of short 110. At the right lateral side of the wearer's body, lower portion 174 of cross portion 144 transitions to first loop 140 below the wearer's right lateral hip joint in a manner to avoid directly crossing over the femoral head of the wearer's left lateral hip joint. At the left lateral side of the wearer's body, lower portion 174 of cross portion 144 transitions to second loop 142 in a manner configured to avoid directly crossing over the femoral head of the wearer's left lateral hip joint.

Figure 8:
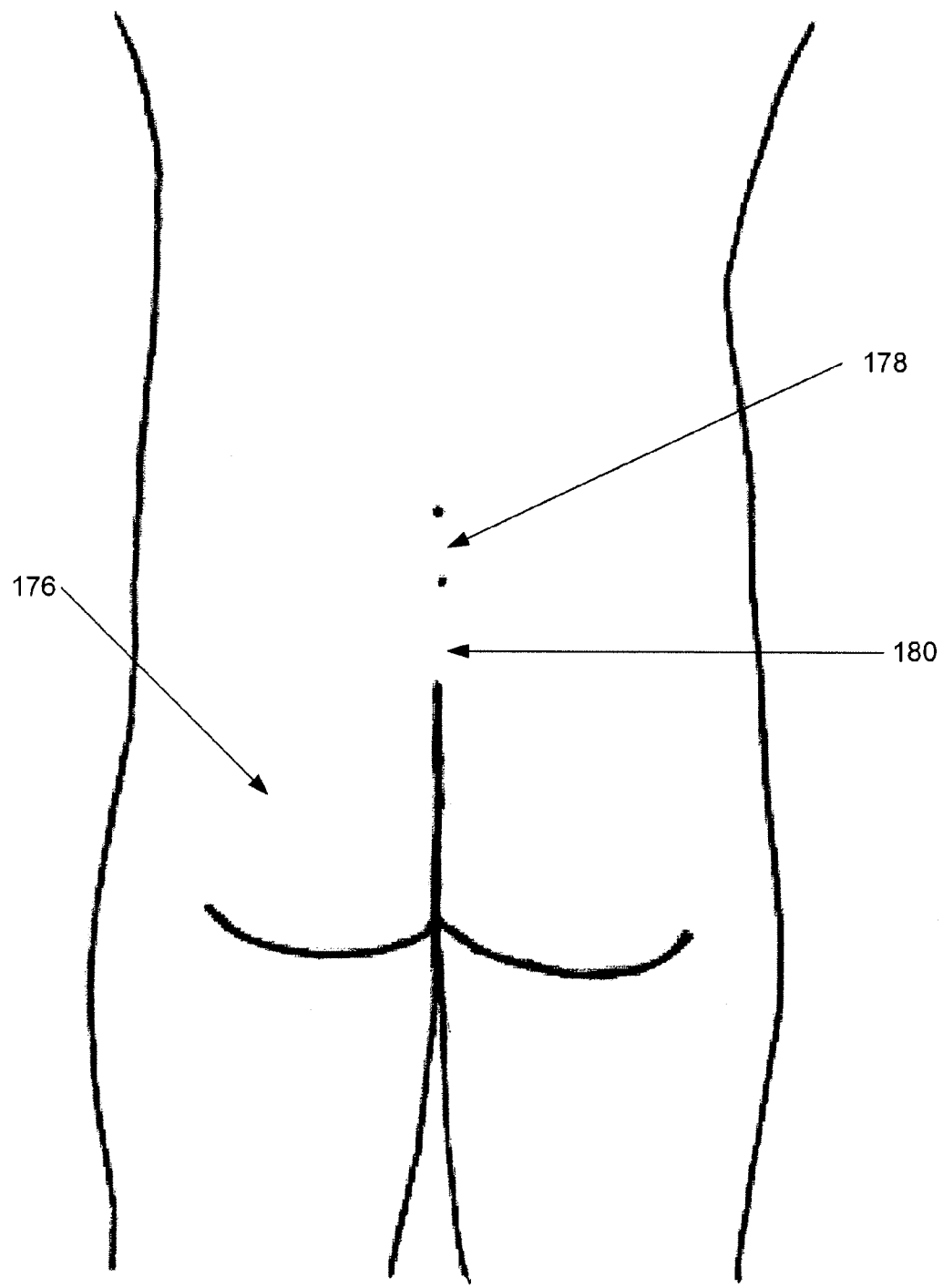
FIG. 8 is a rear view of an exemplary human body indicating various anatomical features.

Cross portion 144 is disposed relative to the wearer's body in a manner configured to help generate tension in training region 120 corresponding to the alignment/misalignment of the portions of the wearer's body targeted by short 110. Lower portion 174 of cross portion 144 of training region 120 extends downward and outward from a center 148 of cross portion 144 at both the left and right lateral sides of the wearer's body. At each side of the gluteus maximus, lower portion 174 of cross portion 144 of training region 120 is disposed over the gluteus maximus at its bending point (i.e., the largest point of the gluteus maximus) on that side and is tight thereto (see, e.g., FIG. 8 illustrating a bending point 176 of the gluteus maximus on an exemplary human body). By positioning lower portion 174 of cross portion 144 over the bending point of the gluteus maximus at the right side and the left side of midsagittal plane 20, greater tension is generated between the center 148 and inner portions 156, 166 of first loop 140 and second loop 142 because training region 120 is stretched over approximately the maximum straight line distance along the body from center 148 to inner portions 156, 166 of first loop 140 and second loop 142, respectively.

Referring further to FIGS. 6A-6D, front portion 146 is disposed generally at the front side 30 of the wearer's body, approximately opposite upper portion 172 of cross portion 144 according to an exemplary embodiment. Front portion 146 is configured to help maintain cross portion 144 in its desired position relative to the wearer's body and to generate tension within training region 120. Front portion 146 is shown disposed substantially across the wearer's waist, disposed partially above and partially below the wearer's iliac crest. Front portion 146 is shown extending downward below the iliac crest as it transitions to cross portion 144 in a manner configured to minimize the interference with the movement at the waist.

Front portion 146 extends laterally and symmetrical outward from the wearer's midsagittal plane 20 toward the left and right lateral sides of the wearer's body according to an exemplary embodiment. At the right lateral side 26 and the left lateral side 28 of the wearer's body, front portion 146 is shown transitioning to cross portion 144. Accordingly, tension generated between front portion 146 and center 148 helps provide at least partial counter-tension to the tension generated between center 148 and first and second loops 140, 142. In this way, tensioning training region 120 establishes a foundation for optimal lower extremity alignment by supporting proper balance maintaining the wearer's center of gravity 14 substantially over their base support.

Center 148 of cross portion 144 is shown disposed substantially in line with the wearer's center of gravity 14. Referring to FIGS. 2, 6B, and 8, the wearer's center of gravity 14 generally corresponds with or is proximate to the area between the wearer's L4-5 invertebral joint 178 and the sacrum 180. The sacrum (a.k.a., the tailbone) is a triangular bone that forms the base of the spinal column and is the keystone of the pelvis. The sacrum is joined with the lumbar spine at L5 forming the lumbosacral junction.

Training region 120 is positioned relative to the wearer's body so that various sub-optimal biomechanic positions cause stretch in training region 120 in a manner that generates a change in the tensile force, countering the stretch and resulting in a feedback response. It is the change in tensile force that substantially generates the sensory cue for the wearer to adjust towards optimal biomechanic motion, and the relative elasticities between garment region 118 and training region 120 that aid detectability of these sensory cues. Generally, substantially little or no feedback is sensed with minimal or small stretch/changes in the tensile force within training region 120 resulting from a wearer moving optimally. Feedback intensity increases with greater stretch/changes in tensile force within training region 120 resulting from a wearer moving sub-optimally.

The forces provided by training region 120 of biofeedback device 114 are generally opposing and proportional in magnitude to the forces generated in training region 120 when the wearer's posture is sub-optimal according to the exemplary embodiment shown. Stretching training region 120 creates tension therein. As discussed above, training region 120 has a training region elasticity. Elastic materials have relatively high and reversible elongation. That is, elastic materials are resilient and want to recover. Training region 120 recovers by releasing the tension generated therein and moving towards a more relaxed state (e.g., wherein training region experiences less stretch). Further, the recovery tendency of training region 120 is to go back in the direction it came. Training region 120, seeking to achieve a relaxed state, counters the forces causing it to stretch. These countering forces produced by training region 120 have a magnitude substantially proportional to and in a direction substantially opposite to the direction of the forces which are causing training region 120 to be stretched. When two portions of training region 120 are moved relative to each other away from a more relaxed position, the training region is stretched and the countering forces of training region 120 will seek to bring these portions into alignment.

Feedback produced by biofeedback device 114 provides instruction to the wearer to correct each dynamic posture to achieve/approach optimal biomechanic motion. The feedback provided by and from training region 120 indicates to the wearer both the magnitude and direction of the corrective adjustment to be made to achieve optimal biomechanic motion. Portions of training region 120 at or proximate to portions of the wearer's body that are sub-optimally aligned will produce feedback, and, accordingly, the feedback will be sensed at the corresponding portions of the wearer's body. Training region 120 is positioned relative to the wearer's body such that upon positioning short 110 about the body, the tensioning of training region 120 provides feedback corresponding to a neutral or optimal standing posture. As the wearer moves farther from an optimal biomechanic motion, the feedback intensifies (i.e., the magnitude of the feedback force increases). As the wearer adjusts their body, moving toward more optimal biomechanic motion, the intensity of the feedback decreases (i.e., the magnitude of the feedback force decreases).

Training region 120 is shown having a generally constant width according to an exemplary embodiment. The width of training region 120 is configured to avoid exerting discrete pressure on the wearer's body (e.g., the training region cutting into the wearer's skin at any one location or series of locations, etc.). Training region 120 has sufficient surface area to provide feedback to the wearer without cutting into the wearer's skin and/or causing the wearer to experience discomfort or pain. According to other exemplary embodiments, the width of the training region may vary along its length (e.g., the width of the training region may vary such that it is fanned, tapered, etc.).

For the purposes of discussion, an exemplary operation of short 110 wherein the wearer exhibits valgus knee collapse while performing an athletic activity will be discussed. It should be noted, however, that short 110 may provide for correction of sub-optimal positions of the wearer's lower extremities other than valgus knee collapse according to other exemplary operations.

Figure 10:
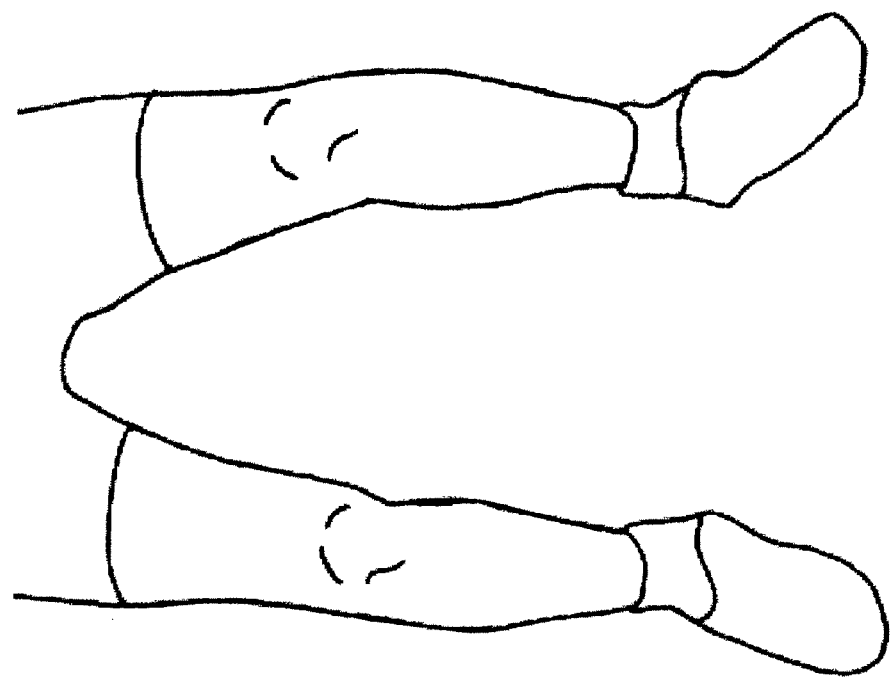
FIG. 10 is a front perspective view of an exemplary person demonstrating a knee protecting posture.
Figure 9:
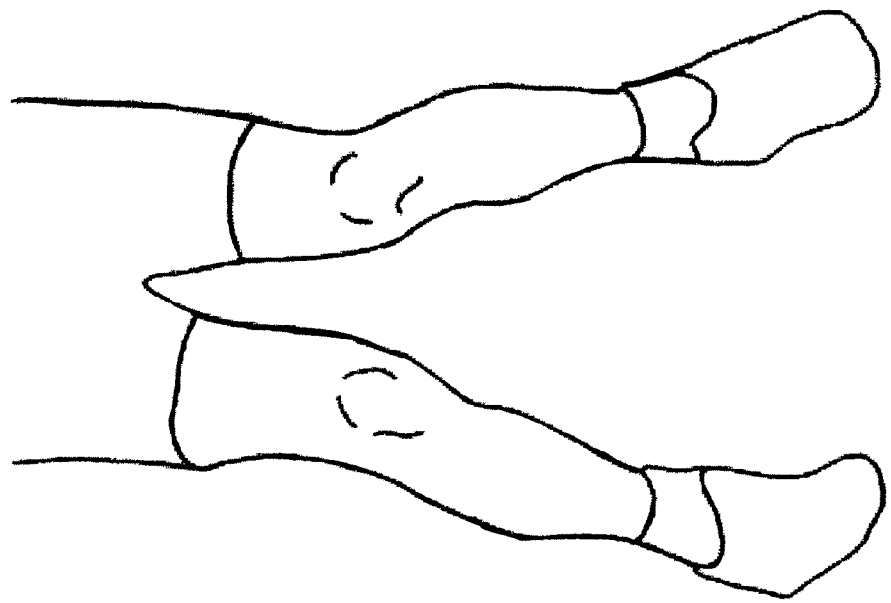
FIG. 9 is a front perspective view of an exemplary person exhibiting valgus knee collapse.

FIG. 9 illustrates a person exhibiting valgus knee collapse. A person exhibiting valgus knee collapse typically demonstrates internal rotation and lateral movement of their hips and knees toward their midsagittal plane 20. The person's knees are misaligned with their hips and ankles/toes. In this sub-optimal position, the person is off balance, uncentered, and places tremendous stress on their knee joint and ligaments. In contrast, FIG. 10 illustrates a person demonstrating a knee protecting posture, wherein their hips, knees, and toes are more optimally aligned. In this position, the person is substantially balanced and centered with minimal stress on the knee joint and ligaments.

There is an increased risk of anterior cruciate ligament (ACL) injuries when a person exhibits valgus knee collapse. These injuries are prevalent in sports involving jump/pivot movements such as soccer, basketball, and volleyball. Approximately seventy percent of ACL injuries are non-contact. More generally, ACL tears may result from any activity forcing the knee into hyperextension and/or internal rotation.

Figure 12:
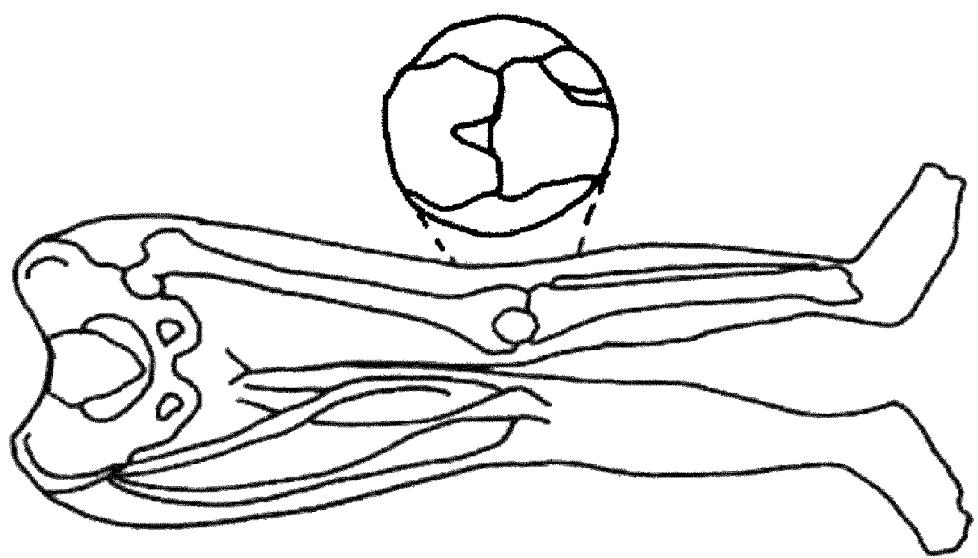
FIG. 12 is a front perspective view of the anatomy of the lower extremities of an exemplary female.
Figure 11:
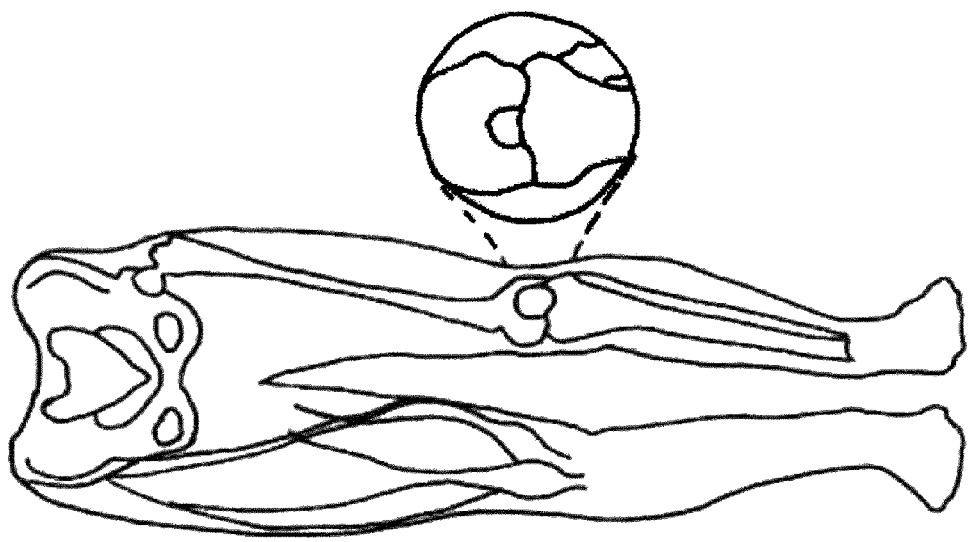
FIG. 11 is a front perspective view of the anatomy of the lower extremities of an exemplary male.
Figure 14A:
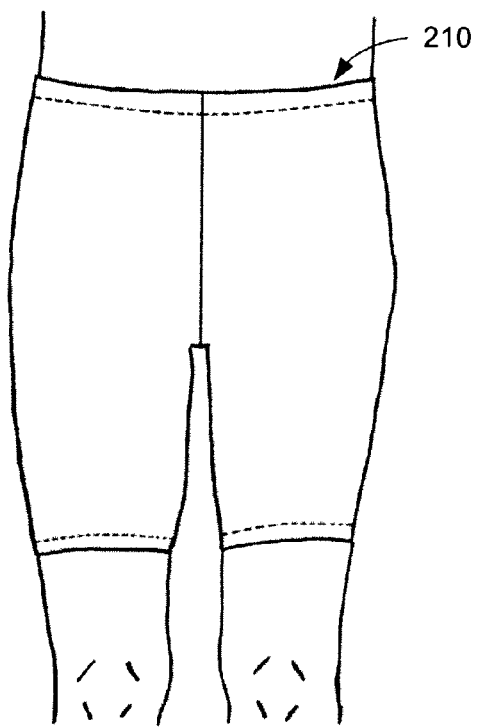
FIG. 14A is a front view of a second exemplary embodiment of a garment shown as a short.
Figure 14B:
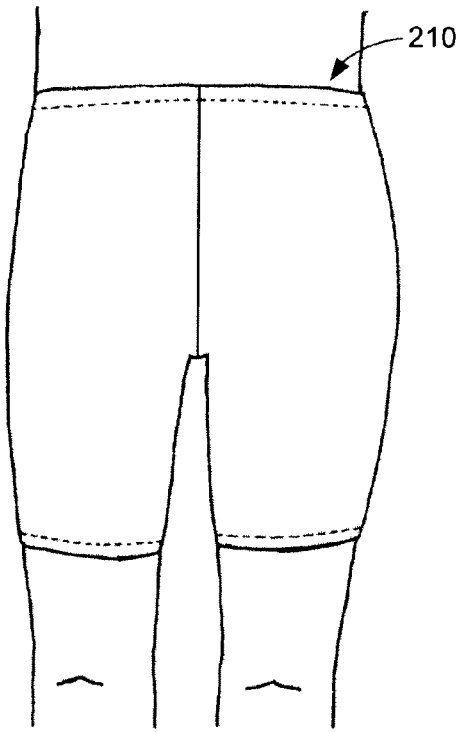
FIG. 14B is a rear view of the exemplary embodiment of a short of FIG. 14A.
Figure 14C:
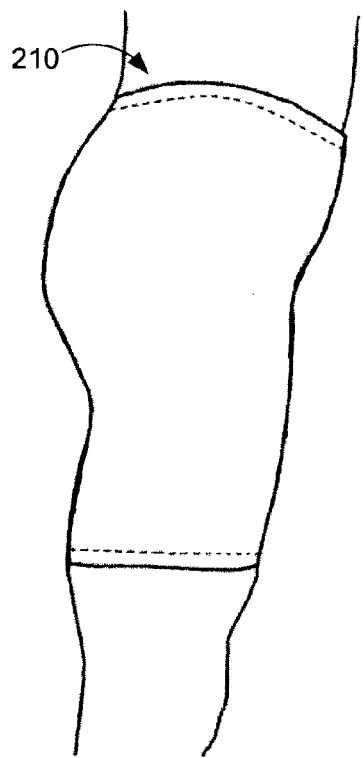
FIG. 14C is a right side view of the exemplary embodiment of a short of FIG. 14A.
Figure 14D:
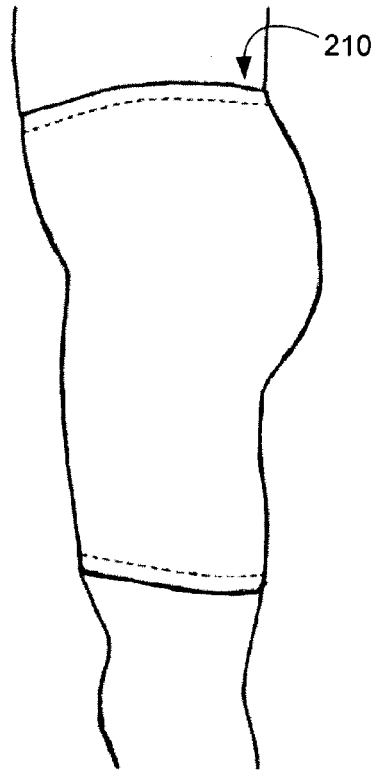
FIG. 14D is a left side view of the exemplary embodiment of a short of FIG. 14A.

Women are more likely (having four to six times incidence rate) to suffer an ACL injury than men. FIG. 11 shows the anatomy of the lower extremities of a man. FIG. 12 shows the anatomy of the lower extremities of a woman. The anatomical differences between men and women are believed to contribute to women being more likely to exhibit valgus knee collapse resulting in an ACL injury. Compared to men, women have a wider pelvis; their hips are more flexible and have more rotation; their femur is tilted forward more at the top and is angled more toward the knee; their lower leg is turned inward and angled more toward the knee, but there are forces pushing outward; they have less developed thigh muscles, making the knee more dependent on the ligaments for stability; they have increased flexibility and hyperextension in their joints; and they have a narrower notch in the femur where their smaller anterior cruciate ligament is attached. Although the exact mechanism for why women are more likely than men to suffer these injuries is unknown, one significant risk factor, valgus collapse along with an upright posture with minimal knee and hip flexion, has been associated with the poor athletic posture which makes all people more susceptible to ACL injuries.

Short 110 reduces the risk of injuries, such as ACL injuries, by correcting for the sub-optimal postures associated with valgus collapse. Short 110 provides feedback to a wearer exhibiting valgus collapse, indicating to the wearer (e.g., alerting them, drawing their attention to the fact that, etc.) that their biomechanic motion is sub-optimal. Short 110 further provides for correction of valgus knee collapse and the sub-optimal postures associated therewith by indicating to the wearer how to adjust their body to achieve optimal biomechanic motion.

FIGS. 13A and 13B provide a front view and rear view of a person wearing short 110 performing a drop jump landing according to an exemplary embodiment. It can be seen in FIGS. 13A and 13B that the person substantially exhibits knee-over-toe posture when wearing short 110. By way of comparison, FIG. 13C illustrates the person performing the same drop jump squat without short 110. In FIG. 13C, the person's knees exhibit valgus knee collapse (e.g., internal rotation and lateral movement of the knees toward the wearer's midsagittal plane 20) during the squatting phase of the drop jump landing. The arrows shown in FIGS. 13A and 13B highlight the correction provided by short 110. The arrows generally illustrate the magnitude and direction of the corrections to the biomechanic position of the person as shown in FIG. 13C provided by short 110 to achieve the more optimal postures shown in FIGS. 13A and 13B.

Referring back to FIG. 13A, biofeedback device 114 of short 110 is activated as soon as short 110 is positioned about the wearer's body. A drop jump landing is initiated by dropping from a platform, landing with bent knees into a squat (bending at the knees and the hips), and jumping vertically. As the wearer bends at their knees and their hips, their gluteus maximus is pushed outward from their posterior side 32. By way of example, and not by way of limitation, the right lateral side of the wearer's body will be discussed to further explain the operation of short 110. It should be noted that the operation of short 110 at the left lateral side of the wearer's body is substantially the same as at the right lateral side of the wearer's body.

As the wearer begins to exhibit valgus knee collapse, their right knee rotates inward and moves downward. Training region 120 is stretched from inner portion 156 to outer portion 154 along both front leg portion 158 and rear leg portion 160. Inner portion 156 is pulled downward and inward relative to center 148 of cross portion 144, stretching training region 120 generally downward and inward therebetween and therealong. Further, additional stretching of training region 120 from center 148 to outer portion 154 of first loop 140 occurs as the wearer's gluteus maximus is pushed outward from their posterior side 32.

Tensile forces are generated in training region 120 of biofeedback device 114 as a result of the stretch caused by the changing relative positions of the wearer's lower extremities and feedback forces are produced. The forces sensed at each location on the wearer's leg correspond to the sub-optimal alignment and the corresponding correction required to bring that location on the wearer's body into optimal alignment. The feedback force sensed at locations on the wearer's body that are sub-optimally aligned provide sensory cues to the wearer's brain via the proprioceptive receptors resulting in a neuromuscular response.

The wearer's body responds substantially subconsciously to the feedback forces via their proprioceptive sense. Proprioceptive neurons sense the forces at the locations of the wearer's body where the biofeedback device 114 provides feedback and communicates with the wearer's brain primarily via the dorsal spinocerebellar tract, to the cerebellum. The proprioceptive neurons signal (e.g., communicate, etc.) to the brain that adjustments to the relative position of portions of the wearer's body that are sub-optimally aligned are desirable. The proprioceptive neurons further signal to the brain the magnitude and direction of the desirable adjustments at the sub-optimally aligned locations on the wearer's body. The brain then signals to the wearer's muscles and ligaments to make these adjustments via the neuromuscular system. Collectively, the adjustment of each location along the wearer's body receiving and sensing a feedback force causes the wearer to adjust toward optimal dynamic motion substantially subconsciously.

The greater the stretch along the training region 120, the greater the feedback forces provided by training region 120. As discussed above, training region 120 is positioned and oriented relative to the wearer's body such that sub-optimal dynamic postures create greater stretch in training region 120. For example, were the wearer to be in a dynamic posture wherein the person exhibits more severe valgus knee collapse than that illustrated in FIG. 13C, there would be an increase in strain along training region 120 from center 148 to inner portion 156 of first loop 140 than when the wearer exhibits the dynamic posture shown in FIG. 13A, and, accordingly, the magnitude of the feedback forces provided at corresponding locations along the wearer's body would increase. Further, as the wearer begins to correct their valgus knee collapse, moving toward a knee protecting posture, there is a decrease in the stretch of training region 120 and the magnitude of the feedback forces decreases.

In the aggregate, the feedback forces provided by biofeedback device 114 of short 110 instruct the wearer to rotate and translate their knees and thighs outward (away from the midsagittal plane) to align the wearer's knees with their toes, nearing a knee-over-toe position that substantially aligns each thigh with the wearer's shoulders. Additionally, the tension created in cross portion 144 generates feedback forces indicating to the wearer to pull their gluteus maximus toward their front side. These adjustments not only align the body improving balance and centering the wearer's mass, but also increase the wearer's knee and hip flexion and side-to-side symmetry. In this posture, the wearer senses few to no feedback forces.

Short 110 may be used to train the wearer. With continued use of short 110 when performing a given physical activity, the wearer repeatedly senses and corrects their sub-optimal biomechanic motion. The wearer can assess whether or not their biomechanic motion has improved each time they perform a given physical activity by the feedback sensed and correction indicated. When the wearer has substantially optimal biomechanic motion, the wearer will sense substantially no feedback. If the wearer has sub-optimal biomechanic motion, the wearer will continue to receive the feedback until the wearer responds with corrective adjustments to the relative position of misaligned portions of their body; their brain will continue to tell their muscles to adjust. Over time, the wearer and their body will begin to move away from sub-optimal biomechanic motion habits toward optimal biomechanic motion habits. Further, the wearer will improve their neuromuscular control as their muscles and joints become familiar and strengthen in accordance the optimal dynamic posture and motion.

The symmetry of short 110 addresses total dynamic posture. Short 110 provides for correction of the left side and the right side of the wearer's body simultaneously. Thus, the wearer's right and left dexterity may be simultaneously improved. Were the short to be non-symmetrical, the uncorrected side or portion of the body may still have an increased risk of injury. For example, if the tensioning system of the short were to be positioned about the left side of the wearer's body but not the right, the right knee may demonstrate knee valgus or another sub-optimal biomechanic motion.

Tensioning system 116 may further be configured to be adjustable (i.e., the relative position, overall tension, etc., or combination thereof). For example, the relative position of one portion of the training region may be adjustable relative to another portion of the training region, as a result, providing an adjusted response to the sub-optimal biomechanic positions of the wearer. In one exemplary embodiment, the tensioning system may further include a fastening mechanism (e.g., Velcro) to provide tensioning adjustability providing for some customization of the magnitude of the feedback response.

It is worth noting that the angle of each portion of the training region (e.g., the first leg portion and the second leg portion) is not as significant as the placement of the training region portions relative to the relevant body portions (e.g., knee joints, the inner and outer portions of the thighs, the hip joints, etc.). Generally, the same or similar benefits can be achieved within a range of angles so long as the portions of the training region are positioned relative to the wearer's body in manner configured to provide for responsiveness of the training region to the targeted sub-optimal biomechanic positions of the wearer. It should be noted, however, changes to the angle and/or position of the training region may allow for flexibility/adjustability in the affects and benefits provided by short 110.

It should be noted that short 110 may provide corrective feedback in response to a number of different stimuli (i.e., sub-optimal dynamic postures or motions) in addition to valgus knee collapse.

FIGS. 14A-14D illustrate an alternative exemplary embodiment of short 110 constructed using a cut-and-sew method and shown as short 210.

Figure 15:
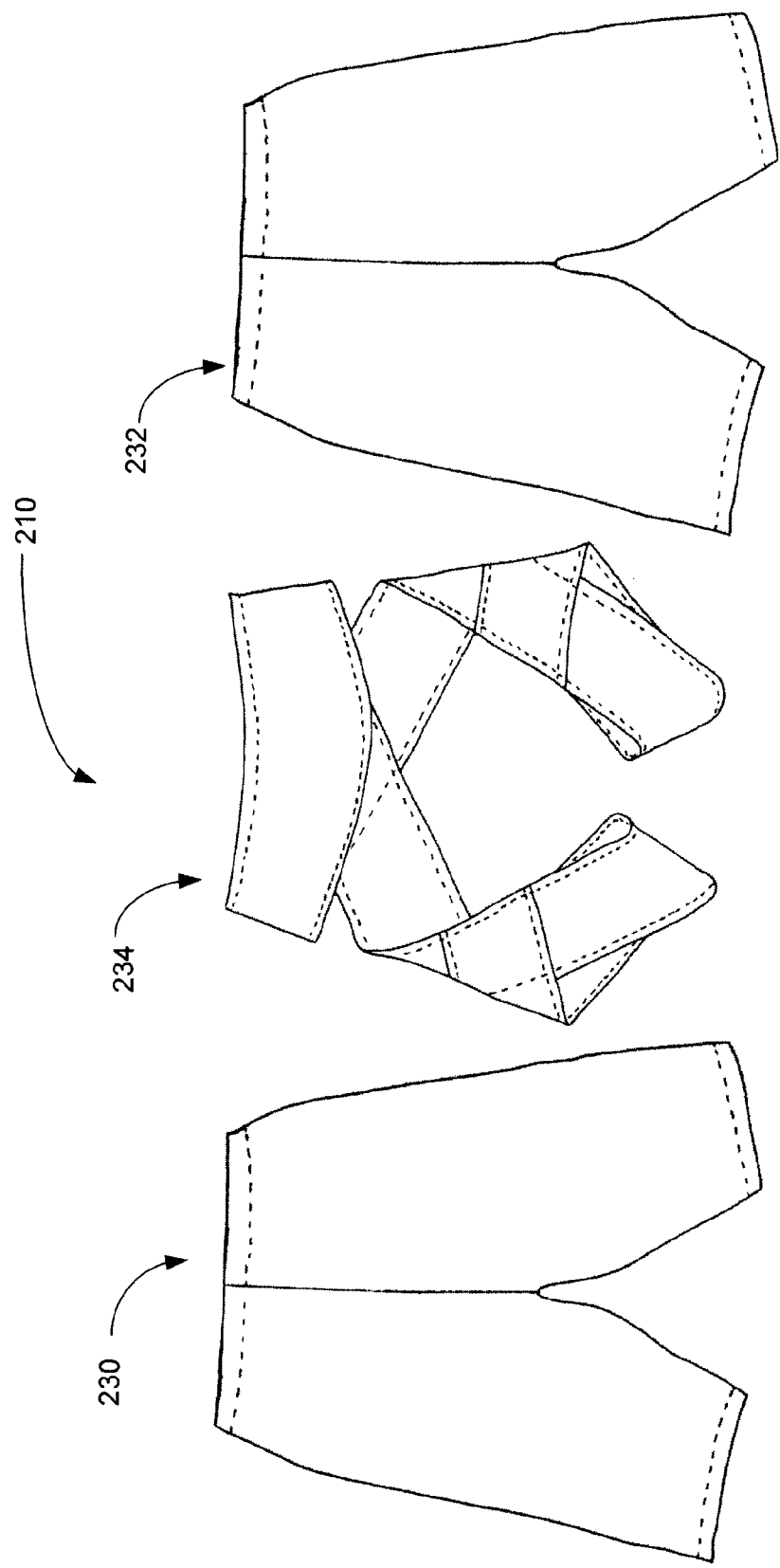
FIG. 15 is an exploded view of the exemplary embodiment of a short of FIG. 14A.
Figure 16D:
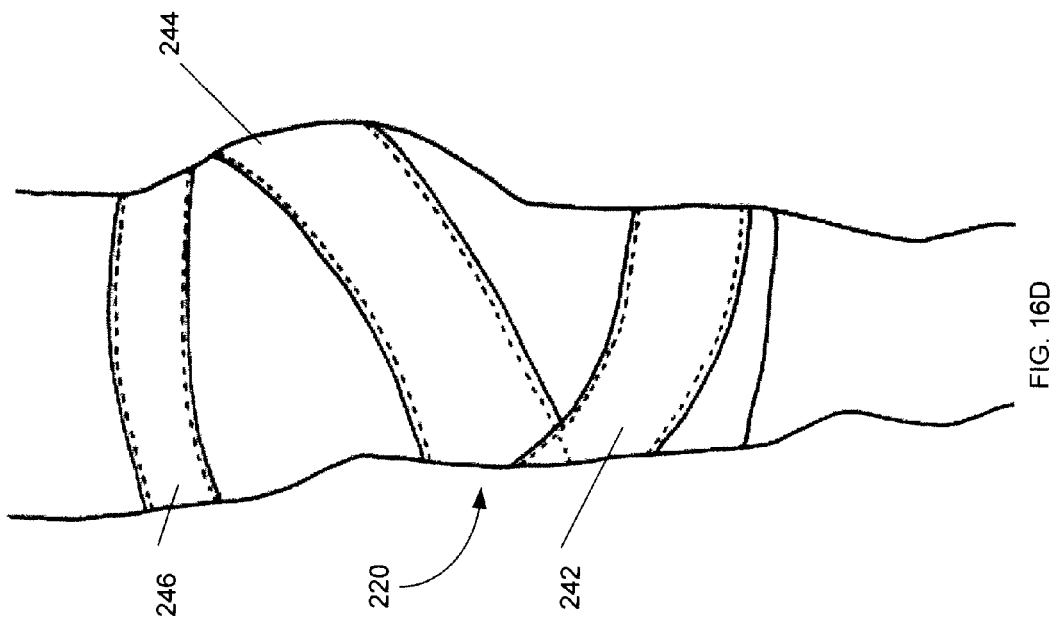
FIG. 16D is a left side view of the exemplary embodiment of a short of FIG. 14A illustrating the position of the training region relative to the wearer's body.
Figure 16C:
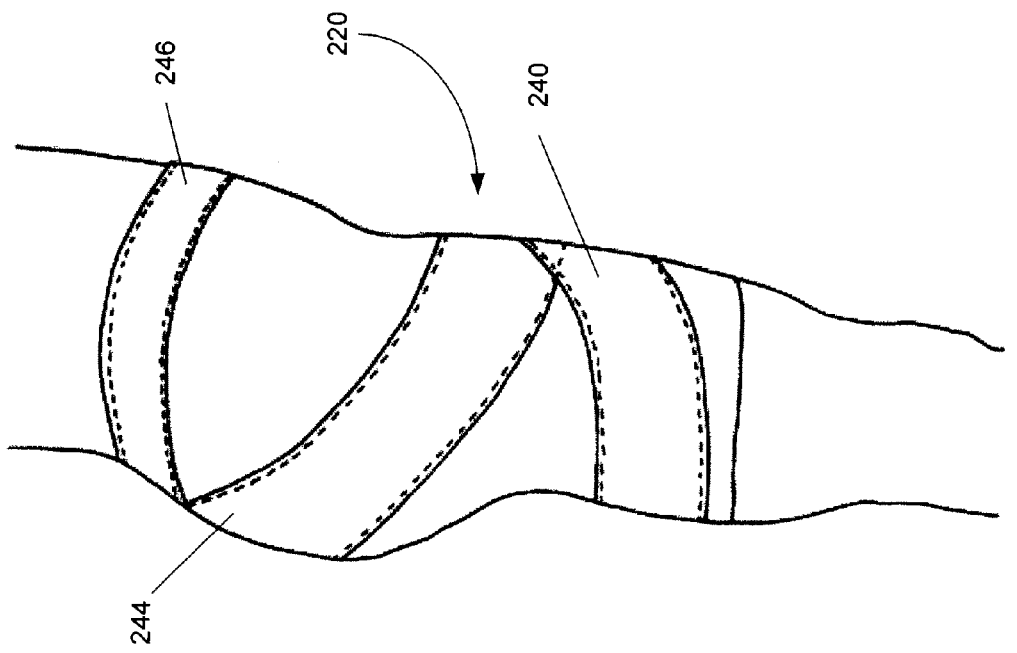
FIG. 16C is a right side view of the exemplary embodiment of a short of FIG. 14A illustrating the position of the training region relative to the wearer's body.
Figure 17D:
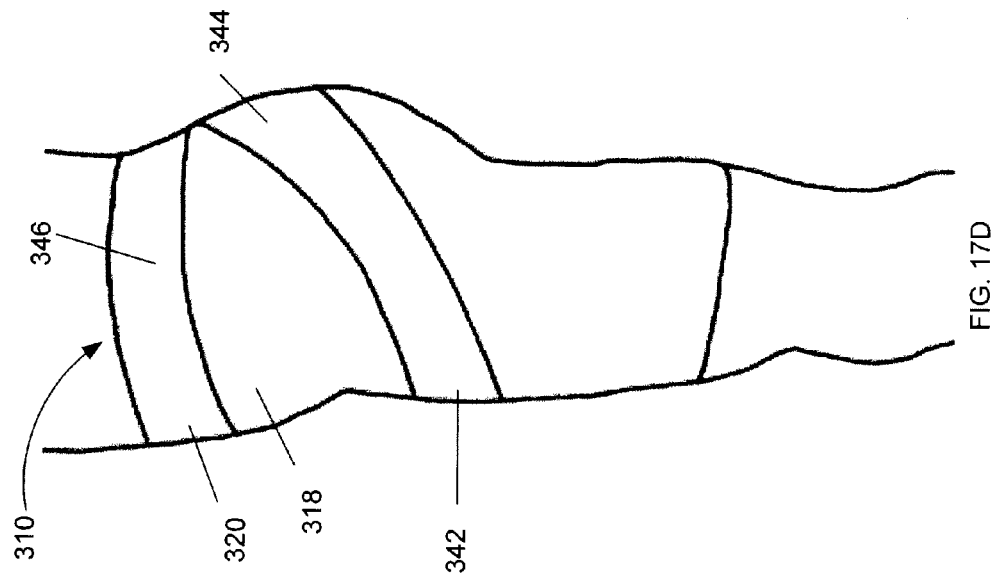
FIG. 17D is a left side view of the exemplary embodiment of a short of FIG. 17A illustrating the position of the training region relative to the wearer's body.
Figure 17C:
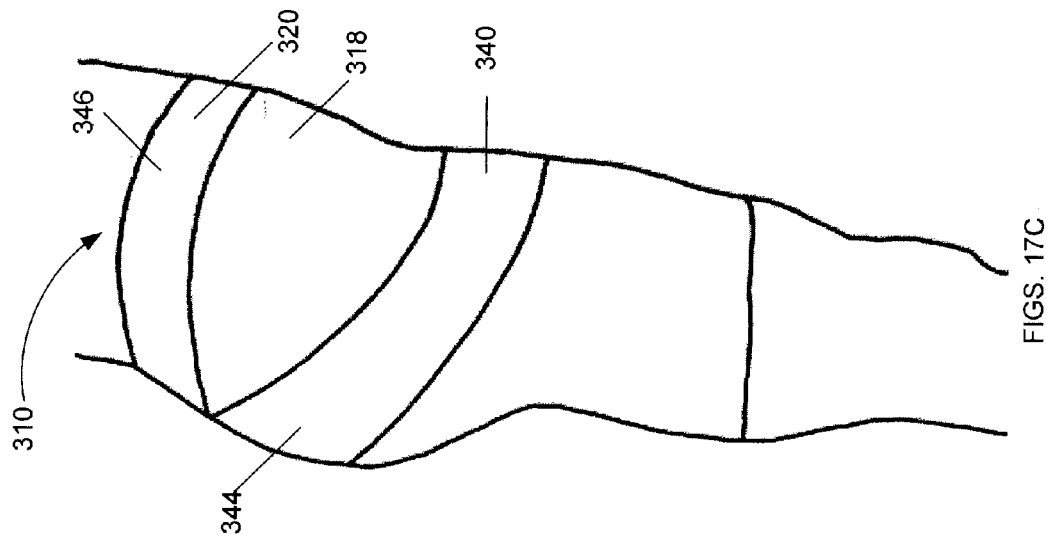
FIG. 17C is a right side view of the exemplary embodiment of a short of FIG. 17A illustrating the position of the training region relative to the wearer's body.

Referring to FIG. 15, an exploded view of short 210 is shown according to an exemplary embodiment. Garment region 218 and training region 220 of short 210 are shown including a portion of a first material element or stratum 230 and a portion of a second material element or stratum 232. Training region 220 is further shown including a third material element or stratum 234 in addition to a portion of first stratum 230 and a portion of second stratum 232. Training region 220 is substantially defined by third stratum 234, which is sandwiched substantially between first stratum 230 and second stratum 232. The portions of first stratum 230 and second stratum 232 included in training region 220 substantially correspond to those portions layered above and/or below third stratum 234.

The first stratum 230, second stratum 232, and third stratum 234 are layered and sewn together in parallel to form the completed short 210. The strata may be sewn together utilizing a variety of stitching and sewing methods, including, but not limited to those that do not limit in anyway the stretch or elasticity of any material element. Stitching can include standard lock stitches (e.g. straight stitch with single or multiple needles, basic zigzag stitch, three-step zigzag stitch, multiple zigzag stitch, etc.) in which a needle transfers a thread through a material and subsequently grabs a thread from a bobbin and sandwiches the fabric between the treads or overlock (a.k.a., serging) stitches (e.g., overlock stitch, flatlock stitch, cover stitch, etc.) in which the fabric edge is trapped between loops of thread passing through and around the fabric edge, or combinations of standard lock and overlock stitching. Other methods of attachment may include, but are not limited to, using ultrasonic welding (a method of attaching materials in close contact with one another using high-energy vibrations at ultrasonic frequencies) in part or in whole, using textile adhesive (a method in which a substance is used to bond materials together) attachment methods, etc.

Some portions of training region 220 include a layer of first stratum 230, second stratum 232, and third stratum 234. At other portions of training region 220 the third stratum 134 overlaps itself (e.g., at center of cross portion); generally, these portions of the training region are less elastic than those where the third stratum does not overlap itself. In other exemplary embodiments wherein the garment includes a single layer of material, the elasticity of a region is generally equal to the elasticity of that material element defining that region. For example, the different material elements making up the training region and the garment region may be sewn together at their edges to form a single-layered, complete garment.

Referring to FIGS. 16A-16D, training region 220 is shown positioned relative to the wearer's body in a manner substantially identical to training region 120 of short 110 and including a first loop 240, a second loop 242, a cross portion 244, and a front portion 246 according to an exemplary embodiment. In contrast to training region 120, training region 220 has a cut-and-sew method construction rather than a knit construction, as discussed above.

Figure 18:
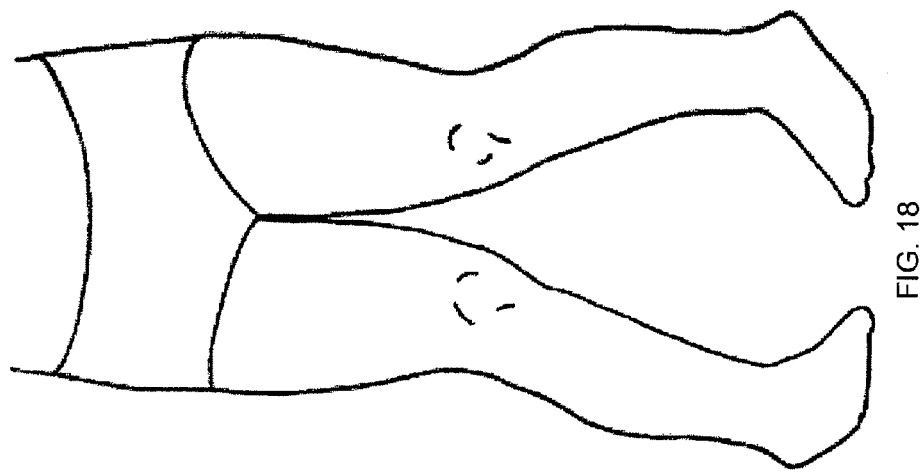
FIG. 18 is an illustration of a person exhibiting an intoeing posture.
Figure 20D:
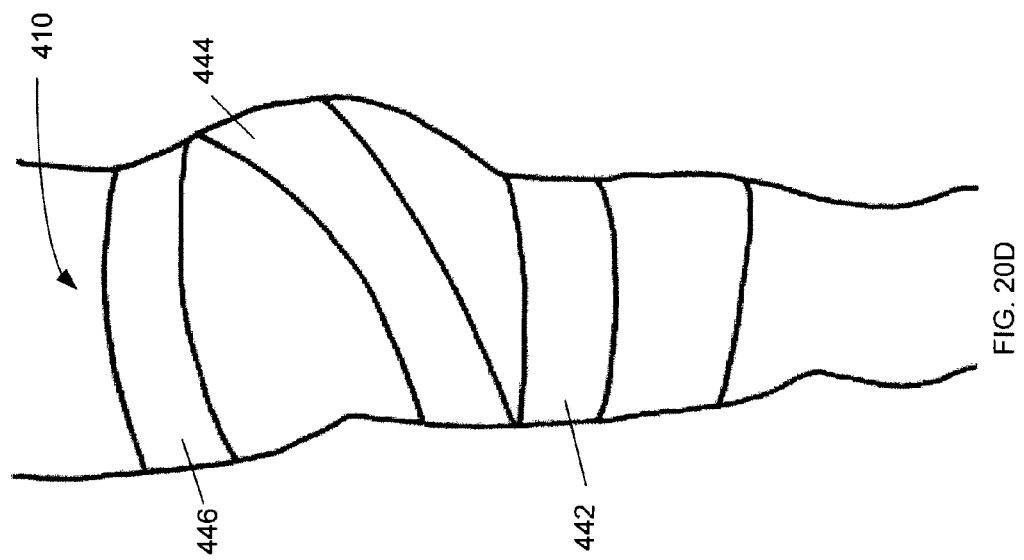
FIG. 20D is a left side view of the exemplary embodiment of a short of FIG. 20A illustrating the position of the training region relative to the wearer's body.
Figure 20C:
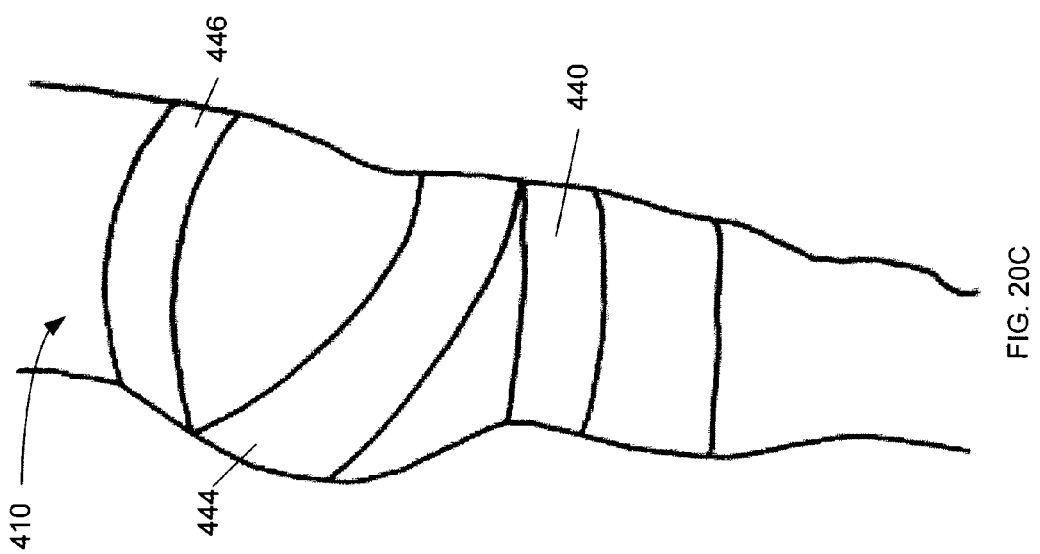
FIG. 20C is a right side view of the exemplary embodiment of a short of FIG. 20A illustrating the position of the training region relative to the wearer's body.
Figure 21B:
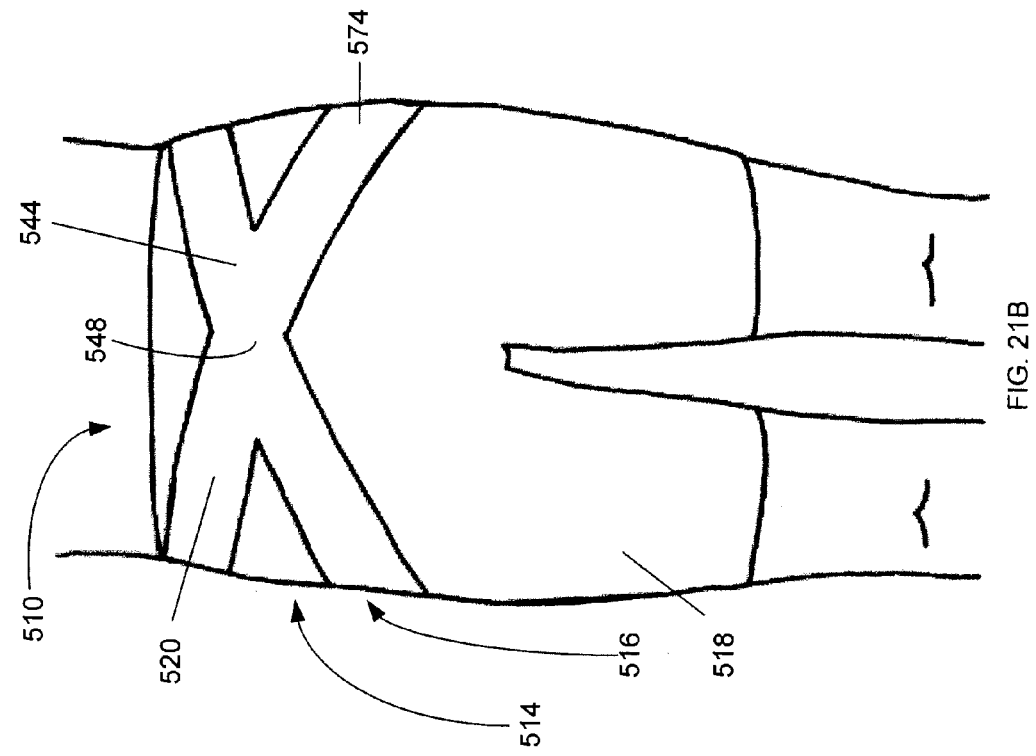
FIG. 21B is a rear view of the exemplary embodiment of a short of FIG. 21A illustrating the position of the training region relative to the wearer's body.
Figure 21A:
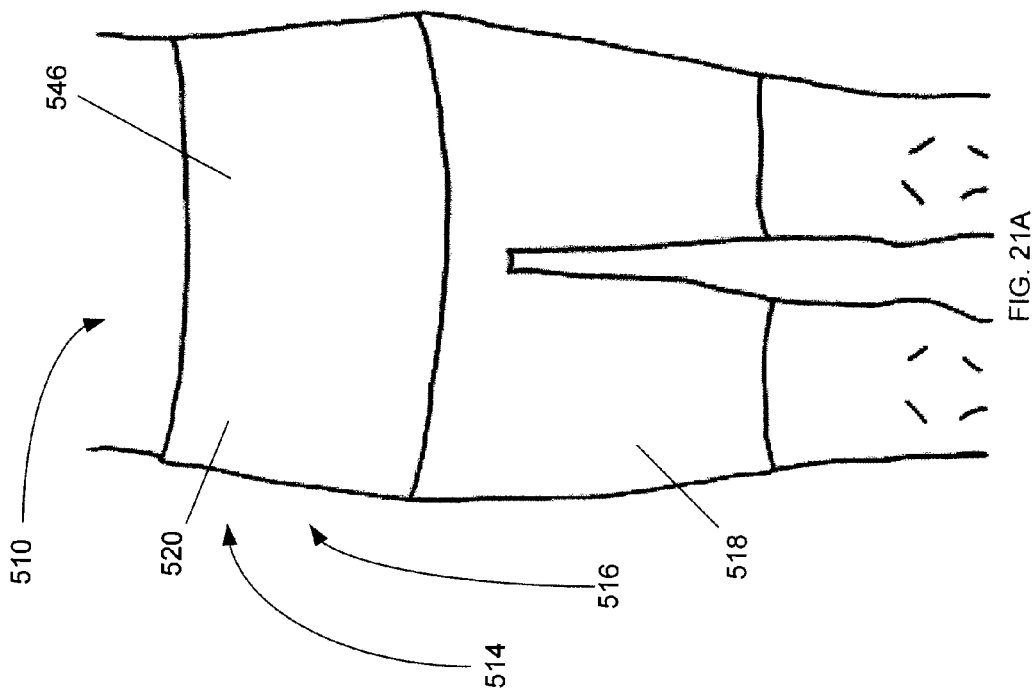
FIG. 21A is a front view of a fifth exemplary embodiment of a garment shown as a short illustrating the position of a training region relative to the wearer's body.
Figure 21D:
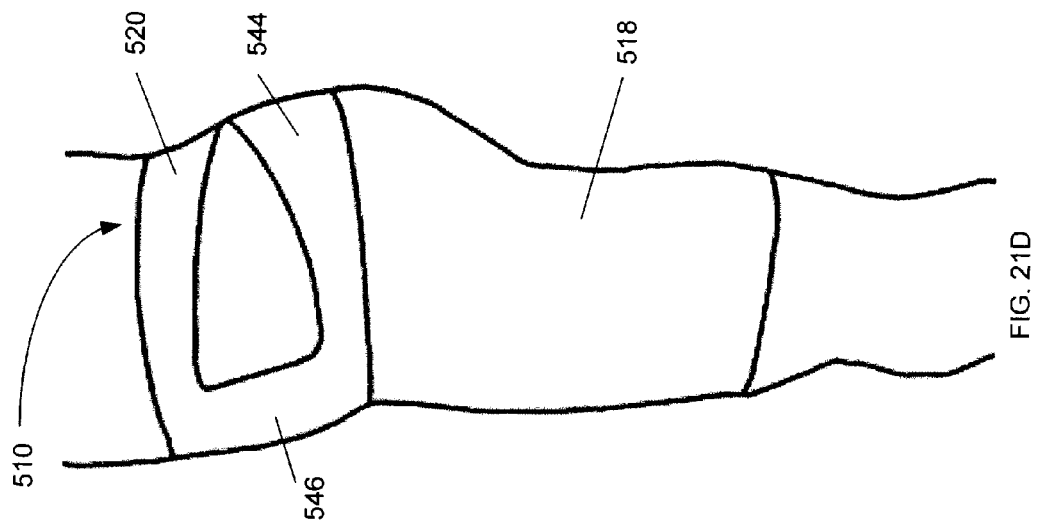
FIG. 21D is a left side view of the exemplary embodiment of a short of FIG. 21A illustrating the position of the training region relative to the wearer's body.
Figure 21C:
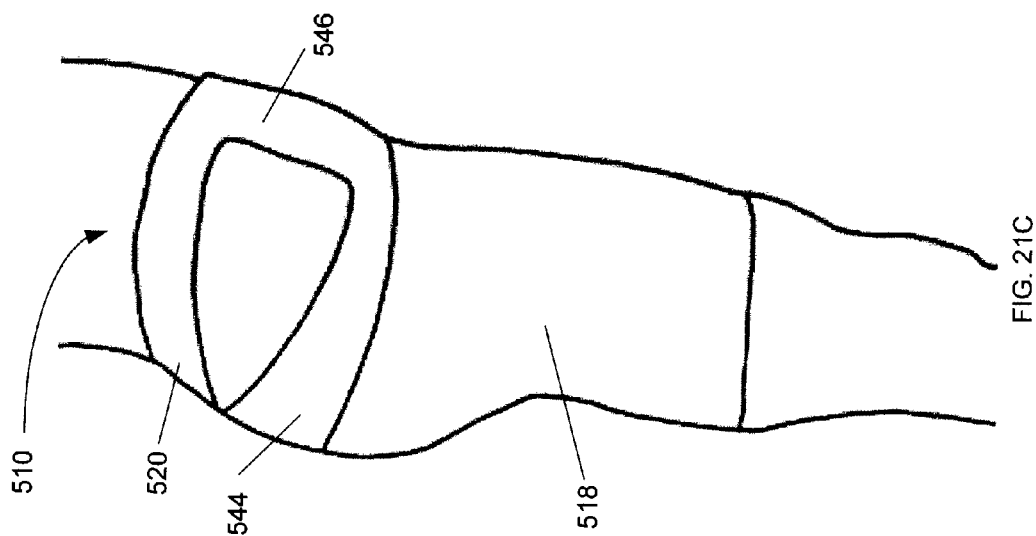
FIG. 21C is a right side view of the exemplary embodiment of a short of FIG. 21A illustrating the position of the training region relative to the wearer's body.
Figure 22D:
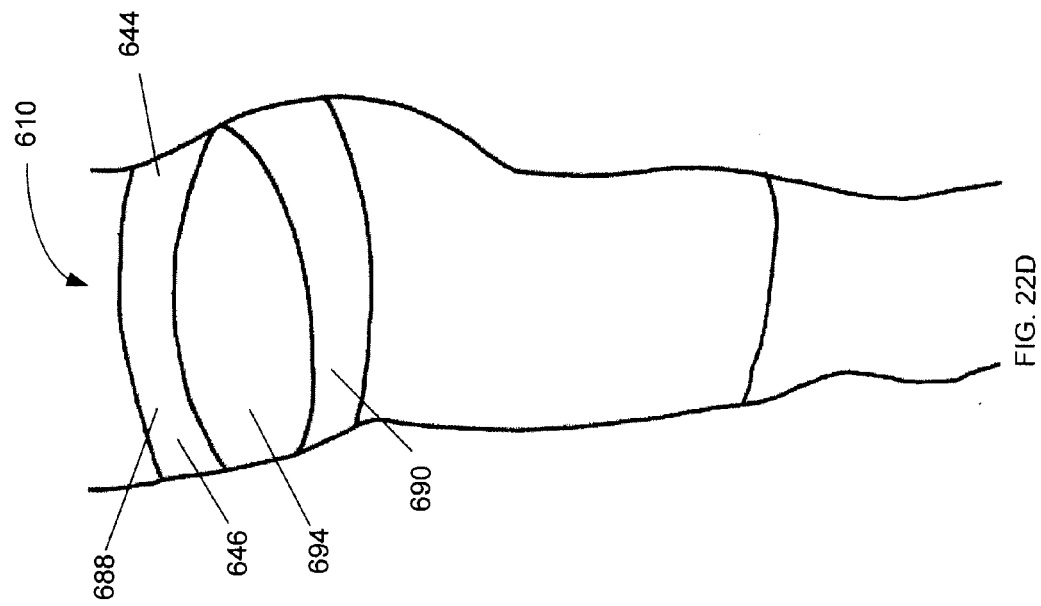
FIG. 22D is a left side view of the exemplary embodiment of a short of FIG. 22A illustrating the position of the training region relative to the wearer's body.
Figure 22C:
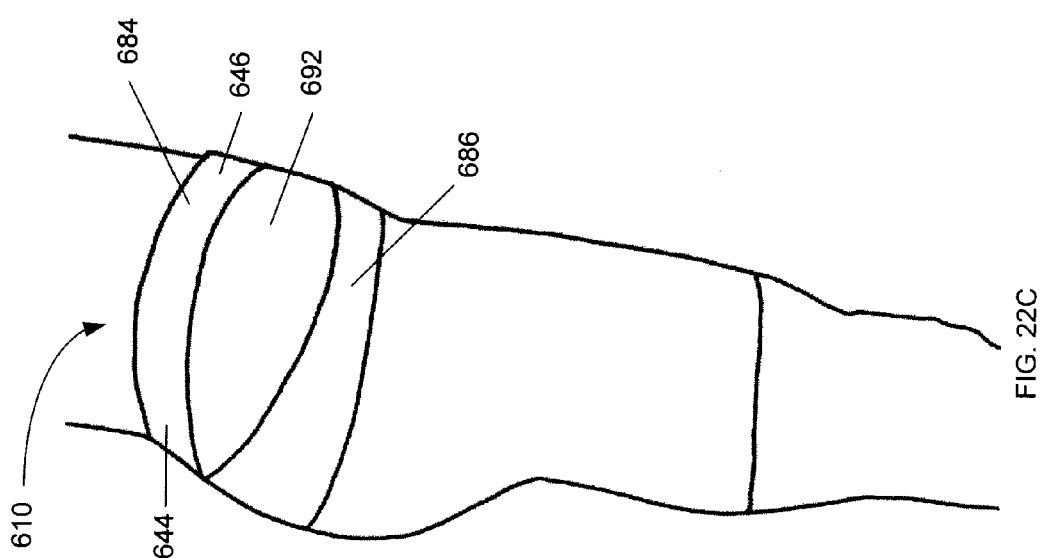
FIG. 22C is a right side view of the exemplary embodiment of a short of FIG. 22A illustrating the position of the training region relative to the wearer's body.
Figure 23B:
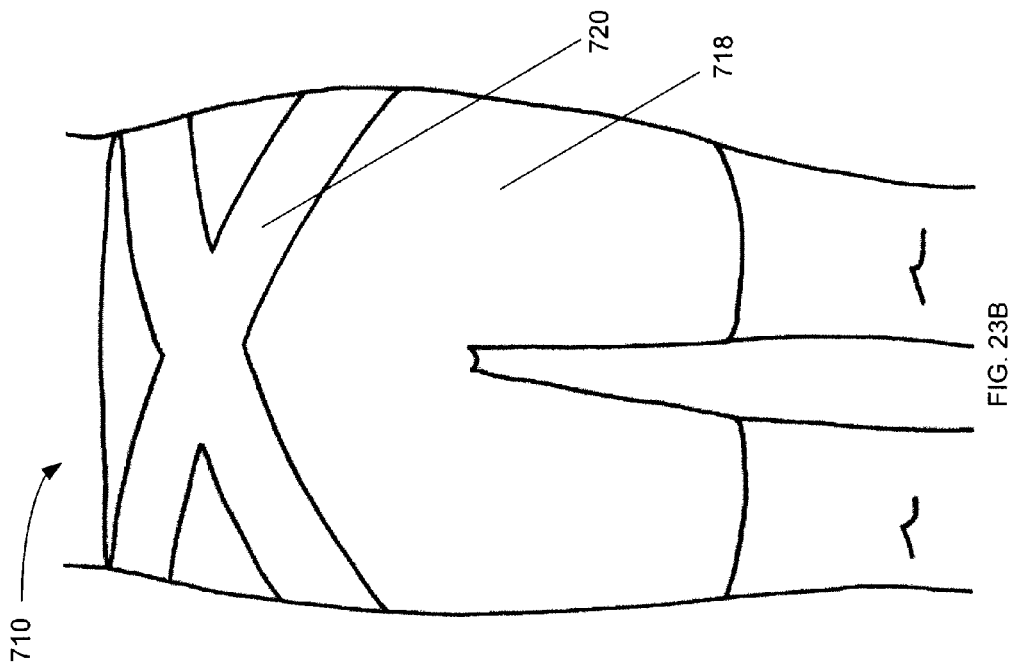
FIG. 23B is a rear view of the exemplary embodiment of a short of FIG. 23A illustrating the position of the training region relative to the wearer's body.
Figure 23A:
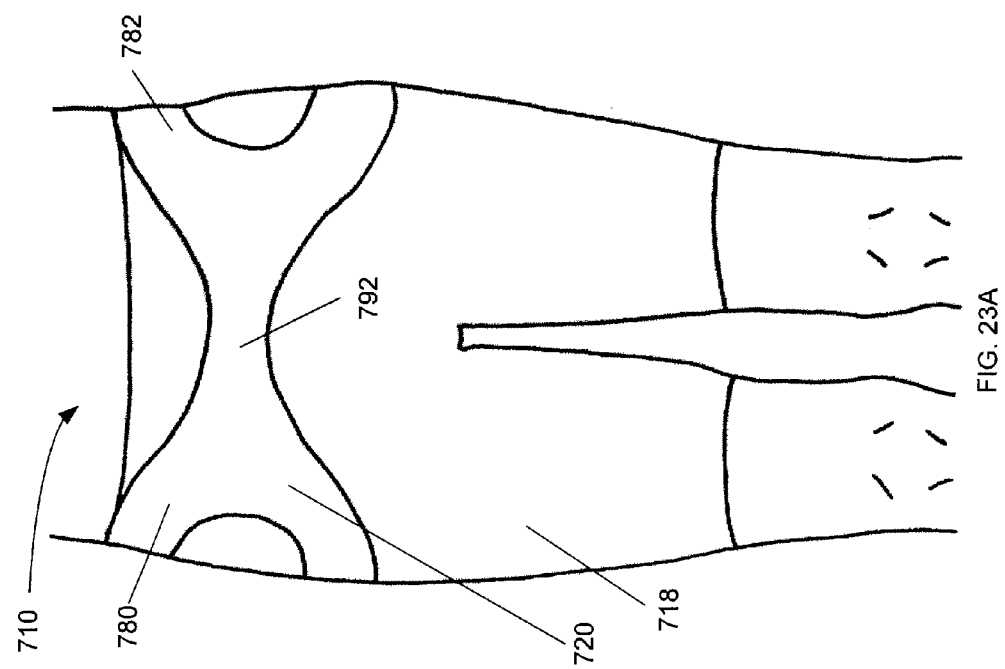
FIG. 23A is a front view of a seventh exemplary embodiment of a garment shown as a short illustrating the position of a training region relative to the wearer's body.
Figure 23D:
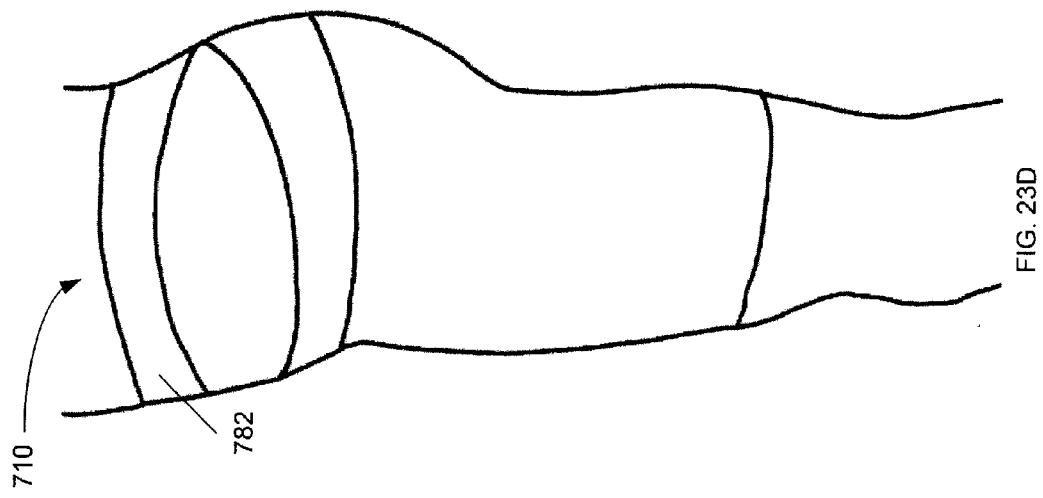
FIG. 23D is a left side view of the exemplary embodiment of a short of FIG. 23A illustrating the position of the training region relative to the wearer's body.
Figure 23C:
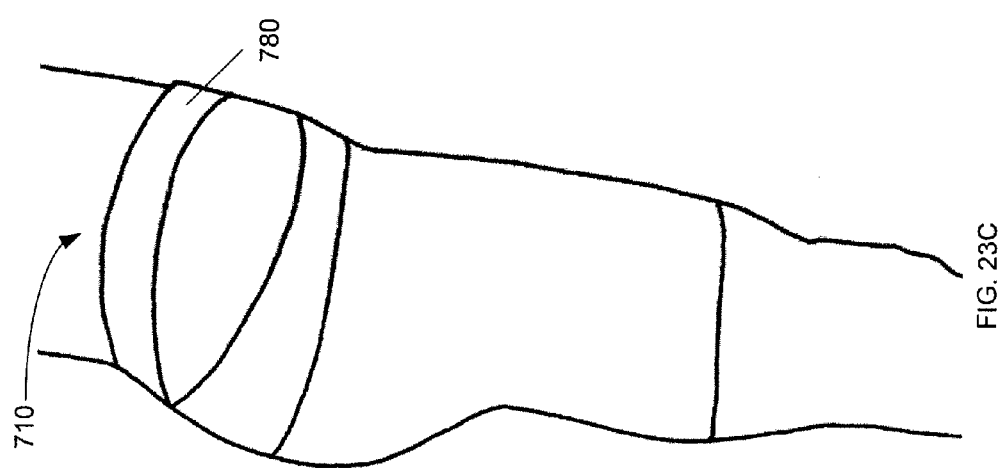
FIG. 23C is a right side view of the exemplary embodiment of a short of FIG. 23A illustrating the position of the training region relative to the wearer's body.

Referring to FIGS. 17A-17D, an exemplary embodiment of short 110 configured to be particularly useful during physical activities which cause or in which people often experience Patellofemoral Pain (PFP) (e.g., cross country running, track, etc.) is shown as short 310. PFP results from a patella malalignment, where the patella or knee cap does not line up properly in the groove of the femur head and creates pressure on the patella, resulting in knee pain. This misalignment often results from an increased internal hip rotation which can manifest itself in an intoeing posture (see, e.g., FIG. 18 illustrating a person exhibiting an intoeing posture). The feedback from short 310 provides instruction to the wearer to neutrally position their hips, minimizing internal hip rotation toward midsagittal plane 20, positioning the thigh and knee cap into improved alignment, and achieving a more optimal dynamic posture.

Short 310 includes a garment region 318 and a training region 320, similar to garment region 118 and training region 120 of short 110. Garment region 318 and training region 320 are integrated and have a knit construction. Training region 320 includes a first leg portion 340, a second leg portion 342, a cross portion 344, and a front portion 346. First leg portion 340 and second leg portion 342 are shown disposed proximate to the wearer's pelvis at the front side 30 of the wearer's body. At this position, first leg portion 340 and second leg portion 342 provide relatively strong feedback to counter internal hip rotation. This centralization of training region about the wearer's hips is intended to provide feedback with a narrower focus than the feedback provided by short 110. First leg portion 340 and second leg portion 342 are further positioned to avoid affecting/hindering the wearer's mobility (e.g., by crossing over the wearer's knee or directly over the femoral head of the wearer's hip joint).

For the purposes of discussion, an exemplary operation of short 310 wherein the wearer is performing a forward running activity will be discussed.

Figure 19B:
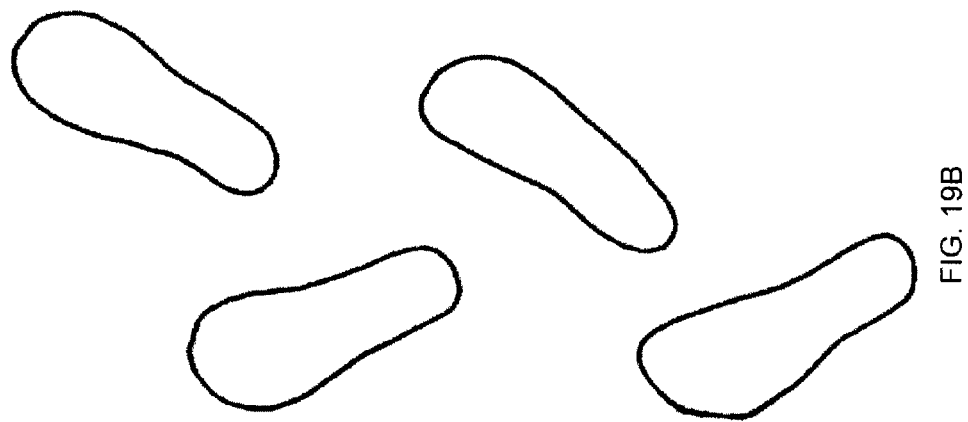
FIG. 19B is an illustration of the position of the feet of a person demonstrating a knee protecting gait.
Figure 19A:
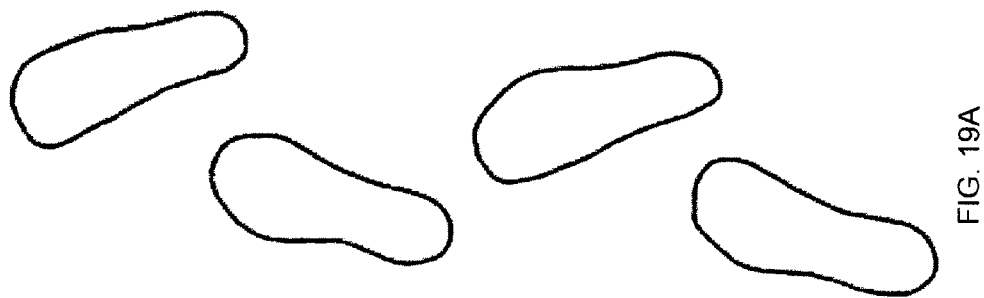
FIG. 19A is an illustration of the position of the feet of a person demonstrating an intoed gait.

When running, people with poor biomechanic posture may exhibit an intoed gait (e.g., inward pointing toes) when in a substantially upright posture, as illustrated in FIG. 18. FIG. 19A illustrates the position of a person's feet when exhibiting an intoed gait. A person exhibiting an intoed gait typically demonstrates increased internal hip rotation causing increased stresses upon the patellofemoral joint. Patellofemoral misalignment often causes people to experience pain around the knee cap and puts stress on the knee joint and ligaments. In contrast, FIG. 19B illustrates the position of a person's feet when exhibiting a knee protecting gait, wherein the person's hips would be more neutrally oriented, and, thus, the thigh and knee cap are more optimally aligned, providing for a more optimal biomechanic position.

Poor running mechanics increases a person's risk of PFP (i.e., excessive hip internal rotation, intoeing, etc.). PFP-related injuries are particularly prevalent in sports involving running movements, such as track and field and cross-country running. Generally, optimal running mechanics involves maintaining proper hip, knee, and toe alignment. In this position, the person performing a physical activity is substantially balanced with hips centered aligning the thigh to the knee minimizing the stresses on the knee joint and ligaments.

Short 310 reduces the risk of injuries, such as PFP resulting from poor running mechanics. When the wearer's hips rotate internally toward midsagittal plane 20 and their thighs and knees are misaligned, tension is created in training region 320 of short 310. Internal rotation of the wearer's hips elongates training region 320 between a center 348 of cross portion 344 and an inner portion 358 of first leg portion 340, and between center 348 and an inner portion 366 of second leg portion 342. Training region 320 seeks to recover, generating feedback forces as a result of the tension generated therein indicating to the wearer to rotate their hips outward, away from midsagittal plane 20. The resulting feedback is sensed by the wearer, and the wearer's body adjusts substantially automatically as discussed above. As the wearer's hips rotate outward, the alignment of their hips, thighs, and knees move toward an optimal biomechanic position and the magnitudes of the feedback forces provided decrease.

Referring to FIGS. 20A-20D, an exemplary embodiment of short 110 configured to be particularly useful during physical activities which cause or in which people often experience PFP (e.g., cross country running, track, etc.) is shown as short 410.

Short 410 includes a garment region 418 that is substantially interconnected with a training region 420, similar to garment region 118 and training region 120 discussed with respect to short 110 above. Short 410 is substantially similar to short 310 with the exception that first leg portion 440 and second leg portion 442 are replaced with a first loop 440 and a second loop 442, respectively. Training region 420 includes a cross portion 444 and a front portion 446 in addition to first loop 440 and second loop 442.

Similar to first leg portion 340 and second leg portion 342, first loop 440 and second loop 442 are disposed proximate to the wearer's pelvis without affecting/hindering the wearer's mobility. In contrast to first leg portion 340 and second leg portion 342, first loop 440 and second loop 442 each substantially encircle the wearer's thighs, having a portion that extends across wearer's thigh at the front side 30 of the wearer's body and a portion that extends about the wearer's thigh at the posterior side 32 of the wearer's body. The arrangement of training region 420 in this configuration is intended to help focus the feedback at the wearer's hips in order to keep their hips properly aligned (e.g., with their knee joints, thighs, etc.). While first loop 440 and second loop 442 are shown disposed substantially horizontally, the first loop and the second loop may be disposed at an angle while still being proximate to the wearer's pelvis and achieve substantially the same results.

Referring to FIGS. 21A-21D, garment 10 is shown as short 510 including an integrated biofeedback device 514 having a tensioning system 516 configured to provide for optimal biomechanic motion of the lower extremities during physical activity is disclosed according to another exemplary embodiment. Short 510 is configured to be particularly useful during physical activities which cause or in which people often experience PFP (e.g., cross country running, track, etc.). Short 510 counters internal hip rotation by focusing the feedback on the pelvic region, generally above and below the hip joint, without extending to encircle or partially encircle the wearer's legs/thighs.

Short 510 includes a garment region 518 interconnected with a training region 520, similar to garment region 118 and training region 120 discussed with respect to short 110 above. Similar to the training regions of the other shorts discussed herein, training region 520 is configured to be substantially symmetrical about the wearer's midsagittal plane 20 and includes a cross portion 544 and a front portion 546 according to an exemplary embodiment.

Front portion 546 is disposed generally at the front side 30 of the wearer's body, substantially opposite cross portion 544 according to an exemplary embodiment. Front portion 546 is configured to help maintain cross portion 544 in its desired position relative to the wearer's body and to generate tension within training region 520. Front portion 546 is shown disposed substantially across the wearer's pelvis and has a height along midsagittal plane 20 that substantially corresponds to the height of cross portion 544 where it transitions to front portion 446 at the left and right sides of the wearer's body.

Cross portion 544 is shown disposed at the posterior side of the wearer's body and includes an upper portion 572, a lower portion 574, and a center 548 according to an exemplary embodiment. Cross portion 544 is configured to help establish and maintain the wearer's center of gravity over their base of support and the symmetry of training region 520 of short 510. At the left lateral side 28 of the wearer's body, upper portion 572 and lower portion 574 of cross portion 544 transition to front portion 546. At the right lateral side 26 of the wearer's body, upper portion 572 and lower portion 574 of cross portion 544 transition to front portion 546. Upper portion 572 of cross portion 544 is interconnected with and transitions to front portion 546 at the left and right lateral sides of the wearer's body substantially above the femoral head of the wearer's hip joint. Lower portion 574 of cross portion 544 transitions to front portion 546 at the left and right lateral sides of the wearer's body substantially below the femoral head of the wearer's hip joint. In this way, front portion 546 acts to create tension along the pelvic girdle across the upper and lower regions of the ilium. The pelvic girdle is responsible for transferring weight between the upper body and the legs. In this way, by focusing and/or concentrating feedback to the pelvic region, short 510 is able to respond more directly to the position of the wearer's hips.

Similar to cross portion 144, cross portion 544 is disposed relative to the wearer's body in a manner configured to generate tension in training region 520 corresponding to the alignment/misalignment of the portions of the wearer's body targeted by short 520. Lower portion 574 of cross portion 544 of training region 520 extends generally downward and outward from a center 548 of cross portion 544 at both the left and right lateral sides of the wearer's body. At each side of the gluteus maximus, lower portion 574 of cross portion 544 is disposed over the gluteus maximus substantially at its bending portion on that side and is tight thereto. By positioning lower portion 574 of cross portion 544 over the bending point of the gluteus maximus at the right side and the left side of midsagittal plane 20, greater tension is generated between center 548 and front portion 546 as a result of the wearer's sub-optimal biomechanic positions.

For the purposes of discussion, an exemplary operation of short 510 wherein the wearer is performing a forward running activity will be discussed.

Similar to short 310 and 410, short 510 reduces the risk of injuries, such as PFP, resulting from poor running mechanics and similar activities. When the wearer's hips rotate internally toward midsagittal plane 20 and their thighs and knees are misaligned, tension is created in training region 520 of short 510. When the hips are internally rotated, the femur rotates inward and its head pushes on the acetabulum of the pelvis forcing the lower pelvis to shift anteriorly. This anterior shift elongates training region 520 resulting from the sub-optimal posture generally between front portion 546 and center 548 of cross portion 544. Training region 520 seeks to recover, generating feedback focused on the wearer's pelvic region, the feedback instructing the wearer to rotate their hips outward, away from midsagittal plane 20. The resulting feedback is sensed by the wearer and the wearer's body adjusts substantially automatically as discussed above. As the wearer's hips rotate outward, the alignment of their hips, thighs, and knees move toward an optimal dynamic posture. It should be noted that while the discussion above highlights the benefits of short 510 for reducing the risk of injuries associated with PFP, short 510 is configured to improve alignment and biomechanic motion of a wearer's lower extremities more generally, during running and numerous other activities.

Referring to FIGS. 22A-22D, an alternative exemplary embodiment of short 510 configured to be particularly useful during physical activities which cause or in which people often experience PFP (e.g., cross country running, track, etc.) is shown as short 610.

Short 610 includes a garment region 618 substantially interconnected with a training region 620, similar to garment region 118 and training region 120 discussed with respect to short 110 above. Similar to training region 520 of short 510, training region 620 of short 610 includes a cross portion 644, includes a front portion 646, and is configured to counter internal hip rotation by focusing the resultant feedback on the pelvic region, generally above and below the wearer's hip joint, without extending to encircle or partially encircle the wearer's legs/thighs.

Front portion 646 includes a right front portion 680 and a left front portion 682 according to an exemplary embodiment. Front portion 646 is configured to help maintain cross portion 644 in its desired position relative to the wearer's body and to generate tension within training region 620. Front portion 646 is disposed generally at the front side 30 of the wearer's body, substantially opposite cross portion 644 and extending substantially the same height along the midsagittal plane 20 of the wearer's body according to an exemplary embodiment.

Right front portion 680 and left front portion 682 are shown substantially semicircular according to an exemplary embodiment. Right front portion 680 includes an upper portion 684 and a lower portion 686. Left front portion 682 includes an upper portion 688 and a lower portion 690. According to other exemplary embodiments, front portion and/or right front portion and left front portion may otherwise shaped and/or sized.

Cross portion 644 is shown disposed at the posterior side 32 of the wearer's body and including an upper portion 672 and a lower portion 674 according to an exemplary embodiment. Cross portion 644 is configured to help establish and maintain the symmetry of training region 620 of short 610. At the right lateral side of the wearer's body, upper portion 672 and lower portion 674 of cross portion 644 transition to right front portion 680. At the left lateral side of the wearer's body, upper portion 672 and lower portion 674 of cross portion 644 transition to left front portion 682. Upper portion 672 of cross portion 644 at the left and right lateral sides of the wearer's body transitions to upper portion 684 of right front portion 680 and upper portion 688 of left front portion 682, respectively, generally along the pelvic girdle across the upper and lower regions of the ilium. Lower portion 674 of cross portion 644 at the left and right lateral sides of the wearer's body transitions to lower portion 686 of right front portion 680 and lower portion 690 of left front portion 682, along the pelvic girdle across the upper and lower regions of the ilium.

At the left lateral side and the right lateral side, a first gap 692 and a second gap 694 are shown defined between the upper and lower points of connections between cross portion 644 and front portion 646, respectively. These gaps 692, 694 are intended to minimize interference with the wearer's hip joint. According to other exemplary embodiments, the gaps may be otherwise sized and/or shaped.

Referring to FIGS. 23A-23D, an alternative exemplary embodiment of short 410 configured to be particularly useful during physical activities which cause or in which people often experience PFP (e.g., cross country running, track, etc.) is shown as short 710.

Short 710 includes a garment region 718 interconnected with a training region 720. Training region 720 of short 710 is substantially similar to training region 620 of short 610. Training region 720 includes the same portions as training region 620 with the addition of a central front portion 792. Central front portion 792 connects a right front portion 780 and a left front portion 782. Central front portion 792 may provide for additional tensioning across the pelvic girdle by decreasing the elasticity along the front region of the garment and helping to secure proper placement of training region along the wearer's body.

EXEMPLARY SOCK EMBODIMENTS

Referring to FIGS. 24A-24C, garment 10 is shown as a sock 810 including an integrated biofeedback device 814 having a tensioning system 816 according to an exemplary embodiment. Sock 810 is configured to help provide for optimal biomechanic motion of a wearer's lower extremities. Feedback generated by tensioning system 816 of biofeedback device 814 indicates to the wearer that their biomechanic position is sub-optimal and indicates to the wearer how to adjust one or more portions of their body to achieve a more optimal biomechanic position wherein their lower extremities are optimally aligned. In this way, sock 810 is configured to help properly align the wearer's foot, ankle, and knee to optimize lower extremity function, including, but not limited to, speed, agility, hopping, jumping, landing, balance, stability, strength, reaction time, etc.

According to the exemplary embodiment shown, sock 810 may be used during physical activities, including, but not limited to activities where a person's foot demonstrates pronation. Pronation describes a rotational movement that, when associated with the foot, is typically exhibited by the action of the foot rolling inward and the arch flattening. Pronation of the foot is a normal part of walking and running; pronation helps provide shock absorption during these activities. During pronation, the alignment of the lower extremities is affected; the lower leg, knee, and thigh rotate medially, inward toward midsagittal plane 20.

Figure 25A:
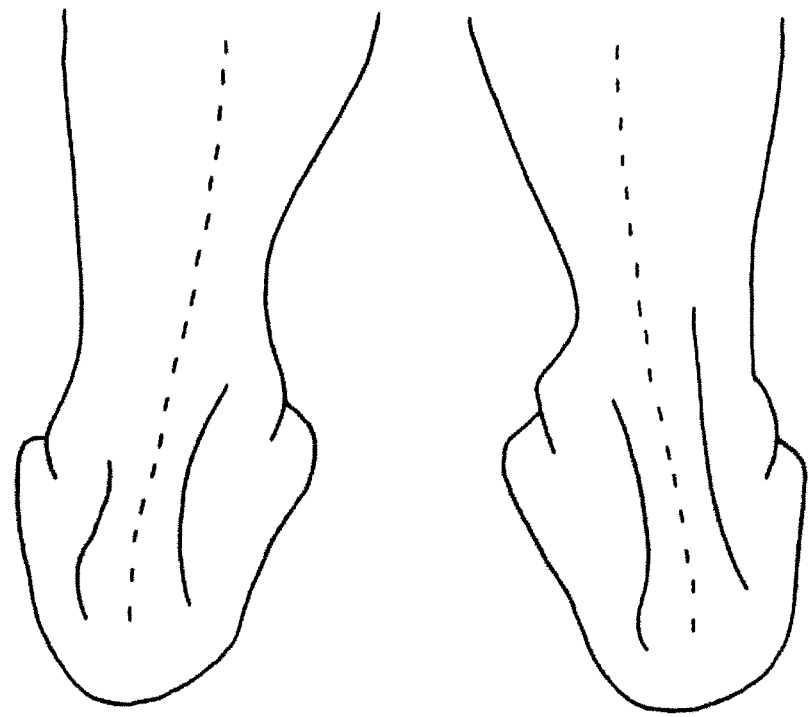
FIG. 25A illustrates a person exhibiting overpronation of their feet.
Figure 25B:
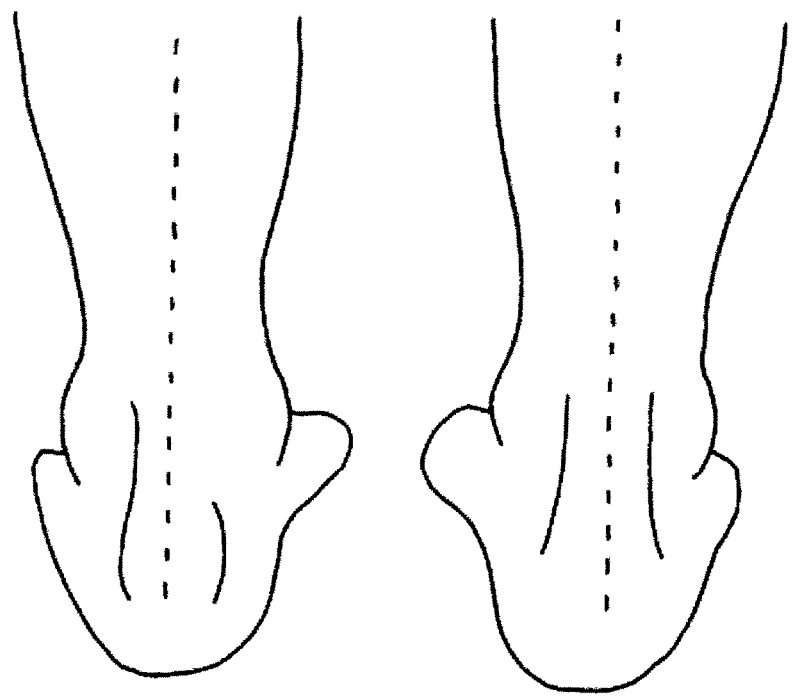
FIG. 25B illustrates a person exhibiting neutral foot position.

Referring to FIG. 25A, pronation can become a problem when a person overpronates their foot during running, walking, and other activities because this rotational movement becomes more exaggerated relative to normal pronation, further offsetting the orientation of the person's lower extremities medially and resulting in body positioning instabilities and inefficient shock absorption. Overpronation may lead to a number of injuries, including, but is not limited to, shin splints, PFP, Achilles tendonitis, and knee pain. By way of comparison, FIG. 25B illustrates a person's foot in a neutral position wherein their arch is not dropped and their ankles are not turned inward as shown in FIG. 25A.

Sock 810 is configured to reduce the risk of injuries, including, but not limited to, shin splints, PFP, Achilles tendonitis, and knee pain resulting from overpronation. More generally, sock 810 is configured to improve poor running and walking mechanics.

Referring to FIGS. 26A-26C, sock 810 includes a garment region 818 interconnected with a training region 820, similar to garment region 118 and training region 120 discussed with respect to short 110 above, and having a seamless knit construction. In other exemplary embodiments, sock 810 may be constructed by other construction methods (e.g., non-seamless knitting, cut-and-sew, combinations thereof, etc.) and/or the layering, stitching, arrangement, and interconnection of materials may be varied.

Training region 820 includes a first or medial portion or loop 822 and a second or heel portion or loop 824 according to an exemplary embodiment. First loop 822 is shown disposed substantially medially about the wearer's foot contacting the center of the medial arch, at least partially encircling the wearer's foot. Second loop 824 is shown extending substantially from the medial portion of the wearer's foot to their heel substantially below their ankle. According to some exemplary embodiments, the first portion and the second portion do not form complete loops, but, rather, extend about a sufficient portion of their respective portions of the wearer's foot to be effectively anchored (e.g., maintained in position relative to) and to generate sufficient tension to provide feedback in response to the relative position/alignment of the portions of the wearer's foot targeted by the sock.

First loop 822 includes an inner region 826 disposed generally at the inner portion of the wearer's foot across the center of the medial arch, closer to the midsagittal plane 20 of the wearer than an outer region 828 that is disposed generally to the outside of the wearer's foot according to an exemplary embodiment. Second loop 824 is shown interconnected and integrally formed with first loop 822, extending therefrom to substantially encircle the wearer's heel generally below the wearer's ankle. Second loop 824 includes an inner region 830 disposed generally at the inside of the wearer's leg closer to midsagittal plane 20 than an outer region 832 that is disposed generally to the outside of the wearer's foot. Second loop 824 is shown disposed relative to the wearer's heel bone (e.g., calcaneus, etc.), generally avoiding wearer's ankle and Achilles tendon to avoid inhibiting movement and/or causing discomfort to the wearer. Generally, first loop 822 and second loop 824 may be interconnected by sewing, adhesion, or other methods known in the art. While training region 820 is shown interconnected with a garment region 818 substantially defining a low profile sock, training region may be adapted to higher profile socks (e.g., crew socks, knee-high socks, etc.) according to other exemplary embodiments.

When a wearer exhibits overpronation of their foot, training region 820 generates feedback, indicating to the wearer (e.g., alerting them, drawing their attention to the fact that, etc.) that their dynamic foot posture is sub-optimal. Sock 810 is further configured to correct these sub-optimal dynamic foot postures by indicating to the wearer how to adjust their foot to achieve optimal biomechanic position. The feedback provided by training region 820 of sock 810 is substantially proportional to the magnitude of the correction required for the wearer's body to achieve an optimal biomechanic motion. The resultant feedback force at each of these locations has a direction and a magnitude corresponding to the direction and magnitude of an adjustment that will bring that location of the wearer's foot into more optimal alignment. This adjustment is in response to the stimulation of sensory receptors along the sole of the foot. When stimulated, these mechanoreceptors provide information to the central nervous system that lead to postural responses. These responses are related to the areas of the foot stimulated. The training area is designed to provide information to various areas of the plantar surface stimulating these receptors and causing the wearer to make the desirable postural adjustments. Consequently, the wearer's body substantially subconsciously adjusts via their proprioceptive sense and their neuromuscular system, as discussed above. By correcting for these suboptimal foot postures sock 810 also supports optimal lower extremity alignment by minimizing valgus knee postures which may result from overpronation.

For the purposes of discussion, an exemplary operation of sock 810 wherein the wearer is performing a running activity will be discussed.

Figure 27B:
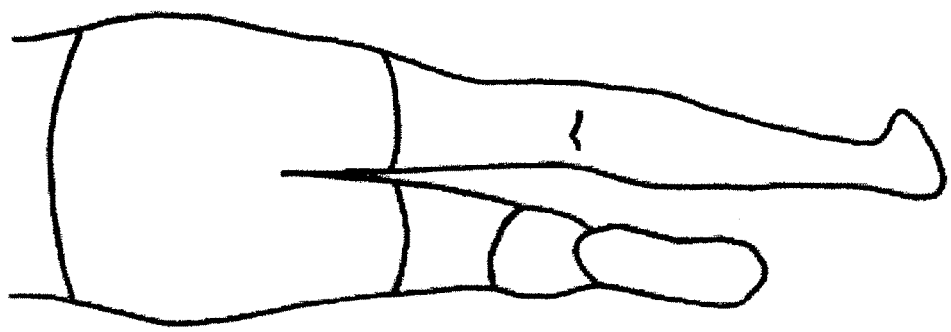
FIG. 27B illustrates a person running while wearing the sock shown in FIG. 24A and exhibiting a more neutral position of their feet.
Figure 27A:
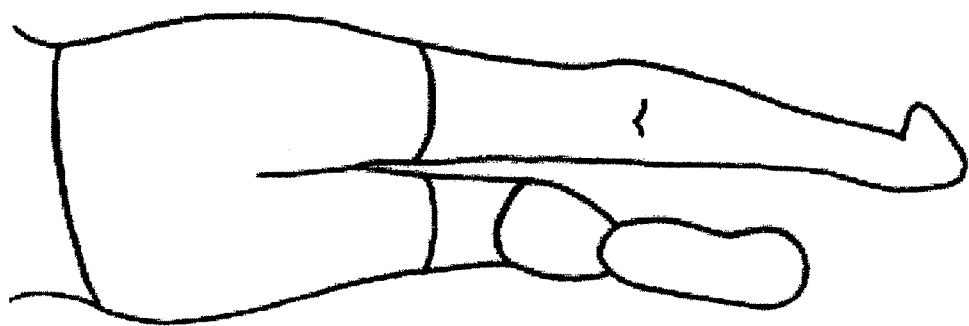
FIG. 27A illustrates a person running without wearing the sock shown in FIG. 24A and exhibiting overpronation of their feet.

Referring to FIG. 27A, a person running and not wearing socks 810 is shown exhibiting overpronation of their feet, characterized by a rolling of the foot towards their midsagittal plane 20 and a lowering the arch of their foot. As a consequence of this drop in arch height, the person's ankles, feet and knees tend to lean inward. Further, the person's hip may drop. Referring to FIG. 27B, a person that is running and wearing socks 810 is shown exhibiting a more neutral position of their feet than the person shown in FIG. 27A not wearing socks 810.

Figure 28B:
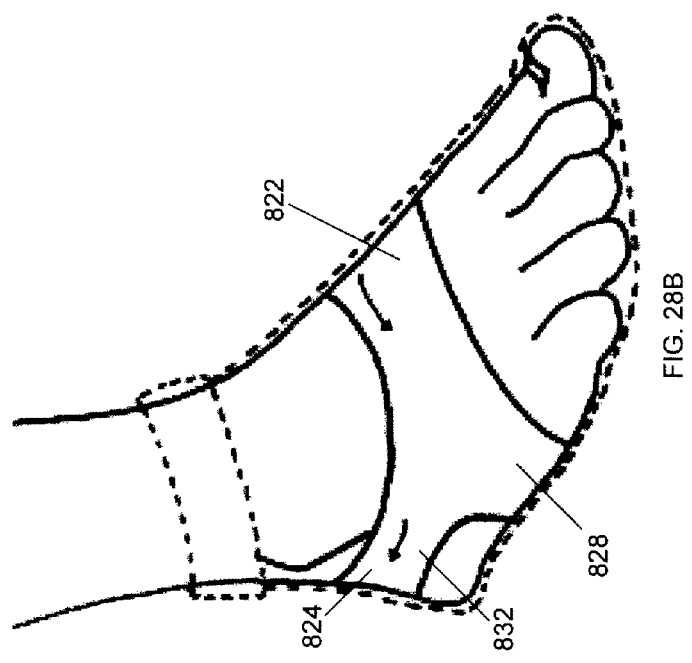
FIG. 28B is side perspective view of the exemplary embodiment of the sock of FIG. 28A.
Figure 28C:
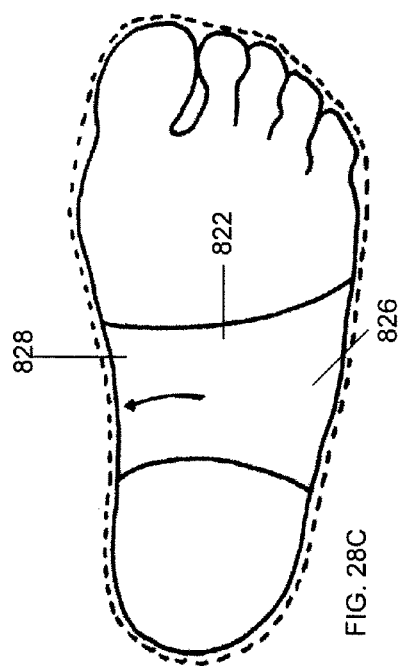
FIG. 28C is a bottom perspective view of the exemplary embodiment of the sock of FIG. 28A.
Figure 28A:
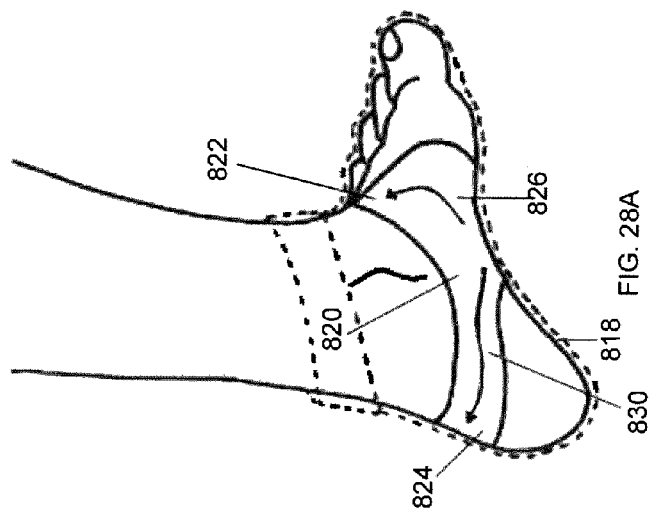
FIG. 28A is a side perspective view of the exemplary embodiment of a sock of FIG. 24A.

The arrows shown in FIGS. 28A-28C highlight the correction provided by socks 810. The arrows generally illustrate the magnitude and direction of the corrections to the biomechanic position of the person as shown in FIG. 27A provided by socks 810 to achieve the more optimal biomechanic position shown in FIG. 27B.

As the wearer's foot rotates inward toward midsagittal plane 20 and the wearer's arch height begins to drop, inner region 826 and outer region 828 of first loop 822 stretch (e.g., elongate, etc.). Training region 820 is stretched along the inside and the outside of the wearer's foot between the portion of first loop 822 disposed proximate to the wearer's metatarsals and second loop 824, which is effectively anchored about the wearer's heel below their ankle Training region 820 seeks to counter these stresses, resulting in the generation of feedback forces. These forces indicate to the wearer to rotate their foot outward by turning their foot away from midsagittal plane 20 in order to release the tension generated between inner region 826 and outer region 828 of first loop 822 as a result of the drop in their arch height by lifting their arch generally upwards, and lifting the arch of their foot.

Generally, socks 810 are worn as pairs, enabling them to act symmetrically.

Referring to FIGS. 29A-29C, an alternative exemplary embodiment of sock 810 also configured to reduced the risk of injuries, such as shin splints, PFP, Achilles tendonitis, and knee pain resulting from overpronation of the foot, and, more generally, poor running and walking mechanics is shown as sock 910.

Sock 910 includes a garment region 918 and a training region 920. Training region 920 includes a first loop 922, a second loop 924, and an intermediate portion 926 in the exemplary embodiment shown. Training region 920 of sock 910 is similar to training region 820 of sock 810 with the exceptions that second loop 924 is disposed beneath the wearer's knee, and first loop 922 and second loop 924 are interconnected by intermediate portion 926 rather than being directly interconnected, as with first loop 822 and second loop 824 of sock 810.

As discussed above, similar to first loop 822, first loop 922 is disposed substantially medially about the foot along the medial arch, substantially encircling the wearer's foot according to an exemplary embodiment. First loop 922 includes an inner region 928 disposed generally at the inner portion of the wearer's foot, closer to midsagittal plane 20 than an outer region 930 that is disposed generally to the outside of the wearer's foot.

Second loop 924 at least partially encircles the wearer's leg beneath their knee joint. Third portion 934 is shown interconnected with first loop 922 at inner region 928 and interconnected with second loop 924 at the outside of the wearer's leg, extending generally diagonally across the wearer's leg therebetween. While intermediate portion 926 is shown extending substantially diagonally across the front of the wearer's leg, intermediate portion 926 may be disposed in substantially any manner wherein it is interconnected with first loop 922 and second loop 924 and extends therebetween to generate the desired feedback.

For the purposes of discussion, an exemplary operation of sock 910 wherein the wearer is performing a running activity will be discussed.

When the wearer's foot overpronates, the wearer's foot and knee rotate inward toward their midsagittal plane 20. The relative positioning of first loop 922 and second loop 924 by the wearer's medial arch and knee, respectively, is configured to generate tension therein and therebetween along intermediate portion 926 as the wearer's foot rotates inward. Outer region 930 of first loop 922 stretches, and, also, intermediate portion 926 is pulled downward, stretching training region 920 generally between first loop 922 and second loop 924 as the upper portion of the wearer's leg proximate to their knee rotates inward. Training region 920 seeks to counter these stresses, and provides feedback forces that indicate to the wearer to rotate the medial arch of their foot and knee outward by both turning their foot and knee away from midsagittal plane 20, releasing the tension in an outer region 932 of second loop 924 and adjusting their lower extremities towards a more optimal biomechanic position.

Similar to socks 810, socks 910 are worn as pairs, enabling them to act symmetrically.

Figure 30C:
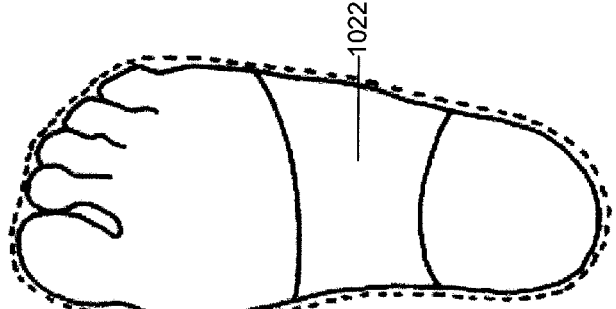
FIG. 30C is a bottom view of the exemplary embodiment of a sock of FIG. 30A illustrating the position of the training region relative to the wearer's foot.
Figure 30B:
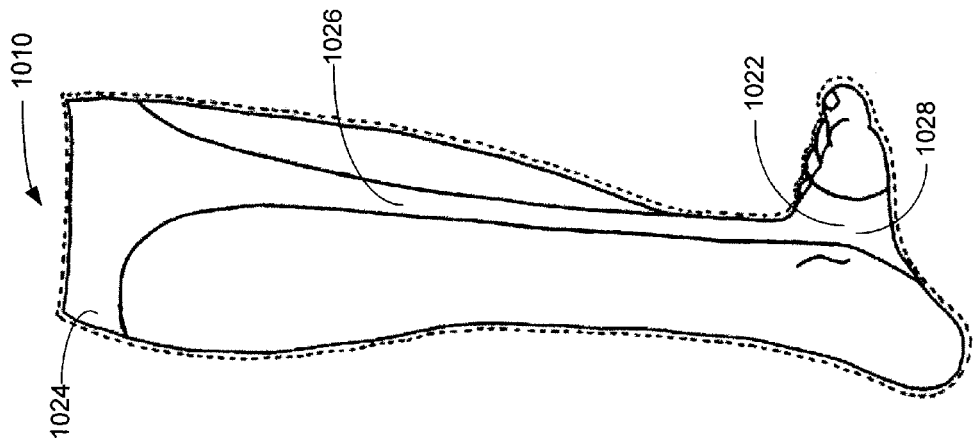
FIG. 30B is a side perspective view of the exemplary embodiment of a sock of FIG. 30A illustrating the position of the training region relative to the wearer's foot.
Figure 30A:
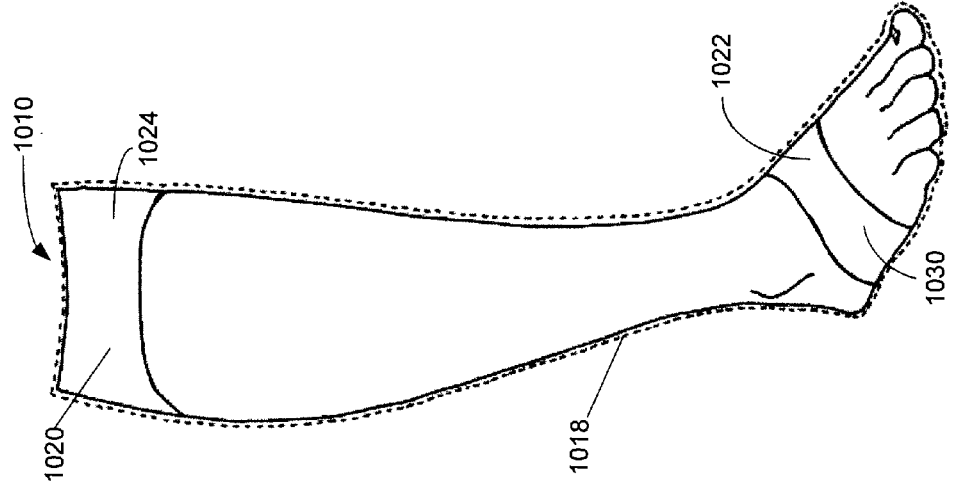
FIG. 30A is a side perspective view of a third exemplary embodiment of a garment shown as a sock illustrating the position of a training region relative to the wearer's foot.

Referring to FIGS. 30A-30C, an exemplary embodiment of sock 910 also configured to reduced the risk of injuries, such as shin splints, PFP, Achilles tendonitis, and knee pain resulting from overpronation of the foot, and, more generally, poor running and walking mechanics is shown as sock 1010 according to an exemplary embodiment.

Similar to sock 910, sock 1010 includes a garment region 1018 and a training region 1020. Like training region 920 of sock 910, training region 1020 includes a first loop 1022, a second loop 1024, and an intermediate portion 1026 in the exemplary embodiment shown. In contrast to training region 920, intermediate portion 1026 is shown extending substantially vertically between and interconnected with first loop 1022 and second loop 1024, rather than being disposed generally diagonally and partially encircling the wearer's shin, as with intermediate portion 926.

Referring to FIGS. 31A-31C, an exemplary embodiment of sock 810 also configured to reduced the risk of injuries, such as shin splints, PFP, Achilles tendonitis, and knee pain resulting from overpronation of the foot, and, more generally, poor running and walking mechanics is shown as sock 1110.

Sock 1110 includes a garment region 1118 substantially interconnected with a training region 1120, similar to garment region 118 and training region 120 discussed with respect to short 110 and sock 810 above. Training region 1120 includes a first loop 1122 and a second loop 1124 in the exemplary embodiment shown. First loop 1122 is shown disposed substantially about the front portion of the wearer's foot and transitioning to second loop 1124 along the inner medial portion of the wearer's foot proximate to their midsagittal plane 20. At this transition a cross portion 1144 with a center 1148 is formed and is substantially aligned and centered on the medial arch of the wearer's foot. First loop 1122 extends over the wearer's big toe, being disposed at least partially over the tip of the wearer's toe. An upper portion 1180 of first loop 1122 extends from the tip of the wearer's toe along the top of the wearer's foot. A lower portion 1182 of first loop 1122 extends from the tip of the wearer's toe along the bottom of the wearer's foot at the inner portion of the wearer's foot proximate to midsagittal plane 20. Upper portion 1180 and lower portion 1182 are shown transitioning to cross portion 1144.

Cross portion 1144, similar to cross portion 144, includes an upper portion 1172 and a lower portion 1174. Cross portion 1144 is disposed relative to the wearer's foot in a manner configured to generate tension in training region 1120 corresponding to the alignment/misalignment of the portions of the wearer's body targeted by sock 1110. Upper portion 1172 of cross portion 1144 extends generally upward and outward from center 1048, the portion of upper portion 1172 of cross portion 1144 extending forward substantially corresponding to first loop 1122 and the portion of upper portion 1172 of cross portion 1144 extending rearward substantially corresponding to second loop 1124. A lower portion 1174 of cross portion 1144 extends generally downward and outward from center 1148, the portion extending forward substantially corresponding to first loop 1122 and the portion extending rearward substantially corresponding to second loop 1124.

Second loop 1124 includes an upper portion 1184 and a lower portion 1186 that extend rearward from center 1148 toward the wearer's heel according to an exemplary embodiment. Second loop 1124 is shown extending about the rear of the wearer's foot generally below their ankle and around the calcaneus or heel bone, as not to limit motion. Upper portion 1184 of second loop 1124 is shown extending generally along the inside of the wearer's foot. Lower portion 1186 extends beneath the wearer's foot, extending upward from the outer portion of the wearer's foot distal to midsagittal plane 20 to transition to upper portion 1184 below the wearer's ankle. In this way, training region 1120 of sock 1110 is disposed relative to the wearer's foot at locations both forward and rearward of the wearer's medial arch.

For the purposes of discussion, an exemplary operation of sock 1110 wherein the wearer is performing a running activity and exhibiting overpronation of the foot will be discussed.

As the wearer's foot rotates inward toward midsagittal plane 20, training region 1120 is elongated generally along and between where first loop 1122 is disposed over the wearer's big toe and where second loop 1124 is disposed at the wearer's heal bone. Elongation of training region 1120 occurs between first loop 1122 and center 1148, and between center 1148 and the portion of second loop 1124 disposed at the back of the wearer's heel. The elongation in this portion of training region 1120 generates feedback forces indicating to the wearer to rotate their foot outward by both turning their foot away from midsagittal plane 20 as well as to move their forefoot towards the midsagittal plane. In contrast to sock 810, the feedback forces are focused more so on the wearer's big toe than on the medial portion of the wearer's foot. When instructing the wearer to move their big toe upward and inward, the central portion generally follows, bringing the wearer's foot towards a more neutral biomechanic position.

Similar to socks 810, socks 1110 are intended to be worn as pairs, enabling them to act symmetrically.

Referring to FIGS. 32A-32C, an exemplary embodiment of sock 810 also configured to configured to reduced the risk of injuries, such as shin splints, PFP, Achilles tendonitis, and knee pain resulting from overpronation of the foot, and, more generally, poor running and walking mechanics is shown as sock 1210.

Sock 1210 includes a garment region 1218 and a training region 1220, similar to garment region 118 and training region 120 discussed with respect to short 110 above. Similar to sock 1110, at least one portion of training region 1220 is disposed proximate to the wearer's big toe, at least one portion of training region 1220 is disposed proximate to the wearer's heal bone, and training region 1220 is configured to generate feedback therebetween in response to rotation of the wearer's foot toward midsagittal plane 20.

Training region 1220 includes a first loop 1222, a second loop 1224, and an intermediate portion 1226 according to an exemplary embodiment. First loop 1222 transitions to and is interconnected with second loop 1224 along the inner medial portion of the wearer's foot proximate to midsagittal plane 20. This transition forms a cross portion 1244 having a center 1248 disposed proximate to the metatarsal of the wearer's big toe at the inside of the wearer's foot. Cross portion 1244, similar to cross portion 144, includes an upper portion 1272 and a lower portion 1274. The portions of upper portion 1272 and lower portion 1274 of cross portion 1244 extending forward from center 1248 transition to first loop 1222 and are disposed at least partially about the wearer's big toe.

First loop 1222 is shown disposed substantially about the wearer's big toe, being disposed at least partially over the tip of the wearer's toe. An upper portion 1280 of first loop 1222 extends from the tip of the wearer's toe along the top of the wearer's foot. A lower portion 1282 of first loop 1222 extends from the tip of the wearer's toe along the bottom of the wearer's foot at the inner portion of the wearer's foot proximate to midsagittal plane 20. Upper portion 1280 and lower portion 1282 of first loop coincide at or proximate to center 1248, helping to maintain first loop 1222 at a desired position relative to the wearer's foot. According to other exemplary embodiments, the first loop may be maintained in a desired position relative to the wearer's big toe and/or toes in any number of manners configured to generate sufficient tension in training region 1220 as a result of overpronation of the wearer's foot and configured to avoid causing discomfort to the wearer.

Similar to second loop 1124 of sock 1110, second loop 1224 of sock 1210 is shown disposed about the wearer's heal bone. Unlike second loop 1124, second loop 1224 substantially encircles the wearer's heal bone, extending both thereabove above and therebelow.

Intermediate portion 1226 includes an inner portion 1284 and an outer portion 1286 that extend rearward from center 1248 toward the wearer's heel, interconnecting first loop 1222 and second loop 1224. Inner portion 1284 is disposed along the inside of the wearer's foot proximate to their midsagittal plane. Outer portion 1286 extends rearward from center 1248 toward the wearer's heel and crosses over the top of the wearer's foot medially from proximate the inside of the wearer's foot to the outside.

For the purposes of discussion, an exemplary operation of sock 1210 wherein the wearer is performing a running activity and exhibiting overpronation of their feet will be discussed.

Sock 1210 operates similarly to sock 1110. As mentioned above, both sock 1110 and sock 1210 include training regions having a first loop disposed and maintained at least partially about the wearer's big toe and a second loop disposed and maintained at least partially about the wearer's heal. As the wearer's foot rotates inward toward midsagittal plane 20, elongation of training region 1220 generally along and between where first loop 1222 is disposed over the wearer's big toe and second loop 1224 is disposed at the wearer's heal bone occurs.

In contrast to sock 1110, center 1248 of sock 1210 is disposed proximate to the wearer's big toe rather than proximate to the center of the wearer's medial arch. Elongation of training region 1220 occurs between first loop 1222 and center 1248. Also, elongation of training region 1220 occurs along inner portion 1284 and outer portion 1286 of intermediate portion 1226 between center 1248 and second loop 1224. The elongation in intermediate portion 1226 generates feedback that indicates to the wearer to adjust their big toe upward and inward, and that indicates to the wearer to rotate their foot outward by both rotating their foot away from midsagittal plane 20 as well as move their forefoot towards the midsagittal plane.

Similar to socks 810, socks 1210 are intended to be worn as pairs, enabling them to act symmetrically.

Referring to FIGS. 33A-33C, an exemplary embodiment of sock 810 also configured to reduced the risk of injuries, such as shin splints, PFP, Achilles tendonitis, and knee pain resulting from overpronation of the foot, and, more generally, poor running and walking mechanics is shown as sock 1310.

Sock 1310 includes a garment region 1318 and a training region 1320, similar to garment region 118 and training region 120 discussed with respect to short 110 above. Training region 1320 includes a first portion or loop 1322 having a front or toe portion 1324 and a rear or heel portion 1326 in the exemplary embodiment shown. First loop 1322 is shown disposed about the wearer's foot generally from the wearer's toes to the wearer's heal. Front portion 1324 of first loop 1322 is shown as a pocket that effectively anchors first loop 1322 proximate to the tips of the wearer's toes. Rear portion 1326 of first loop 1322 is shown extending about the rear of the wearer's foot above the bottom of the wearer's foot and generally below the wearer's ankle to effectively anchor training region 1320 proximate to the heel of the wearer's foot. Front portion 1324 transitions to rear portion 1326 substantially medially, at the inside of the wearer's foot along an inner portion 1328 and at the outside of the wearer's foot along an outer portion 1330. While the pocket of front portion 1324 of first loop 1322 is shown enveloping all of the wearer's five toes, in another exemplary embodiment, the pocket of front portion 1324 may envelop less than all of the wearer's toes. According to other exemplary embodiments, the first portion of the first loop may be configured in substantially any manner to effectively anchor the training region at or proximate to one or more of the wearer's toes. According to some exemplary embodiments, the first portion may not be a complete loop, but, rather, may simply extend about a sufficient portion of the medial region of the wearer's foot and/or about the wearer's ankle to generate sufficient tension and remain substantially fixed relative to the desired portions of the wearer's anatomy (e.g., create an effective anchor thereat).

According to an exemplary operation of sock 1310 wherein the wearer exhibits pronation, as the wearer's foot rotates inward toward midsagittal plane 20 and the wearer's arch height begins to drop, inner portion 1328 between front portion 1324 of first loop 1322 and rear portion 1326 of first loop 1322 stretches because of the relative movement of the wearer's toes and heel. Training region 1320 seeks to counter these stresses, resulting in the generation of feedback forces. These forces indicate to the wearer to rotate their foot outward by both turning their foot away from midsagittal plane 20 and lifting their arch generally upwards, which begins to release the tension created between front portion 1324 and rear portion 1326 created by the drop in their arch height.

Similar to socks 810, socks 1310 are intended to be worn as pairs, enabling them to act symmetrically.

EXEMPLARY SHIRT EMBODIMENTS

Figure 34A:
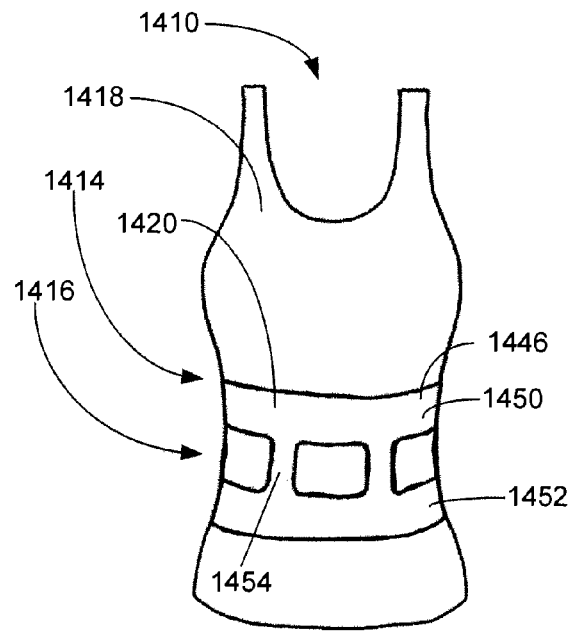
FIG. 34A is a front perspective view of an exemplary embodiment of a garment shown as a shirt illustrating the training region.
Figure 34B:
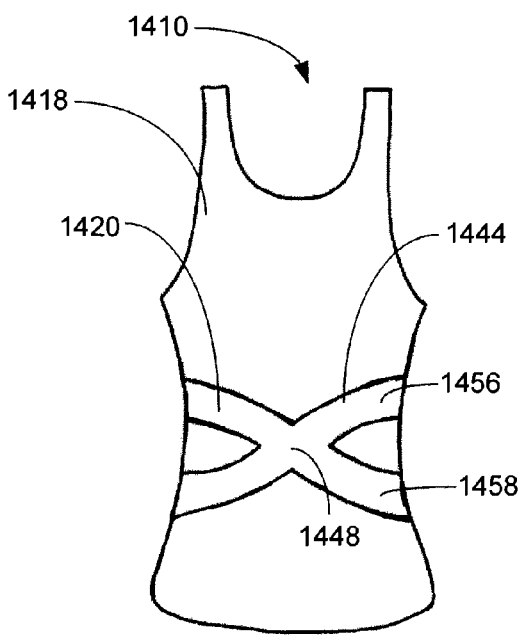
FIG. 34B is a rear perspective view of the exemplary embodiment a shirt of FIG. 34A illustrating the training region.
Figure 34C:
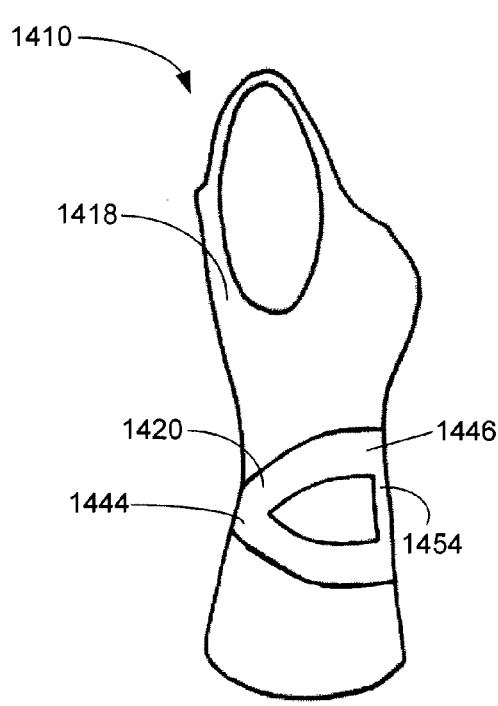
FIG. 34C is a right side perspective view of the exemplary embodiment of a shirt of FIG. 34A illustrating the training region.
Figure 34D:
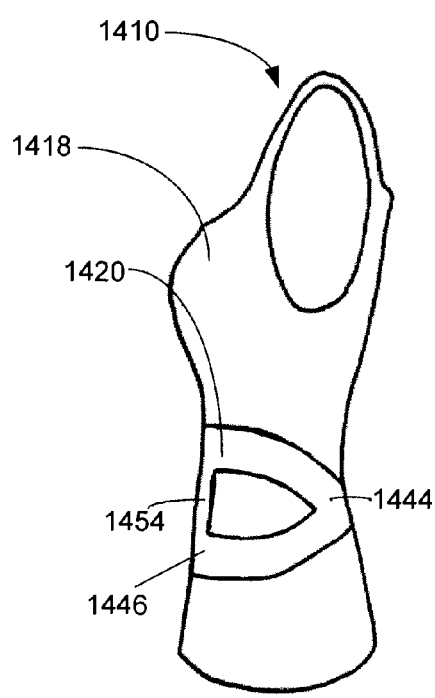
FIG. 34D is a left side perspective view of the exemplary embodiment of a shirt of FIG. 34A illustrating the training region.

Referring to FIGS. 34A-34C, garment 10 is shown as a shirt 1410 including an integrated biofeedback device 1414 having a tensioning system 1416 according to an exemplary embodiment.

Shirt 1410 may be used during physical activities where people often exhibit distortions in their kinetic chains or their ability to recruit their muscles to produce smooth coordinated movements (e.g., during any athletic activity such as running, jumping, etc.). Shirt 1410 is configured to assist the wearer in maintaining overall body alignment, which positively impacts athletic performance while reducing the risk of injury through improvement of the wearer's biomechanic positions. The feedback generated by tensioning system 1416 of shirt 1410 indicates to the wearer that their biomechanic position is sub-optimal and indicates the wearer how to move their torso towards center along the midcoronal and midsagittal planes, aligning the wearer's head, shoulders, and hip to enhance overall muscular recruitment. In this way, shirt 1410 is configured to optimize overall athletic function, including, but not limited to, reaction time, strength, balance, coordination, and athletic skills. It should be noted that, while shirt 1410 is shown configured for a woman, the tensioning system may be adapted to a shirt configured more particularly for a man, an adolescent, or a child.

Balance, running, and other basic movements rely on the alignment of the lumbar vertebrae region of the body, which is associated with the abdominal region of the torso. The lumbar vertebrae region is responsible for maintaining neutral trunk alignment in an effort to avoid abnormal movement patterns. Maintaining neutral truck alignment helps a person to achieve optimal kinetic link sequencing or alignment.

Figure 35B:
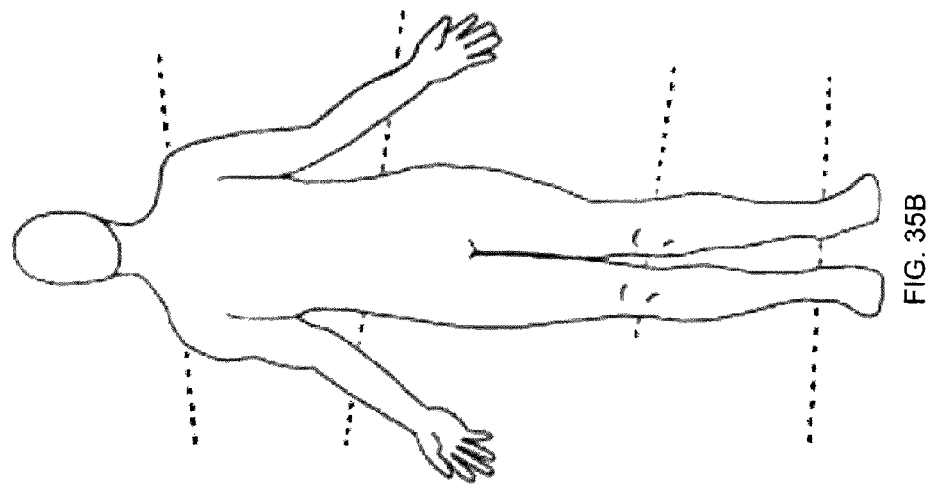
FIG. 35B illustrates a person exhibiting postural asymmetries and having a sub-optimal kinetic sequence.
Figure 35A:
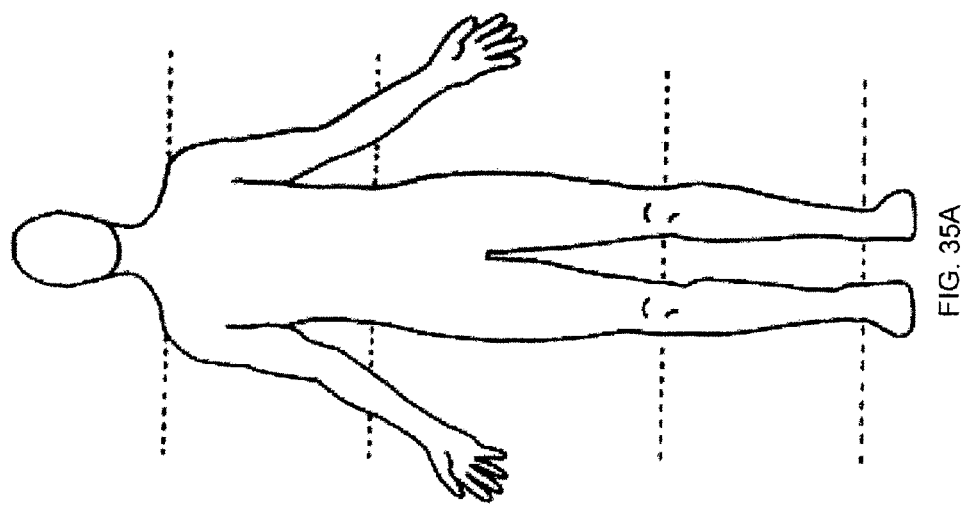
FIG. 35A illustrates a person exhibiting postural symmetry and having an optimal kinetic sequence.
Figure 37A:
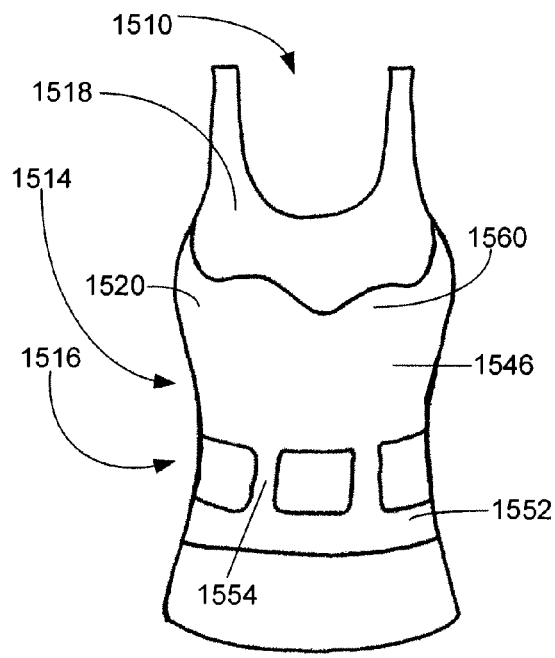
FIG. 37A is a front perspective view of a second exemplary embodiment of a garment shown as a shirt illustrating the training region.
Figure 37B:
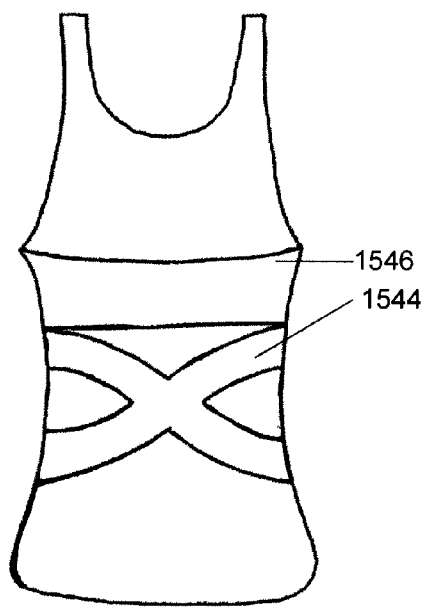
FIG. 37B is a rear perspective view of the exemplary embodiment a shirt of FIG. 37A illustrating the training region.
Figure 37C:
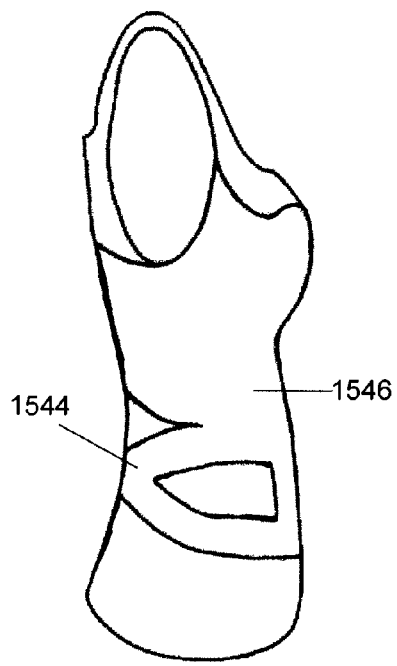
FIG. 37C is a right side perspective view of the exemplary embodiment of a shirt of FIG. 37A illustrating the training region.
Figure 37D:
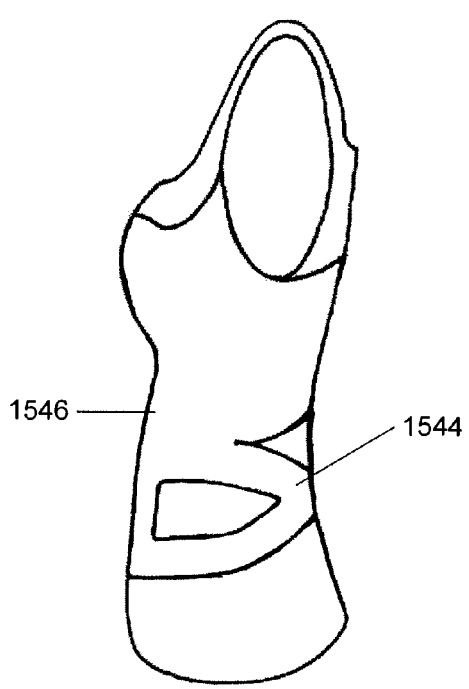
FIG. 37D is a left side perspective view of the exemplary embodiment of a shirt of FIG. 37A illustrating the training region.
Figure 38A:
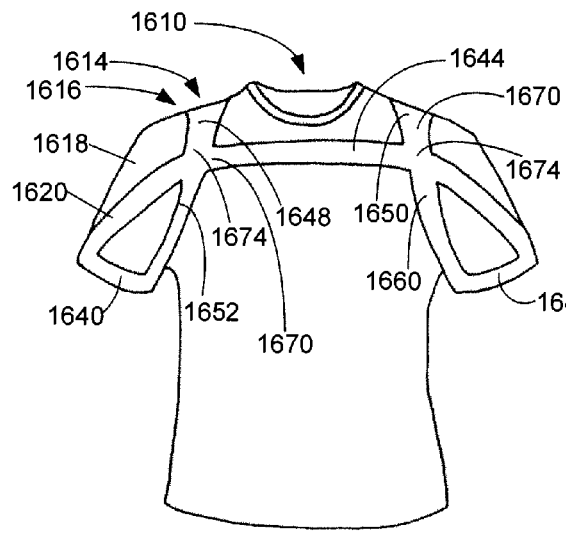
FIG. 38A is a front perspective view of a third exemplary embodiment of a garment shown as a shirt illustrating the training region.
Figure 38B:
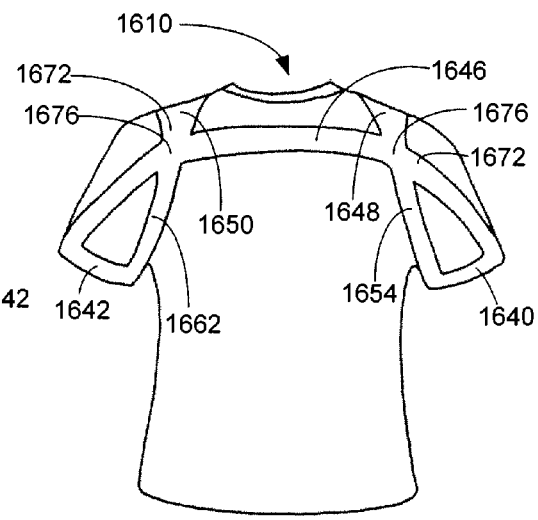
FIG. 38B is a rear perspective view of the exemplary embodiment a shirt of FIG. 38A illustrating the training region.
Figure 38C:
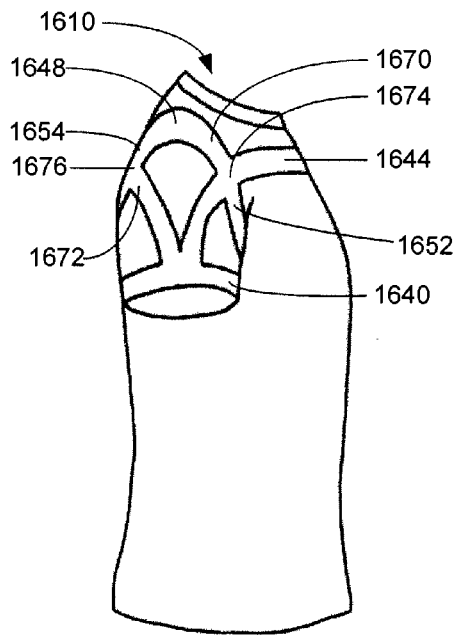
FIG. 38C is a right side perspective view of the exemplary embodiment of a shirt of FIG. 38A illustrating the training region.
Figure 38D:
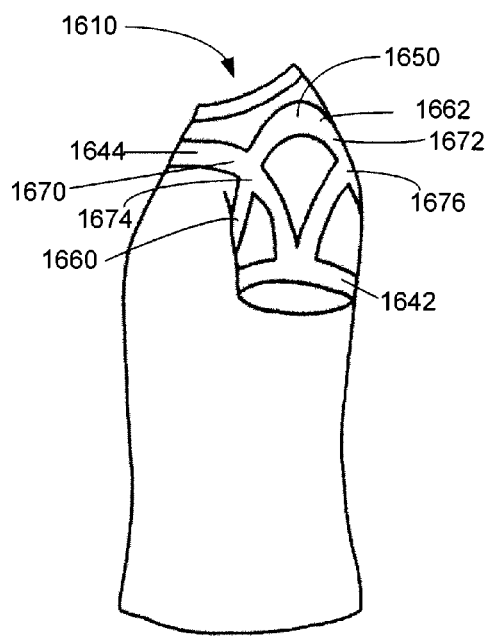
FIG. 38D is a left side perspective view of the exemplary embodiment of a shirt of FIG. 38A illustrating the training region.

Referring to FIG. 35A, when a person's kinetic link sequencing is optimal, the summation of forces performed in a specific activity sequence results in an efficient and effective movement pattern. Typically, a person's center of gravity is located substantially at the intersection of planes 20, 22, and 24, and is aligned with their base support (e.g., feet).

Referring to FIG. 35B, when a person's kinetic link sequencing is sub-optimal, inefficiencies in movements result in performance degradation, and may put the person's body at risk for injury because their center of gravity has shifted away from alignment with their base support. The resulting imbalance requires the application of unnecessary forces to perform a given activity while causing the person to lose stability and balance, and increasing the person's risk of fall and/or injury. For example, as a person begins to lean to one side, their center of gravity moves in the same direction away from alignment with their midsagittal plane, causing them to be off balance. When a person is off balance, additional movements (e.g., the lifting of the opposite arm or leg or shifting the head and curving the spine in the opposing direction) typically result from their efforts to maintain stability while performing a given activity.

FIG. 35B shows an example of the effects of sub-optimally aligned kinetic links on a person's posture. The person exhibits translations and angular movements away from their center, which can affect the alignment of the wearer's entire body. For example, the person is shown exhibiting valgus knee collapse. The valgus knee collapse not only affects the body position of the person's lower extremities, but also affects the person's torso alignment, which affects the alignment of the person's upper extremities. More generally, any misalignment of the kinetic links typically results in misalignments of other kinetic links. Accordingly, the alignment of the upper and/or lower extremities can be improved by properly aligning the torso.

Shirt 1410 is shown a garment region 1418 and a training region 1420, similar to garment region 118 and training region 120 of short 110.

Referring back to FIGS. 34A-34D, training region 1420 includes a cross portion 1444 generally opposite a front portion 1446 according to an exemplary embodiment. The orientation and position of training region 1420 relative to the wearer's body is such that feedback substantially proportional to relative alignment (or misalignment) of portions of the wearer's body targeted by shirt 1410 is generated. The various portions of training region 1420 are interconnected in a manner providing for the portions to be responsive to stretch in other portions and to provide feedback.

Front portion 1446 includes an upper front portion 1450, a lower front portion 1452, and one or more intermediate portions 1454 interconnecting upper front portion 1450 and lower front portion 1452 according to an exemplary embodiment. Upper front portion 1450 and lower front portion 1452 are shown disposed substantially transversely across the wearer's torso and spaced a distance apart, intended to border the umbilical region of the wearer's abdomen (see, e.g., FIG. 35 illustrating the umbilical region 42 of the abdomen). Upper front portion 1450 is configured to be positioned such that it is disposed at or above the wearer's subcostal plane (see, e.g., FIG. 36 illustrating the subcostal plane 44). The subcostal plane is the horizontal plane through the lowest point of the rib cage. Lower front portion 1452 configured to be positioned such that it is disposed at or below the intertubercular plane (see, e.g., FIG. 36 illustrating the intertubercular plane 46). The intertubercular plane is the horizontal plane through the tubercles of the iliac crests. Intermediate portions 1454 are shown disposed substantially vertically between upper front portion 1450 and lower front portion 1452. Intermediate portions 1454 are configured to help maintain front upper portion 1450 and lower front portion 1452 in a position substantially aligned between the left and right midclavicular lines and parasternal lines relative to the wearer's body (see, e.g., FIG. 36 illustrating the left and right midclavicular lines 48, 50 and parasternal lines 52, 54).

Cross portion 1444 is shown disposed at the posterior side 32 of the wearer's body generally along the wearer's back and including a center 1448, an upper portion 1456, and a lower portion 1458 according to an exemplary embodiment. Cross portion 1444 is configured to help establish and maintain the symmetry of training region 1420 of shirt 1410. Center 1448 is intended to be substantially aligned with the point of maximum flexibility along the wearer's lumbar spine (e.g., similar to disposing cross portion 144 of short 110 across the bending portion of the wearer's gluteus maximus) to achieve greater responsiveness to relative movement of the wearer's lumbar vertebrae region. Upper portion 1456 of cross portion 1444 transitions to upper front portion 1450 at both the left and right lateral sides of the wearer's body. Lower portion 1458 of cross portion 1444 transitions to lower front portion 1452 at both the left and right lateral sides of the wearer's body.

For the purposes of discussion, an exemplary operation of shirt 1410 wherein the wearer is performing an a jumping activity including an approach will be discussed.

Optimal biomechanic motion for a jumping activity including an approach is characterized by the wearer's head being in line with their shoulders and hips. This alignment helps position the person's center of mass over their feet, improving their vertical jumping performance by better aligning the force exerted with the vertical force axis (i.e., maximizing the applied force in the desired direction). Further, this alignment minimizes stress on the person's joints, ligaments, etc.

A person performing a running activity may increase or decrease the arch in their lumbar region resulting in anterior or posterior tilting of the pelvis, respectively. Anterior and posterior tilting of the pelvis may affect the alignment of a person's upper and/or lower extremities. For example, an anteriorly tilted pelvis not only causes misalignments in the spine but also the upper and lower extremities, overworking muscles and causing premature fatigue. Extensive lateral and rotational misalignments of the pelvis/torso may also result during running. In the case of an anteriorly tilted pelvis resulting from the person arching their lumbar region, training region 1420 will elongate along upper front portion 1450 and lower front portion 1452 between the right and left lateral sides of the wearer's body, stretching relative to center 1448 of cross portion 1444. Further, intermediate portions 1454 will elongate generally vertically as the wearer's umbilical region stretches, their subcostal plane moving further from their intertubercular plane. Training region 1420 produces feedback forces in response to the stretch, the feedback indicating to the wearer to tilt their pelvis generally towards a more neutral position (i.e., lessening arch in their lumbar region), and to move their subcostal plane and their intertubercular plane toward each other. The feedback sensed at each point on the wearer's abdomen corresponds to the wearer's torso misalignment and corresponding correction required to bring that point into more optimal alignment with the rest of the wearer's body.

Referring to FIGS. 37A-37D, an exemplary embodiment of shirt 1410 further including a bra portion 1560 according to an exemplary embodiment is shown as shirt 1510.

Shirt 1510 includes a tensioning system 1516 includes a training region 1520 substantially identical to training region 1420 of shirt 1410 with the exception of bra portion 1560. Accordingly, training region 1520 includes a cross portion 1544, an upper loop 1546 at least partially defining bra portion 1560, a lower front portion 1552, and one or more intermediate portions 1554 according to an exemplary embodiment. With the addition of bra portion 1560, shirt 1510 provides for support of female breasts. By integrating such a support structure within the garment, female wearers would not require additional undergarments. Generally, upper loop 1546 includes what is the upper front portion of shirt 1410, but also extends around the wearer's entire torso and extends upward to provide support. According to other exemplary embodiments, the bra portion can be configured in substantially any manner to provide support of female breasts. Further, a bra portion may be incorporated into any of the shirt embodiments disclosed herein.

Referring to FIGS. 38A-38D, garment 10 is shown as a shirt 1610 including an integrated biofeedback device 1614 having a tensioning system 1616 according to an exemplary embodiment. Shirt 1610 is configured to help provide for optimal biomechanic motion of a wearer's upper extremities during physical activity. Feedback generated by tensioning system 1616 indicates to the wearer that their biomechanic position is sub-optimal and indicates to the wearer how to adjust toward a more optimal biomechanic position, wherein their upper extremities are substantially optimally aligned. In this way, shirt 1610 is configured to optimize upper extremity function, including, but not limited to, reaction time, flexibility, stability, strength, accelerations, deceleration, swinging, and throwing skills.

Overhead athletes (e.g., persons participating in activities involving overhead motions such as tennis, volleyball, softball, baseball, etc.) are highly susceptible to shoulder injuries resulting from sub-optimal biomechanics (e.g. hyperangulation and elbow drop). Generally, optimal overhead/throwing biomechanics involves a person maintaining proper head, shoulder, and hip alignment as well as maintaining proper elbow elevation, level with the shoulder. In this position, the person is substantially balanced and centered with minimal stress on the shoulder joint and ligaments.

Sub-optimal overhead biomechanics (e.g., while throwing, swinging, etc.) may result in injuries, the most common of which are ligament and soft-tissue tears of the glenohumeral joint and the labrum. Another common injury is scapular dyskenisis, or altered position and movement patterns of the scapula. Among other things, the scapula stabilizes and supports proper rotator cuff function. During overhead motion that is biomechanically optimal or near optimal, the scapula undergoes a protraction motion as the arm undergoes acceleration and follow-through, transferring energy (e.g., to a ball being thrown or hit). This action is followed by a retraction to return the scapula to its neutral position. Excessive protraction with the inability to properly retract the scapula to a neutral position increases a person's susceptibility to rotator cuff impingement and exposes the glenohumeral joint to injury. Such poor biomechanic positioning becomes even more prevalent as the person fatigues. Still other injuries resulting from poor biomechanics while performing overhead activities (e.g., throwing, etc.) include, but are not limited to chronic instability.

Shirt 1610 is configured to address these scapular biomechanics and other poor overhead biomechanics. Achieving optimal overhead biomechanic motion generally involves a balancing of the wearer's scapulothoracic movement, which is interdependent with arm movements.

Figure 39B:
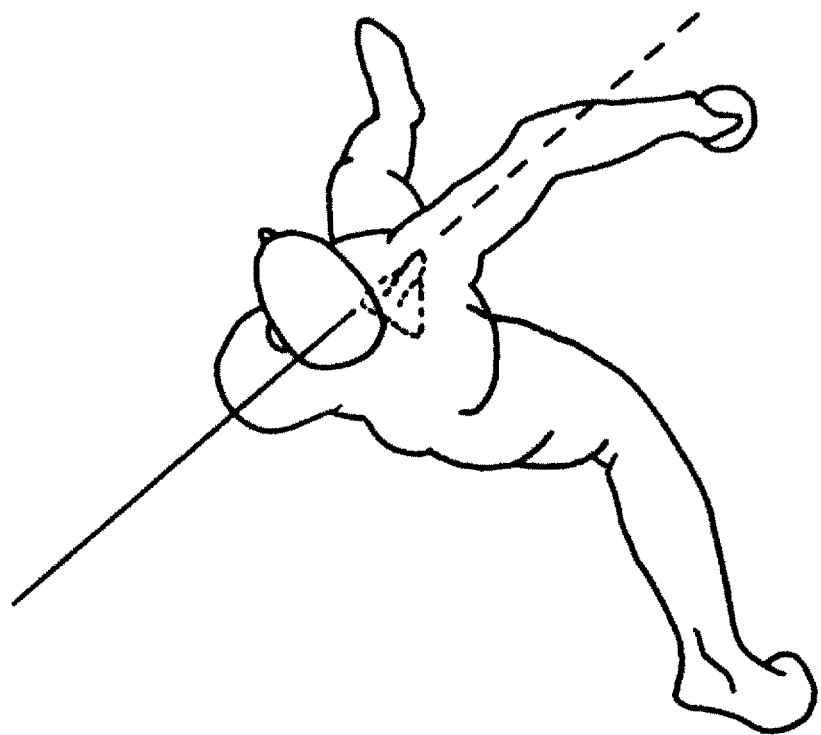
FIG. 39B is a top perspective view of an overhand pitcher having proper scapular biomechanic positioning and exhibiting a shoulder protecting posture.
Figure 39A:
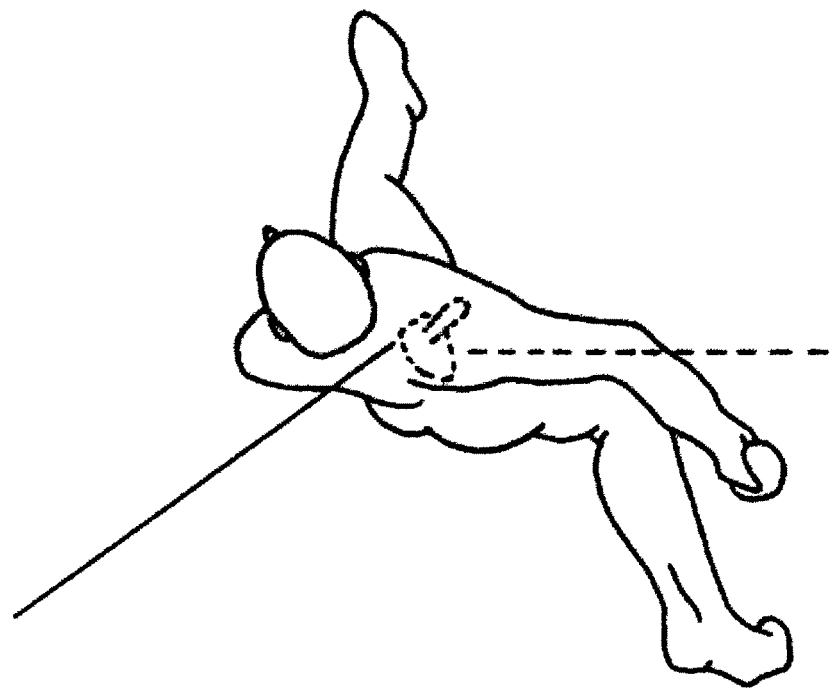
FIG. 39A is a top perspective view of an overhand pitcher with poor scapular biomechanic positioning exhibiting hyperangulation.

For example, when performing an overhead throw as shown in FIG. 39A, people with poor scapular biomechanic positioning often exhibit hyperangulation. A drop in the elbow (e.g., a reduction in arm abduction from a more optimal abduction angle of 90±10 degrees) in addition to hyperangulation further stresses the shoulder and typically results from fatigue that further misaligns the head, shoulders, and hip. A person exhibiting hyperangulation typically demonstrates an abduction and external rotational movement of the shoulder, causing the humerus to be out of the scapular plane. Accordingly, the person's arm is in their coronal plane and out of alignment with their shoulders. This misalignment of the person's arms with their shoulders may cause the person to lose control of their throws and puts stress on the shoulder joint and corresponding ligaments, which include the capsular ligaments and the three glenohumeral ligaments which anchor the front of the shoulder joint. It should be noted that hyperangulation can also result from causes other than poor scapular biomechanics (e.g., hyperangulation can result from sub-optimal biomechanic motion associated with increased lumbar londosis, etc.). The garment 10 used to correct hyperangulation, accordingly, may vary depending on the cause. For example, shirt 1410 is typically better suited to correct hyperangulation caused by lumbar londosis, whereas shirt 1610 is typically better suited to correct hyperangulation caused by poor scapular biomechanics.

FIG. 39B illustrates a person exhibiting a shoulder protecting posture. The person has their humerus generally in line with their scapular plane, resulting in a more optimal scapular position and biomechanic motion. In general, proper throwing mechanics includes abduction in the scapular plane and a greater arm to body abduction angle during the late cocking and early acceleration phases.

Shirt 1610 is configured to provide feedback instructing a wearer to correct unbalanced scapular motion and arm positions associated sub-optimal overhead postures (e.g., during throwing, swinging etc.) by indicating to the wearer how to adjust their body to achieve more optimal biomechanic motion. In this way, shirt 1610 reduces the risk of injuries, such as impingement, scapula dyskinesis, and chronic instability resulting from poor overhead biomechanics. For example, shirt 1610 provides feedback to a wearer exhibiting hyperangulation and elbow drop indicating to them that their dynamic posture or dynamic motion is sub-optimal. Shirt 1610 further corrects hyperangulation and elbow drop associated sub-optimal postures by indicating to the wearer how to adjust their body to achieve more optimal biomechanic motion.

Referring back to FIGS. 38A-38D, shirt 1610 includes a garment region 1618 and a training region 1620. Training region 1620 of shirt 1610 includes a first loop 1640, a second loop 1642, a front portion 1644, a rear portion 1646, a first shoulder portion 1648, and a second shoulder portion 1650.

First loop 1640 is intended to substantially encircle the wearer's upper arm at the right lateral side of the wearer's body generally between the wearer's glenohumeral joint and the wearer's elbow. Second loop 1642 substantially encircles the wearer's arm at the left lateral side of the wearer's body generally between the wearer's glenohumeral joint and elbow. First loop 1640 and second loop 1642 are configured to help maintain training region 1620 in a desired position relative to the wearer's body. In other exemplary embodiments, the first and/or second loop may be located beyond the wearer's elbow and the garment will still substantially achieve the desired effects.

First shoulder portion 1648 and second shoulder portion 1650 are located inward of the acromioclavicular joint on the right lateral and left lateral side of the wearer's body, respectively, effectively anchoring training region 1620 under each of the wearer's arms in the region opposite the point at which the deltoid attaches to the humerus. First shoulder portion 1648 is interconnected with itself under the wearer's right arm substantially opposite the location at which the deltoid attaches to the humerus, substantially forming a loop. First shoulder portion 1648 is further interconnected with first loop 1640 under the wearer's right arm. Second shoulder portion 1650 is interconnected with itself under the wearer's left arm substantially opposite the location at which the deltoid attaches to the humerus, substantially forming a loop. Second shoulder portion 1650 is further interconnected with second loop 1642 under the wearer's left arm. According to other exemplary embodiments, first shoulder portion 1648 and second shoulder portion 1650 may be configured in any manner wherein they are interconnected with one or more portions of training region that help effectively anchor them in desired positions corresponding to the wearer's right and left arms, respectively.

Front portion 1644 and rear portion 1646 are disposed along the anterior and posterior sides of the wearer's chest along the upper sternal region, respectively, according to an exemplary embodiment. Front portion 1644 and rear portion 1646 are shown substantially centered on the glenohumeral joint and extending substantially between first loop 1640 and second loop 1642. The glenohumeral joint articulation resulting from scapulothoracic movements, helps training region 1620 to be responsive to the scapulothoracic movements of the wearer. At the right lateral side of the wearer's body, front portion 1644 and rear portion 1646 are interconnected with first loop 1640 proximate to where the deltoid attaches to the humerus. At the left lateral side of the wearer's body, front portion 1644 and rear portion 1646 are interconnected with second loop 1642, proximate to where the deltoid attaches to the humerus. According to other exemplary embodiments, front portion 1644 and rear portion 1646 may be configured in any manner wherein they are interconnected with one or more portions of training region 1620 that help effectively anchor them in desired positions corresponding to the wearer's right and left arms, respectively.

At each shoulder, the interconnection of the first shoulder portion 1648 with front portion 1644 and rear portion 1646 forms cross portions. First shoulder portion 1648 includes a front portion 1652 and a rear portion 1654. Second shoulder portion 1650 includes a front portion 1660 and a rear portion 1662. Anterior cross portions 1670 are formed by the interconnection of front portions 1652, 1660 of shoulder portions 1648, 1650 with front portion 1644 at the anterior side of the wearer's body on their right and left lateral sides, respectively. Posterior cross portions 1672 are formed by the interconnection of rear portions 1654, 1662 of shoulder portions 1648, 1650 with rear portion 1646 at the posterior side of the wearer's body at their right and left lateral sides, respectively. Each anterior cross portion 1670 includes a center 1674, and each posterior cross portion 1672 includes a center 1676. Cross portions 1660 and 1662 are shown disposed anterior and posterior to the wearers scapulothoracic joints (the point of maximum bend providing the largest elongation signal for proper feedback response), respectively.

Front portion 1652 transitions to rear portion 1654 of first shoulder portion 1648 between anterior cross portion 1670 and posterior cross portion 1672. Between anterior cross portion 1670 and posterior cross portion 1672, first shoulder portion 1648 is configured to be disposed substantially above the wearer's clavicle between the wearer's neck and glenohumeral joint along the wearer's midcoronal plane 22 at the wearer's right lateral side. Similarly, front portion 1660 transitions to rear portion 1662 of second shoulder portion 1650 between anterior cross portion 1670 and posterior cross portion 1672. Between anterior cross portion 1670 and posterior cross portion 1672, second shoulder portion 1650 is configured to be disposed substantially above the wearer's clavicle between the wearer's neck and glenohumeral joint along the wearer's midcoronal plane 22 at the wearer's left lateral side.

Accordingly, first shoulder portion 1648 and second shoulder portion 1650 are effectively anchored both above and below the wearer's arm (discussed above). By effectively anchoring first shoulder portion 1648 and second shoulder portion 1650 both above and below the wearer's arm, training region 1620 helps the wearer achieve a more optimal biomechanic motion wherein their arms are abducted. That is, when the wearer's arms are in the desired abducted position, their biomechanic position is considered substantially optimal for the purposes of shirt 1610 and substantially no feedback is sensed. It follows that, when the wearer's arms are abducted at an angle greater than 90 degrees, tension is produced in training region 1620 below the wearer's arms, and the resultant feedback indicates to the wearer to lower their arms. Further, when the wearer's arms are at their sides in the "normal" arm position, tension is produced in training region 1620 above the wearer's arms, and the resultant feedback indicates to the wearer to lift their arms. It should be noted, however, that gravity will generally keep the wearer's arms at their sides when they are not activating muscles to counter gravity (e.g., to lift their arm to throw, etc.).

During game play, the wearer may want their arms raised a bit in a defensive posture. In such a defensive posture, the muscles are in play. Once in this position (or, more generally, once the muscles are sufficiently activated) any deviation from 90 degrees (positive or negative) will provide tension and feedback forces within training region 1620, which will be sensed and responded to by the wearer's proprioceptive system.

An exemplary embodiment of the operation of shirt 1610 during a throwing activity will now be discussed. Optimal biomechanics when throwing involves the humerus being limited in its elevation to approximately 90 degrees to maintain the humerus head within the center of the glenohumeral joint for optimal stability. Thus, as a person lifts their arm into the cocking position to throw or swing, the tension of training region 1620 balances by gradually lessening above and increasing below the arm, providing feedback throughout the throwing or swinging action to maintain proper elevation. Balancing the scapulothoracic movements both scapular retraction and protraction is also important for proper throwing biomechanics. As the scapula retracts during the windup and cocking phase, energy begins to build within the glenohumeral joint through the application of stress. During this phase front portion 1644 of training region 1620 elongates, generating tension in training region 1620 anteriorly along the wearer's upper chest while reducing the tension posteriorly along the wearer's upper back, providing feedback to the wearer indicating the wearer to keep their humerus in line with the scapular plane, resulting in a more optimal scapular position. As energy is released during the acceleration and follow-through phases, scapula protraction occurs shifting the tension in the training region posteriorly along the scapulothoracic joint and the upper back, providing feedback for the return of the arm and scapula via refraction to the neutral position (i.e., 90 degree abduction arm angle with the scapula forming a 30 degree angle anterior to the coronal plane).

Shoulder injuries resulting from poor throwing biomechanics are also prevalent in underhand pitching. Typical symptoms of injury among softball pitchers include, but are not limited to, anterior shoulder pain. Windmill pitching, unlike overhand pitching, involves the pitcher's arm rotating 360 degrees. Generally, the pitcher's arm moves from full elevation to 90 degrees of shoulder flexion and experiences full arm external rotation before releasing the ball following arm internal rotation and adduction across the body. Underarm or fast-pitch softball throwing has similar biomechanics to overhand throwing, with the exception that in a standard overhand pitch the humerus is abducted rather than being in the plane of the body; power generation is the result of an internal rotation rather than adduction across the body; and follow-through requires eccentric muscle activity of the external rotators rather than the activation of the biceps brachii during the windmill pitch. Thus, subacromial impingement may occur in underhand pitchers exhibiting sub-optimal biomechanic motion. When the arm is raised, the scapula needs to move down and away from the acromion and this action allows for the rotator cuff to glide smoothly under the acromion during overhead movements. Underhand pitchers not only need to address the balancing of their scapular protraction and retraction movements, but they also need to ensure that the scapula is positioned downward and away from acromion during the action. Consequently, shirt 1610 could reduce the risk of injury resulting not only from overhand, but also underhand throwing by providing additional sensory cues to the wearer to optimize biomechanic motions for the additional arm positions required for underhand pitching motions. For example, these additional sensory cues in the form of additional protraction feedback could be provided from an additional or customized training region portion extending generally between first shoulder portion 1648 and second shoulder portion 1650 along the wearer's back at their posterior side. The additional training region or customization would decrease the elasticity of the garment, helping to control the rotation of the wearer's humerus and making it less likely to rotate internally at the shoulder. One benefit of this added control is that the pitcher's thumb is maintained in a more forward position producing a more optimal, safer biomechanic underhand motion.

Figure 40A:
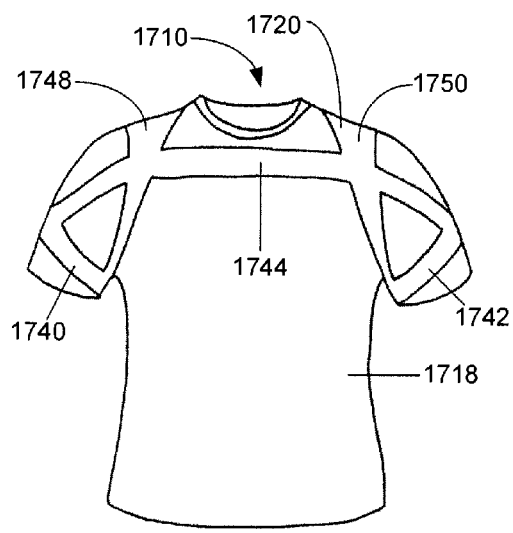
FIG. 40A is a front perspective view of a fourth exemplary embodiment of a garment shown as a shirt illustrating the training region.
Figure 40B:
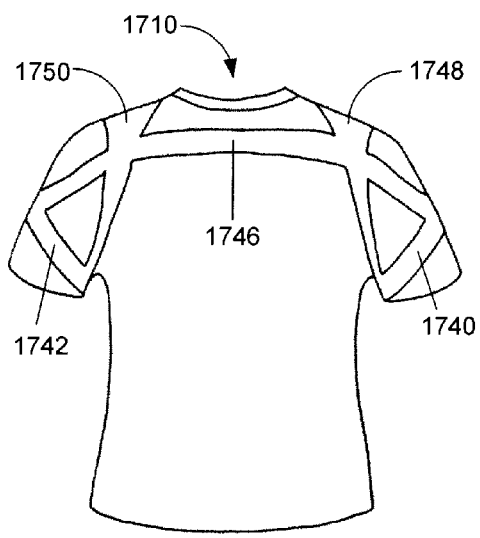
FIG. 40B is a rear perspective view of the exemplary embodiment a shirt of FIG. 40A illustrating the training region.
Figure 40C:
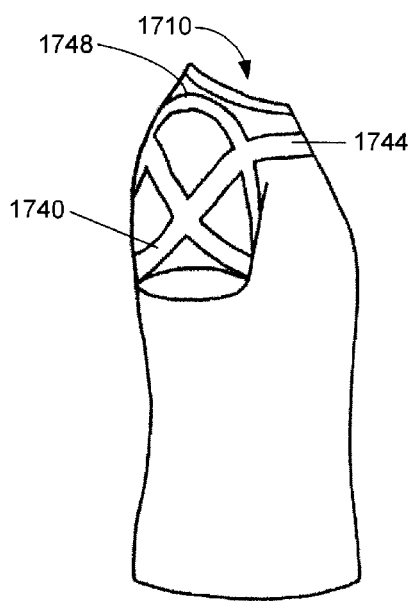
FIG. 40C is a right side perspective view of the exemplary embodiment of a shirt of FIG. 40A illustrating the training region.
Figure 40D:
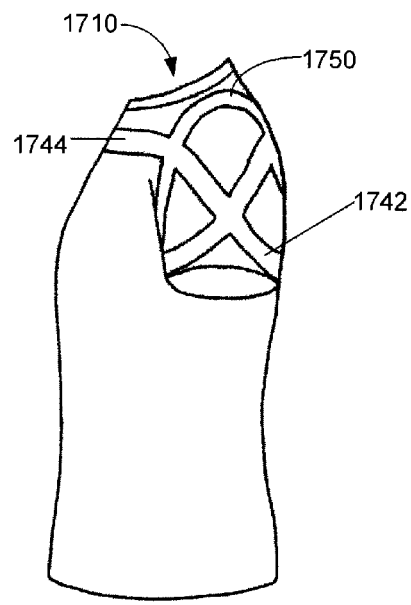
FIG. 40D is a left side perspective view of the exemplary embodiment of a shirt of FIG. 40A illustrating the training region.
Figure 41A:
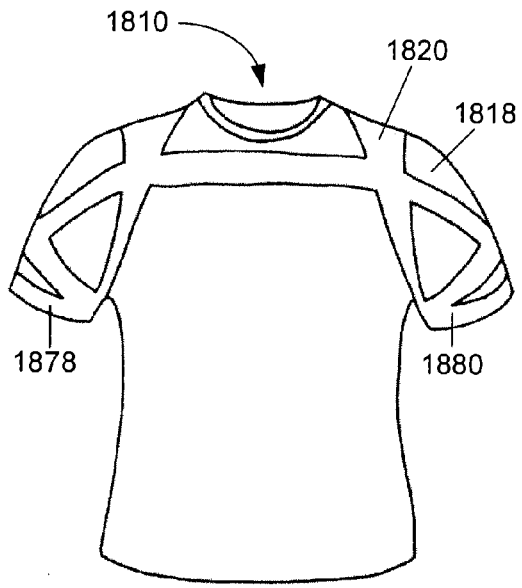
FIG. 41A is a front perspective view of a fifth exemplary embodiment of a garment shown as a shirt illustrating the training region.
Figure 41B:
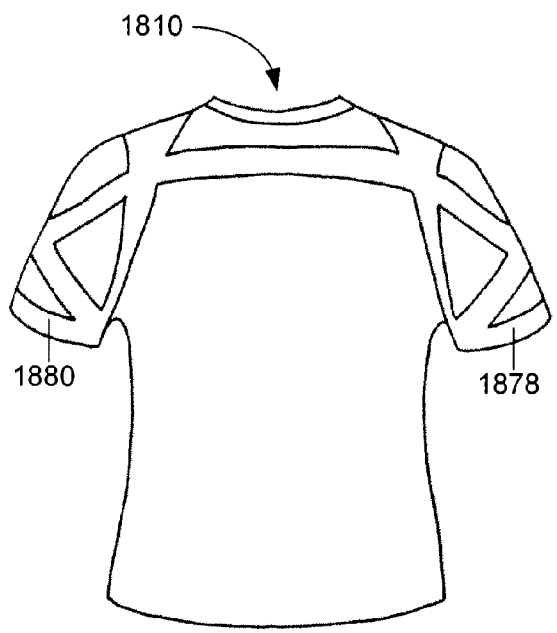
FIG. 41B is a rear perspective view of the exemplary embodiment a shirt of FIG. 41A illustrating the training region.
Figure 41C:
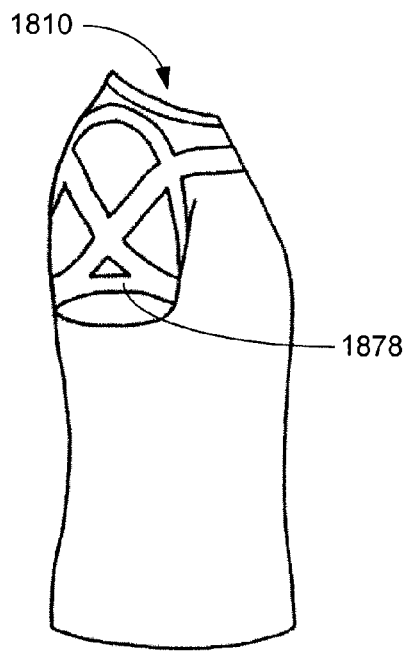
FIG. 41C is a right side perspective view of the exemplary embodiment of a shirt of FIG. 41A illustrating the training region.
Figure 41D:
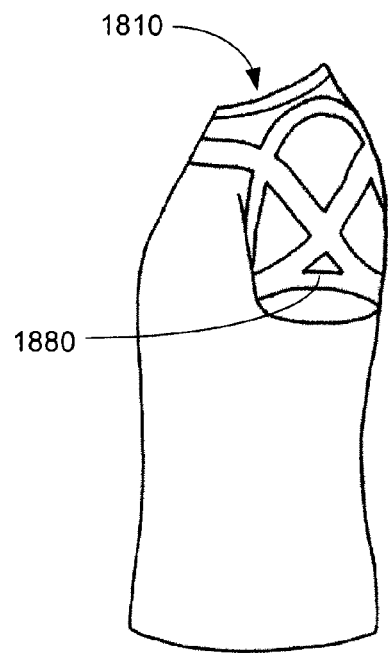
FIG. 41D is a left side perspective view of the exemplary embodiment of a shirt of FIG. 41A illustrating the training region.
Figure 43A:
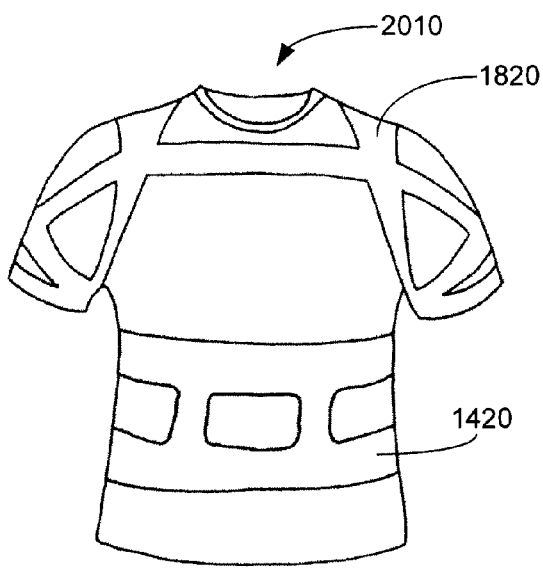
FIG. 43A is a front perspective view of a seventh exemplary embodiment of a garment shown as a shirt illustrating the training region.
Figure 43B:
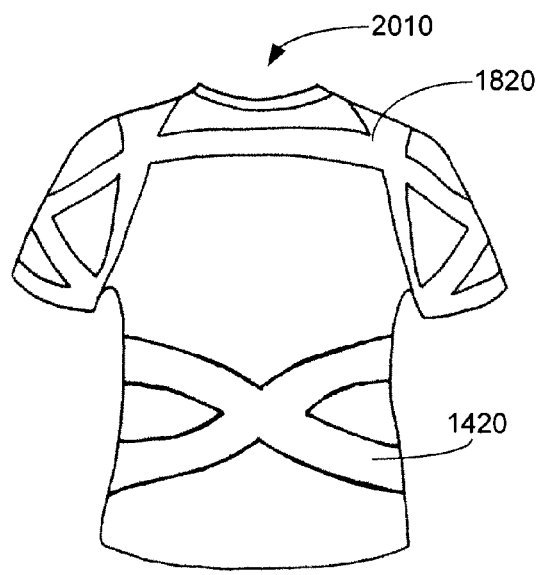
FIG. 43B is a rear perspective view of the exemplary embodiment a shirt of FIG. 43A illustrating the training region.
Figure 43D:
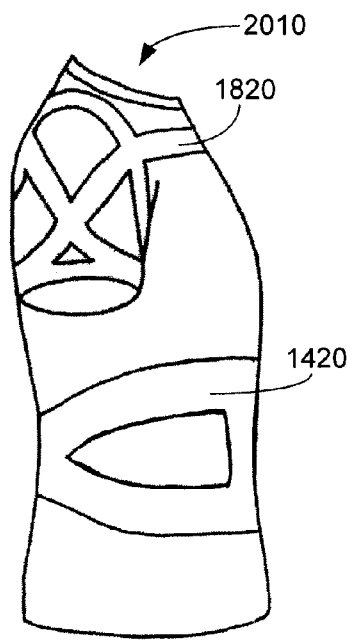
FIG. 43D is a left side perspective view of the exemplary embodiment of a shirt of FIG. 43A illustrating the training region.
Figure 43C:
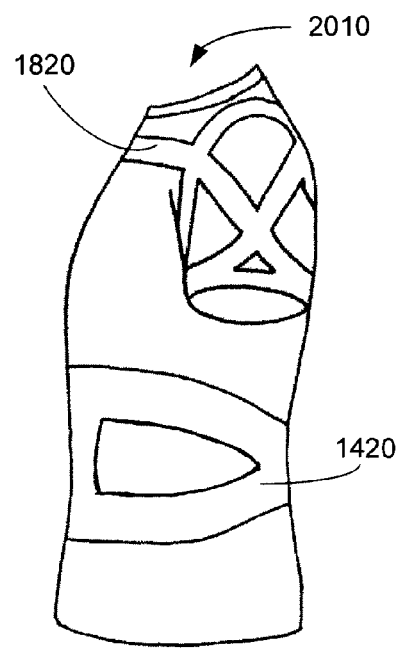
FIG. 43C is a right side perspective view of the exemplary embodiment of a shirt of FIG. 43A illustrating the training region.

Referring to FIGS. 40A-40C, an alternative embodiment of shirt 1610 is shown according to an exemplary embodiment shown as shirt 1710.

Shirt 1710 includes a garment region 1718 and a training region 1720. Training region 1720 of shirt 1710 is substantially similar to training region 1620 of shirt 1610, including substantially the same portions and having these portions disposed relative to the wearer's body in substantially the same positions. Training region 1720 includes a first loop 1740, a second loop 1742, a front portion 1744, a rear portion 1746, a first shoulder portion 1748, and a second shoulder portion 1750. Training region 1720 differs from training region 1620 in that the various portions of training region 1720 extend around the wearer's body as part of a singular, continuous knit band that is wrapped thereabout in a continuous, looping fashion. For example, front portion 1744 is disposed along the anterior side of the wearer's chest along the upper sternal region. Beyond the wearer's right lateral shoulder, front portion 1744 transitions to first loop 1740, which wraps around the wearer's arm. First loop 1740 then transitions to rear portion 1746, which is disposed along the posterior side of the wearer's chest along the upper sternal region. Front portion 1644 and rear portion 1646 of shirt 1610, by contrast, are interconnected with first loop 1740 beyond the wearer's right lateral shoulder. It should be noted, that the portions of training region 1620 may be continuously formed (e.g., by knitting) according to some exemplary embodiments. However, these portions take on the appearance of more discrete, interconnected portions that could not be as easily mimicked by wrapping a singular band about the wearer's body in a continuous, looping fashion.

Referring to FIGS. 41A-41D, an alternative embodiment of shirt 1710 is shown further according to an exemplary embodiment shown as shirt 1810.

Shirt 1810 includes a garment region 1818 and a training region 1820. Training region 1820 of shirt 1810 is substantially similar to training region 1720 of shirt 1710, including substantially the same portions and having these portions disposed relative to the wearer's body in substantially the same positions. In addition to the portion of training region 1720, training region 1820 further includes an additional loop 1878, 1880 around each of the wearer's arms, disposed substantially between the wearer's glenohumeral joint and elbow. Loops 1878 and 1880 help retain other portions of training region 1820 in their desired positions relative to the wearer's body as they are relatively tight to the wearer's body.

Referring to FIGS. 42A-42D, an alternative embodiment of shirt 1610 is shown according to an exemplary embodiment shown as shirt 1910.

Shirt 1910 includes a garment region 1918 and a training region 1920. Shirt 1910 is configured to provide feedback to correct the same sub-optimal biomechanic motions as shirts 1610, 1710, and 1810; however, training region 1920 is configured differently. Training region 1920 includes a first loop 1940, a second loop 1942, a cross portion 1944, and a rear portion 1946.

First loop 1940 is shown encircling the wearer's right lateral arm and disposed substantially between wearer's glenohumeral joint and elbow. Second loop 1942 is shown encircling the wearer's left lateral arm and disposed substantially between the wearer's glenohumeral joint and elbow.

Cross portion 1944 is intended to be disposed on the anterior side of the wearer's chest according to an exemplary embodiment. Cross portion 1944 includes a center 1948. Center 1948 is disposed over the manubrium sterni, which is a central axis for scapular motion and aids in aligning the wearer's head and shoulders. Cross portion 1944 includes an upper portion 1972 and a lower portion 1974. At the right lateral side of the wearer's body and the left lateral side of the wearer's body, upper portion 1972 extends generally upward and outward from center 1948 over the wearer's clavicle bone between the wearer's neck and glenohumeral joint to transition to rear portion 1946 at the posterior side of the wearer's body. At the right lateral side of the wearer's body and the left lateral side of the wearer's body, lower portion 1974 extends generally outward and downward from center 1948, extending beneath the wearer's arms to be interconnected with first loop 1940 and second loop 1942, respectively. In the exemplary embodiment shown, left and right portions of lower portion 1974 extend partially about the wearer's arms to be interconnected with loops 1940, 1942, generally at the posterior side of the wearer's right and left arms, respectively. Partially encircling the wearer's arms helps effectively anchor portions of training region 1920 in desired positions relative to the wearer's body. In other exemplary embodiments, the right and left portions the lower portion of cross portion may be interconnected with the loops disposed about the wearer's arms at substantially any orientation.

Rear portion 1946 extends in a generally arcuate fashion along the wearer's acromion at the posterior side of the wearer's body. As discussed above, rear portion extends over the wearer's clavicle to transition to cross portion 1944 at the anterior side of the wearer's body.

With this exemplary embodiment of a shirt, as a person lifts their arm into the cocking position, the point at which the arm is at maximum external rotation, to throw or swing, the tension of the training region lessens below the arm providing feedback throughout the throwing or swinging action to maintain proper elbow elevation. Training region will provide feedback to lift the elbow if the elbow begins to drop or lower as the person becomes fatigued. Also, as the wearer brings their arm back into the cocking position, tension in cross portion 1944 of training region 1920 along the wearer's chest will begin to increase as well as along the back of the wearer's upper arm as the upper arm begins to move out of the scapular plane. The feedback resulting from the tension generated in training region 1920 indicates to the wearer to move their arm in line with the scapular plane. As the scapula retracts during the windup and cocking phase, energy begins to build within the glenohumeral joint through the application of stress. As energy is released during the acceleration and follow-through phases and scapular protraction occurs, tension is released in the training region. While this configuration may be adapted for correcting scapular motion imbalances, it is primarily intended for hyperangulation in the sense that it makes the wearer aware of the dangerous posture they are getting themselves into and provides a corrective feedback response. It should be noted, however, that the shirt may be used for numerous overhead activities to provide for more optimal biomechanic motion.

Construction Methods

A variety of construction methods and techniques may be used to construct garment 10.

According to an exemplary embodiment, a cut and sew method is utilized to construct a garment 10. According to one exemplary method of constructing the garment, the training region and the garment region of garment 10 are formed independently and then integrated by being sewn together. For example, the training region and the garment region may be cut as individual layers and then sewn together. Alternatively, the training region may be cut as a singular piece and the garment region may be cut in puzzle-like pieces that are sewn at their edges to the edges of the training region to form a complete garment.

According to an exemplary embodiment, a knitting method is utilized to construct a garment 10. For example, garment 10 may be constructed using a knitting method wherein the tensioning system is knitted along with the garment base into a unitary garment. Knitting methods can be used to integrate the training region with the garment region, forming both in a single piece of material that is knit simultaneously, either utilizing whole-garment knitting technologies (the complete garment is knitted as one piece) or standard textile knitting technology (knitting the fabric with the elastic region and then sewing pieces together). In one exemplary embodiment of a whole-garment knitting technology, circular knitting techniques are used to integrally construct the training region and the garment region of the garment as a compression tube or sleeve. The process of interlooping, the most common method being knitting, manipulates yarns to create fabrics by forming loop structures and placing them within one another. The knitting process runs horizontally incorporating these loop structures from a single continuous yarn into columns of vertically intermeshed loops known as whales and horizontal rows known as courses. A loop's structure as well as the intermeshing of loops within the fabric construct affect the properties of the textile and can be varied throughout the construct of the garment to provide the desired effects and properties one wants to design within the fabric. For example, there are four basic knitted structures (i.e. plain, rib, interlock, and purl) typically used to construct a fabric; their use and combinations throughout the fabric construct will produce any number effects including, but not limited to, changes in elasticity. Thus, a region with a different elasticity can be incorporated by changing the knitted structures from a plain structure to a rib structure and back to a plain structure for a specified number of rows and columns. Patterns emerge as a result of changing or varying the rows and columns with which the knitted structural changes are incorporated. Similarly, the training region is integrated with the garment region, being knit therewith simultaneously by changing the knitted structures. While, portions of the training region may extend angularly, the threads themselves are not angled, but, rather, are substantially horizontal as the pattern is developed through the varying knitted structures within each of the rows and columns of the fabric to produce the angular effect. As discussed above, the training region and the garment may be formed of the same material or two or more different materials may be incorporated within the knitted structure.

Other methods involving the integration of a base garment formed independently of the elastic region include but are not limited adhesion (adhesive or other bonding method), etc.

Independent of the construction method, garments 10 may include one or more layers. According to one exemplary embodiment, garment 10 may consist of a base layer with the training region integral with the garment region therein, and another layer disposed thereover that provides enhanced compression and aesthetic options. The enhanced compression not only changes the overall tightness of the garment but affects the elasticity of the overall training region and the garment region, generally decreasing the elasticity. According to another exemplary embodiment, garment 10 may be unlayered, including only a single layer of material. According to still other embodiments, garment 10 may be layered at one or more regions and be unlayered at one or more regions.

Construction Materials

The fiber, yarn, fabrication, and finish of a textile may each affect its performance. The fiber, yarn, fabrication, and finish may be varied a number of ways to achieve garments 10 as disclosed herein. Various types of yarns, distinguishable by their material and other properties (i.e. weight, ply, source fiber, texture, color, etc.) can be used to construct the garments described herein. These yarns may be natural, synthetic, or a combination of natural and synthetic fibers. Natural fibers can include but is not limited to cotton, linen, hemp, wool, and silk while synthetic yarns include man-made fibers such as rayon, polyester, acrylic, nylon, acetate, spandex, polypropylene, etc. The fiber content of a fabric affects the textile characteristics such as absorbency, abrasion resistance, chemical resistance, flammability, strength, sun resistance, microbial resistance, moisture wicking, thermal regulating, and elastic characteristics.

As mentioned above, garments 10 may also have coatings and finishes applied. Finishes can be used to adjust the appearance and feel of the fabric or could provide additional functionality such as water resistance, moisture control, and other desirable characteristics. Also color can be applied at any step throughout the manufacturing process from raw materials to final product.

Several Garments Work Together for Optimal Benefit

Garments 10 discussed above or modifications thereof may be used in combination to further improve a wearer's biomechanic motion and train the wearer to exhibit good biomechanic motion habits. Generally, combining two or more the training regions of these garments can provide benefits beyond what may be achieved with a single training region (e.g., a combination of the benefits provided by each individual training region). In this way, problematic sub-optimal motions may be targeted simultaneously. Further, with some combinations, additional benefits above and beyond those achieved with an individual garment 10 may be achieved.

Referring to FIGS. 43A-43D, garment 10 is shown as a shirt 2010 that includes a combination of training region 1420 of shirt 1410 and training region 1820 of shirt 1810 according to an exemplary embodiment. Shirt 2010 is configured to provide the benefits of shirt 1410, the benefits of shirt 1810, and also to improve the wearer's kinetic sequence, providing for better overall efficiency and movement. For example, if the wearer of shirt 2010 is performing a sport involving a variety of physical activities (i.e. throwing, jumping, running, etc.), the person may be able to achieve multiple protective postures and to transition between these postures with little risk of entering a high risk, sub-optimal posture. It should be noted however, that in some cases it is desirable not to combine training regions (e.g., a pitcher who is only concerned with their throwing biomechanics may want a shirt that concentrates on the shoulders and upper arm postures, etc.).

Referring to FIGS. 44A-44D, garment 10 is shown as a pant 2110 that includes a combination of training region 120 of short 110 and training region 920 of sock 910. According to an exemplary embodiment, pant 2110 is configured to provide the benefits of short 110 and sock 910 and improve the wearer's kinetic sequence, generally helping provide for optimal biomechanic motion of the lower extremities of the wearer's body during performance of many physical activities.

Training region 2120 of pant 2110 includes the component portions of training region 120 of short 110 and training region 920 of sock 910, described above, interconnected with a garment region 2118. These training regions are interconnected with one or more connection portions 2122, linking the inner portion of the short training region to the second portion of the sock training region. These connection portions are positioned so not to substantially interfere with the wearer's the knee joint. It should be noted that the two or more training regions need not be directly interconnected to provide benefits as described above.

Referring to FIGS. 45A-45D, an alternative embodiment of pant 2110 that includes a combination of training region 120 of short 110 and training region 1020 of sock 1010 is shown as pant 2210. Similar to pant 2110, pant 2210 is configured to provide the benefits of short 110 and sock 1010, generally helping provide for optimal biomechanic motion of the lower extremities of the wearer's body during performance of many physical activities. Also similar to pant 2110, training regions 120 and 1020 are interconnected with one or more connection portions 2222.

Figure 46D:
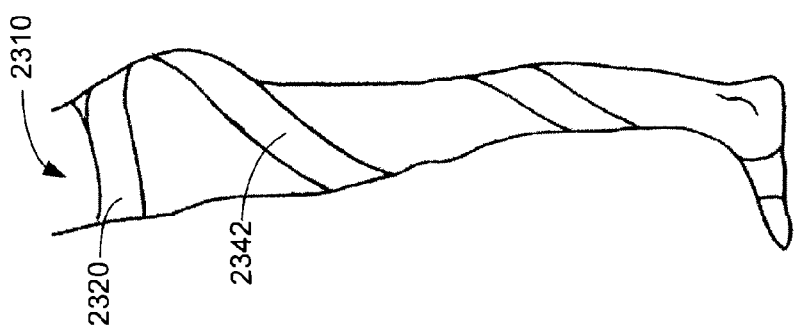
Figure 46C:
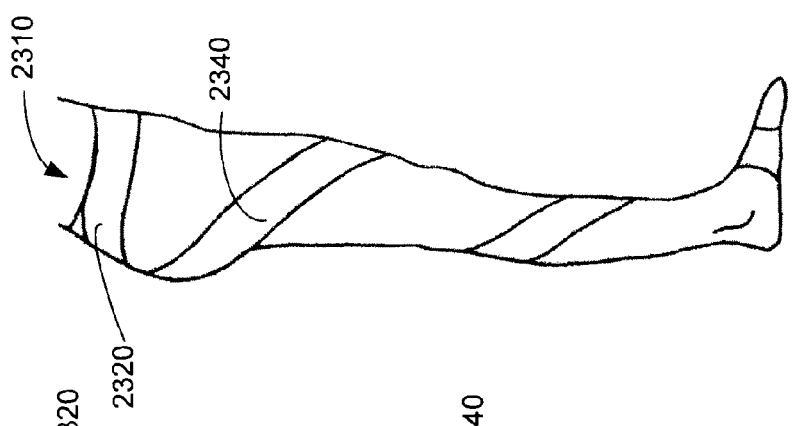
Figure 46B:
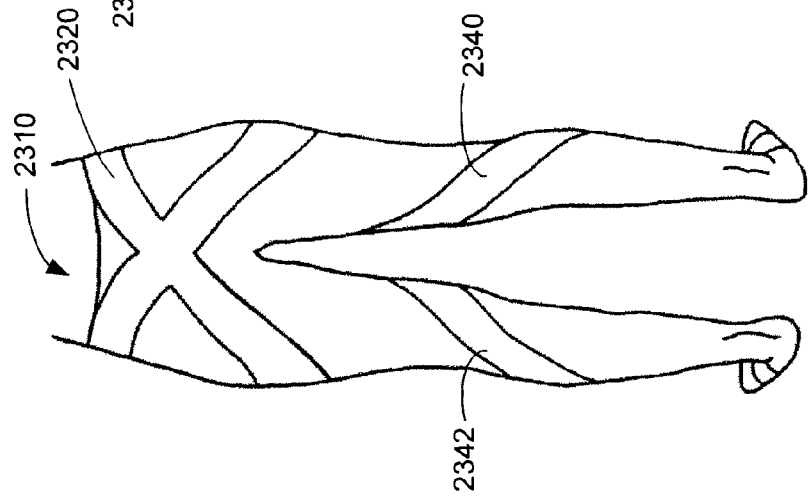
Figure 46A:
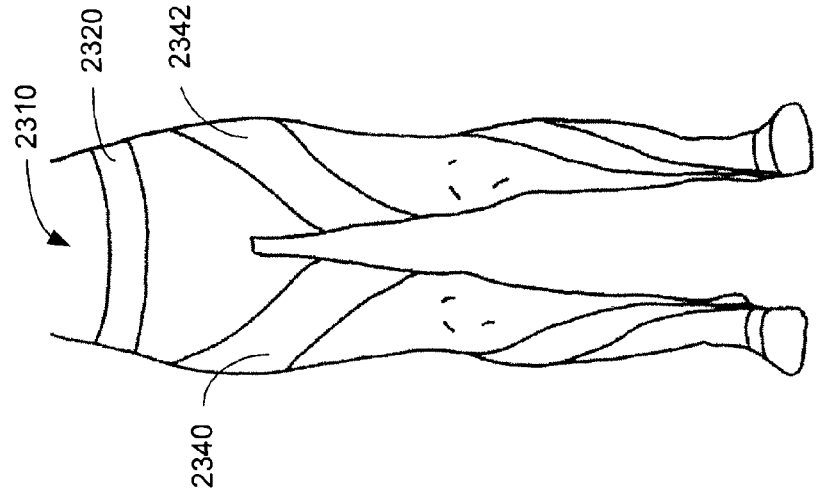

In an alternative exemplary embodiment, such a pant could include the sock tensioning system within a stirrup. In some exemplary embodiments, the pant incorporates the tensioning system of only one of the above-disclosed embodiments. In still other embodiments, the tensioning system may be a tensioning system that is not a combination of tensioning systems described above. FIGS. 46A-46C illustrate a pant 2310 including a tensioning system 2320 that is not a combination of tensioning system described above, but that incorporates aspects of training region 120 of short 110 and training region 920 of sock 910. Rather than forming loops similar to loops 140 and 142, the first and second leg portions 2340, 2342 of pant 2310 continue to wrap downward around the wearer's legs similar to intermediate portions 926 of sock 910. There are no loops disposed below and proximate to the wearer's knees similar to second loops 924 of sock 910. Similar to pant 2110, pant 2310 is configured to provide the benefits of short 110 and sock 1010, generally helping provide for optimal biomechanic motion of the lower extremities of the wearer's body during performance of many physical activities.

In still other exemplary embodiments, other combinations of shorts and socks may be used. In still other exemplary embodiments, other training regions disclosed herein or alternative embodiment thereof may be further combined with the short and/or sock combination (e.g., a shirt embodiment of garment 10, etc.) or independently of the short and/or sock combination.

Overall posture of the body from head to toe dictates efficiency in movement and energy usage while optimizing balance and stability. When the upper and lower body are optimally aligned and are working together, a person develops biomechanic fluidly, increasing their performance (i.e. agility, power, speed, etc.) while developing injury preventing biomechanic postures and motions. According to some exemplary embodiments, complete head-to-toe optimal biomechanic position/alignment is configured to be achieved by combining of one of the shirt options, depending on the biomechanic need, with a short option and a sock option.

Other Alternatives

According to an exemplary embodiment, garments 10 may include one or more training regions and no garment regions, i.e., the training regions may be independently utilized. These training regions may be used, for example, as a "liner" to be worn under a garment. In one exemplary embodiment, the training regions (e.g., a sock training region) may be used without any garment portion (e.g., for dancing, or other activities where a wearer's feet may be bare). According to some exemplary embodiments, the portions of the training region of garments 10 not including a garment region are continuously interconnected (i.e., there are not portions of the training region having ends that are not interconnected with other portions of the training region).

Sensors

Figure 48:
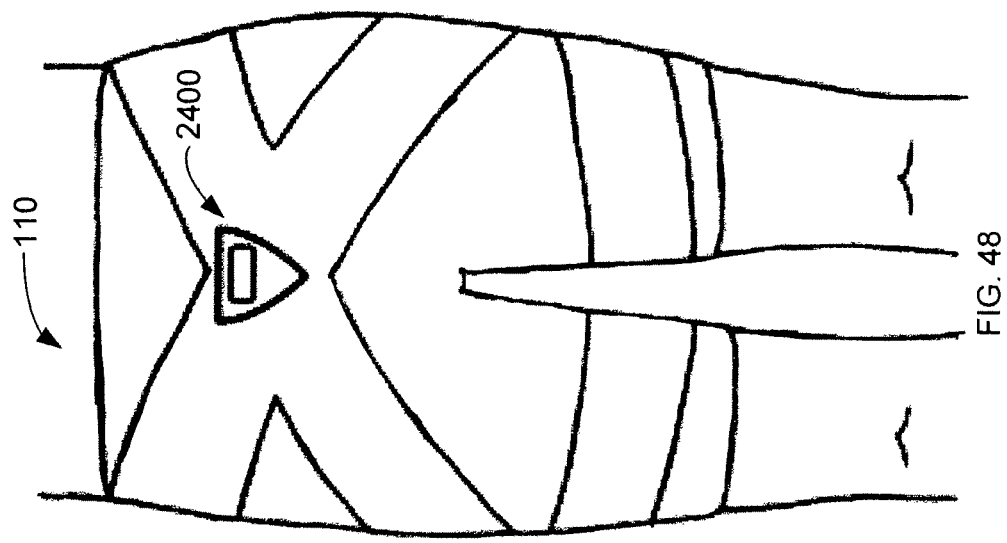
Figure 47:
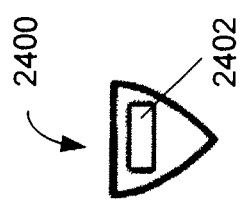

Referring to FIGS. 47-48, a sensing device 2400 may be incorporated into garment 10 according to an exemplary embodiment.

Sensing devices 2400 are intended to be used in conjunction with garments 10 to improve the wearer's athletic experience and/or performance. Sensing devices 2400 are configured to both collect data from a wearer and/or provide data to a wearer. Collecting (e.g., acquiring, aggregating, assembling, etc.) data from the wearer while the wearer performs an physical activity enables the wearer to monitor their performance and improvement. Sensing devices 2400 may be further configured to perform additional functions, including, but not limited to, analyzing, processing, recording, and/or monitoring the data collected and/or provided. For example, sensing device 2400 may analyze data collected to provide information to the wearer regarding their progress over time, regarding the progression of their workout, regarding ways to improve their performance, etc.

According to an exemplary embodiment, sensing device 2400 may include a monitor 2402 (e.g., an screen, LCD screen, a touch screen, etc.) configured to provide data (e.g., skill measures) to a wearer. Further, data can be later downloaded to a computer, viewed, analyzed, and shared following use. In one exemplary embodiment, activity settings and skills can be pulled up through a menu and selected with the push of the button or the touch of monitor 2402. In other exemplary embodiments, sensing device 2400 may be configured to provide data in other manners (e.g., audibly, via color-based visual indicators, etc.). In some exemplary embodiments, sensing device 2400 may be configured to provide this data to a wearer during a workout. This data may be visual, audible, vibratory, etc. For example, during an activity in which the wearer is developing their agility skills, the sensing device may vibrate to signal to the wearer to change their direction in an effort to monitor the wearer's reaction time as well as assess their movement patterns during the activity.

Sensing device 2400 is further configured to be coupled to a garment 10. Referring to FIG. 47, sensing device 2400 is shown configured to be disposed within a pocket 2404 of a garment 10 according to an exemplary embodiment. In the exemplary embodiment shown, pocket 2404 may be securable in order to retain sensing device 2400 therein as shown in FIG. 48. For example, pocket 2404 may be securable with snaps or Velcro®. According to other exemplary embodiments, sensing device 2400 may or may not be disposed in a pocket. Sensing device 2400 may be coupled to a garment 10 using any number of devices and/or coupling methods, including, but not limited to a latching device, a hooking device, a Velcro®-based device, straps, buckles, press fitting, etc. According to still other exemplary embodiments, sensing device 2400 and/or circuitry thereof may be knit or sewn directing into a training region of a garment 10 (e.g., to get substantially direct feedback at specific locations along the wearer's body).

According to an exemplary embodiment, sensing device 2400 is configured to be disposed proximate to a wearer's center of gravity (e.g., at center 148 of cross portion 144 of exemplary short embodiment 110, etc. Other desirable locations on the wearer's body relative to which dispose the sensing device, include, but are not limited to, at the wearer's waist substantially in-line with their spine, along the wearer's sternum, along the wearers backbone, at a location corresponding to the wearer's midsagittal plane or central axis, etc. According to other exemplary embodiments, sensing device 2400 may be disposed substantially at any location on the wearer's body as long as the location is accounted for.

According to an exemplary embodiment, sensing devices 2400 are disposed at locations where they are easily couplable to the wearer's body without interfering with the wearer's physical activities (e.g., by crossing over joints etc.). Sensing devices 2400 may be configured to be lightweight so that their presence is not noticeable to a wearer. Further, sensing devices 2400 may be configured to be robust so that a wearer will not have to be concerned with damaging or breaking sensing devices 2400.

According to an exemplary embodiment, sensing device 2400 is wireless to avoid interfering with a wearer's athletic activities. For example, sensing device 2400 may be battery powered (e.g., by a primary or secondary battery), avoiding the need for wires to couple the sensing device to a power source. Though, according to other exemplary embodiments, other power sources may be utilized.

According to an exemplary embodiment, sensing device 2400 is configured for use with a single type and/or style of garment 10. According to another exemplary embodiment, sensing device 2400 may be configured to be used in conjunction with one or more different types and/or styles of garments 10 (e.g., shorts and socks, shorts configured to correct valgus knee collapse and shorts configured to avoid PFP, etc.). According to another exemplary embodiment, sensing device 2400 is configured for use during a specific athletic activity or set of athletic activities.

According to an exemplary embodiment, sensing device 2400 may be used and/or integrated with a computer or other electronic device to enhance the functionality of sensing device 2400. In one exemplary embodiment, sensing device 2400 is configured to wirelessly communicate with (e.g., be wirelessly coupled to) a computing device. In another exemplary embodiment, sensing device 2400 may be coupled to a computing device by any of a number of devices and/or methods known in the art (e.g., via USB ports, by utilizing a programming/data storage card that is readable by the computing device, etc.).

According to an exemplary embodiment, sensing device 2400 is pre-programmed with games, training routines, etc. In some exemplary embodiments, sensing device 2400 may provide for the wearer to compete (e.g., play, etc.) against other wearers of garments 10. These competitions may take place simultaneously, may take place in series wherein data may be compared after each player has completed a given activity, and/or data may be uploaded to a computing device to compare results to competitors that are local or anywhere around the world. In other exemplary embodiments, a user may upload programs to the sensing device (e.g., from a website, etc.).

According to an exemplary embodiment, multiple sensing devices 2400 are used in conjunction, simultaneously or in succession. In this way, different types of data may be collected (e.g., distance, power, etc.) and/or data from various garments 10 or portions of garments 10 may be collected (e.g., data from a location at the center of the cross portion of a short and data from the medial arch of the wearer's foot). Further, by using more than one sensing devices in conjunction, the sensing devices may act in concert to collect, provide, analyze, etc. data that may not be collectable, providable, analyzable, etc. by a single sensing device.

Sensing device 2400 may be configured to collect data to assess numerous performance considerations, including, but not limited to, power, coordination, agility, and balance. In order to collect this data different sensing devices or sensor components may be used, alone or in combination, including, but not limited to, pressure sensors, switches, goniometers, accelerometers, gyroscopes, optical sensors, magnetometers, infrared sensors, etc.

With one or more of the above-described functionalities, sensing devices 2400 can assist the wearer in building basic skills, training, etc. For example, the sensors may assist in developing symmetry building skills (e.g., right/left symmetry and dexterity), center of mass skills (e.g., maintaining stability while in motion), confidence building skills (e.g., by facilitating step-by-step progressions through athletic activities and/or progressively challenging the person while allowing for success), decision making skills (e.g., utilizing reactive agility activities requiring moving or changing direction based on cue), and/or endurance skills (e.g., providing for performance of a series of activities until fatigue is detected).

Symmetry building skills are used to balance strength and coordination of the dominant and non-dominant limb. These activities are typically performed with both the dominant and non-dominant limb, and, if the activity includes circular motions, activities are performed clockwise as well as counter clockwise with each limb. Metrics may be used to measure the current status of the wearer's proficiency and skill scoring each leg's skill level as well as scoring the relative difference between each limb with a lower score representing a larger difference. Examples of such drills would include, but are not limited to, a push kick, kicking a ball against a wall utilizing each limb and alternating limbs, kicking a ball with a partner utilizing each limb and alternating limbs, or balancing on one leg while working a ball clockwise around the wearer's supporting leg and then counter clockwise, etc.

Center of mass building skills are used to help maintain a centered center of mass throughout an activity. For example, activities building center of mass skills may be timed and have a score based on the distance the wearer's center of mass shifts during the activity and/or the direction of the shift. Potential activities to be evaluated include, but are not limited to, quadrant jump tests in which the participant jumps forward, right, back, and then left in a clockwise fashion. This test can also be performed counter clockwise and/or the results can be averaged or monitored over time. Other activities may include, but are not limited to, juggling a soccer ball from foot to head to foot or foot to chest to foot.

Confidence building skills use stepwise progressions to build up a person's athletic skill and improve their performance. These activities are typically monitored over time and become successively more difficult as the person continues to improve. Scores may be provided based on the level of improvement of previously executed tasks. Further, development activities may even be recommended based on recorded successes and skill deficits in order to assist in improving the person's skills. A chest pass progression is an example of a progressive drill that could be used build confidence. A chest pass progression involves a series of levels. At the first level two people perform a regular chest pass, at the next level, the chest pass is performed while maintaining balance on one leg, and at the next level, that same chest pass is performed balancing on one leg while bending forward, etc.

Decision making skills encourage good body position during rapid movements resulting from a change in direction. These activities may be performed over a prescribed time, and scores may be based on the distance their center of mass shifts during changes in direction as well as information on the shift direction. Potential activities for building decision making skills include, but are not limited to, zigzag jumping, a varied triple jump where participants run, hop, jump and land, or have the participant randomly shuffle backwards, forwards, left and right based on a randomly generated signal.

Endurance skills can assist the wearer in maintaining proper body position during prolonged or intense play. Posture shifts have a strong correlation to fatigue. Accordingly, the wearer's posture over time may provide information regarding the wearer's endurance skills. Activities designed to improve endurance skills may be monitored over time in order to evaluate the amount of time it takes for the wearer's overall center of mass to shift. These activities include, but are not limited to, running, conditioning drills, etc.

The device disclosed herein may replace existing garments. Alternatively, the device may supplement, or be used in addition to, another garment. The device may also be conformed to the unique requirements of the sport or activity. For example, some exemplary embodiments are configured for repetitive motion exercises and sports, e.g., soccer. For these embodiments, the focus in on biomechanics. For other exemplary embodiments, the garment is configured for sports and activities such as yoga, where the focus is on posture. While the device will typically be used training and participating in athletic activities, it may be used for other purposes (e.g., rehabilitation).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the device as shown in the various exemplary embodiments is illustrative only (and such term is not intended to connote that such embodiments are necessarily extraordinary or superlative examples). Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, use of materials, orientations, etc.) without materially departing from the novel teachings and advantages of the subject matter recited in the claims. Also, while this disclosure is generally directed to a garment used during performance of a physical activity, the teachings contained herein may extend to various other types of garments, or the like. Accordingly, all such modifications are intended to be included within the scope of the present invention as defined in the appended claims.

The order or sequence of any process or method steps may be varied or resequenced according to alternative embodiments. In the claims, any means-plus-function clause is intended to cover the structures described herein as performing the recited function and not only structural equivalents but also equivalent structures. Other substitutions, modifications, changes, and omissions may be made in the design, operating conditions, and arrangement of the exemplary embodiments without departing from the scope of the present inventions as expressed in the appended claims.

What is claimed is:

1. A garment to be worn on at least a portion of a torso and both legs of a person performing a physical activity, the garment comprising:
   a torso portion having a torso opening, the torso portion joined to a first leg portion having a first leg opening and a second leg portion having a second leg opening;
   a first training region having a front portion leading to a rear cross portion having an upper portion and a lower portion, and disposed within and extending completely about the torso portion and intended to be in substantially constant physical contact with a torso portion of the person performing a physical activity and having a first training region elasticity;
   a second training region leading from one side of the lower portion of the rear cross portion of the first training region to form a first leg loop extending completely about the first leg portion and intended to be in substantially constant physical contact with a first leg of the person performing a physical activity and having a second training region elasticity;
   a third training region leading from an opposite side of the lower portion of the rear cross portion of the first training region to form a second leg loop extending completely about the second leg portion and intended to be in substantially constant physical contact with a second leg of the person performing a physical activity and having a third training region elasticity;
   a garment region extending at least partially through the torso portion and the first and second leg portions and having a garment region elasticity, the garment region stretching a greater distance as the result of an applied force than the training regions under the same applied force; and
   the training regions at least partially defining a tensioning system of a biofeedback device, the biofeedback device being configured to provide multi-directional feedback forces comprising at least external rotation and leg abduction, and having a magnitude and a direction to the person performing a physical activity when the person performing a physical activity's biomechanic position is sub-optimal, the feedback forces indicating to the person performing a physical activity that their biomechanic position is sub-optimal and indicating to the person performing a physical activity how to adjust their one or more body portions towards a more optimal biomechanic position;
   wherein the biofeedback device is configured to sense and correct sub-optimal biomechanic positions, the sub-optimal biomechanic positions including static postures and dynamic postures;
   wherein when the person's biomechanic position is substantially optimal, the person performing a physical activity receives substantially no feedback forces indicating to the person performing a physical activity that their biomechanic position is sub-optimal;
   wherein the magnitudes of the feedback forces generally increase the farther the person performing a physical activity is from an optimal biomechanic position.

2. The garment of claim 1, wherein the feedback forces are generated substantially as a result of tension in the training regions that provides full circumferential compression in the first, second and third training regions.

3. The garment of claim 1, wherein the feedback forces provided by the biofeedback device are intended to be sensed by a plurality of sensory receptors in the wearer's skin, muscles, joints, ligaments, and/or tendons.

4. The garment of claim 1, wherein the magnitude of the feedback force provided by the biofeedback device at a given location on the one or more body portions of the person performing a physical activity is substantially proportional to the magnitude of the adjustment required for that location on the one or more body portions of the person performing a physical activity to achieve a substantially optimal biomechanic position and the direction corresponds to the direction of the desired adjustment.

5. The garment of claim 1, wherein the feedback forces provided by the biofeedback device are operable at least partially through the proprioceptive sense of the person performing a physical activity, causing a neuromuscular response resulting in adjustments being made to the position of the one or more body portions of the person performing a physical activity substantially subconsciously that bring the person closer to an optimal biomechanic position.

6. The garment of claim 1, wherein the garment comprises a knit short and the magnitudes of the feedback forces provided by the biofeedback device decrease as the person performing a physical activity moves closer to an optimal biomechanic position.

7. The garment of claim 1, wherein the first training region comprises a front portion and a rear cross portion, and the second and third training regions each include a loop portion configured to encircle a thigh of the person performing a physical activity, and wherein the training regions of the garment are intended to be positionable on the person performing a physical activity such that the training regions are substantially symmetrical relative to the midsagittal plane of the person.

8. A garment intended to be worn by a person performing a physical activity, the garment comprising:
   a training region having a training region elasticity, the training region comprising:
   a first circumferential torso portion having a front portion leading to a rear cross portion having oppositely extending lower portions intended to be disposed relative to a torso portion of the person performing a physical activity; and
   second circumferential leg portions each having a leg loop with a diagonally extending front portion intended to be disposed relative to leg portions of the person performing a physical activity, the first circumferential torso portion and the second circumferential leg portions of the training region being moveable relative to each other and interconnected by the oppositely extending lower portions of the rear cross portion and the diagonally extending front portions of the leg loops;
   wherein tension generated in the training region results in multi-directional feedback forces being provided to the person performing a physical activity, each feedback force including a magnitude and a direction;
   wherein the training region is configured to sense and correct sub-optimal biomechanic positions, the sub-optimal biomechanic positions including static postures and dynamic postures.

9. The garment of claim 8, wherein the first circumferential torso portion of the training region further includes a cross portion having a center, the center intended to be substantially aligned with the center of gravity of the person performing a physical activity.

10. The garment of claim 8, wherein the first circumferential torso portion and the second circumferential leg portions of the training region are directly interconnected.

11. The garment of claim 8, wherein the first circumferential torso portion and the second circumferential leg portions of the training region are interconnected by a third portion, the third portion being directly interconnected with the first circumferential torso portion and being directly interconnected with the second circumferential leg portions.

12. The garment of claim 8, wherein the training region of the garment is intended to be positionable on the person performing a physical activity such that the training region is substantially symmetrical relative to the midsagittal plane of the person.

13. The garment of claim 8, wherein the training region is configured to be integrated with another garment.

* * * * *